(12) United States Patent
Phelan et al.

(10) Patent No.: US 6,525,745 B1
(45) Date of Patent: Feb. 25, 2003

(54) SHEET METAL GEOMETRIC MODELING SYSTEM

(75) Inventors: David G. Phelan, Marietta, GA (US); Patricia A. Vrobel, Roswell, GA (US); Tao-Yang A. Han, Marietta, GA (US)

(73) Assignee: Alventive, Inc., Santa Clara, CA (US)

( * ) Notice: Subject to any disclaimer, the term of this patent is extended or adjusted under 35 U.S.C. 154(b) by 0 days.

(21) Appl. No.: 09/425,987

(22) Filed: Oct. 25, 1999

(51) Int. Cl.[7] .............................................. G06T 11/60
(52) U.S. Cl. ...................................................... 345/676
(58) Field of Search ........................ 345/642, 650–654, 345/676–680, 852, 769; 700/145, 182; 703/1

(56) References Cited

U.S. PATENT DOCUMENTS

| | | | |
|---|---|---|---|
| 5,359,703 A | | 10/1994 | Robertson et al. |
| 5,452,414 A | | 9/1995 | Rosendahl et al. |
| 5,565,748 A | * | 10/1996 | Takizawa et al. ............ 700/182 |
| 5,588,097 A | | 12/1996 | Ono et al. |
| 5,734,805 A | | 3/1998 | Isensee et al. |
| 5,815,154 A | * | 9/1998 | Hirschtick et al. ........... 345/853 |
| 5,861,889 A | | 1/1999 | Wallace et al. |
| 5,867,144 A | * | 2/1999 | Wyard ......................... 345/769 |
| 5,894,310 A | | 4/1999 | Arsenault et al. |
| 5,971,589 A | * | 10/1999 | Hazama et al. .............. 700/145 |
| 6,219,049 B1 | * | 4/2001 | Zuffante et al. ............. 345/420 |
| 6,232,983 B1 | * | 5/2001 | Felser et al. ................. 345/649 |
| 6,392,645 B1 | * | 5/2002 | Han et al. ..................... 345/420 |

OTHER PUBLICATIONS

Newton, "Inside Generic CADD:, The Complete Tutorial and Reference to Affordable CADD!", ©1991, pp. 210–214.
Chapter 5, "Using Objects", *The Showplace Companion*, 1990, pp. 91–115.

U.S. patent application Ser. No. 09/135,818, filed Aug. 18, 1998, entitled "Three Dimensional Movement of Displayed Object" and references cited therein.
MetalMan 2.0 Technical Data Aid and Specification, Jul. 27, 1998.
SolidWorks 98 User's Guide, 1998, pp. 11-1–11-17.
CoCreate/Sheet Advisor Administration Guide, Oct. 6, 1998.
SolidWorks Tutorial, 1998, pp. 13-1–13-8.
Solid Edge User's Guide, Version 4, Chapter 2, "Working with Sheet Metal Parts in Solid Edge", pp. 50–57.

* cited by examiner

*Primary Examiner*—Jeffery Brier
(74) *Attorney, Agent, or Firm*—Nixon & Vanderhye, P.C.

(57) ABSTRACT

A three dimensional geometric modeling system featuring an executable program (400) allows a user to select and then drag and drop sheet metal solid shapes into a scene or assembly depicted on a display screen. The user selects the sheet metal solid shapes from a sheet metal catalog (300), thereby creating an instance of a program object for the selected solid shape. A program object (1302) for a sheet metal solid shape carries an application-specific or customized procedure (1000) which governs the drag and drop behavior of the sheet metal solid shape. Implementation of the application-specific or customized drag and drop procedure occurs upon detection of a special interface through which the program object for the sheet metal solid shape acquires environmental information. While some of the program objects for the sheet metal solid shape carry their own geometric profiles utilized for such CSG evaluation, program objects for other sheet metal solid shapes (such as the punch solid shape and the bend solid shape) instead rely upon a profile generator (415) to generate the profile at the request of the program object. The program also allows the user to edit table information utilized by the profile generator.

31 Claims, 42 Drawing Sheets

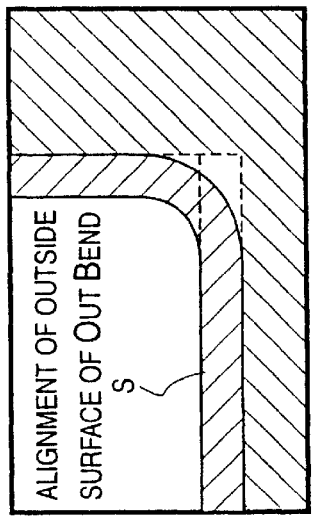
Fig. 3B(1)
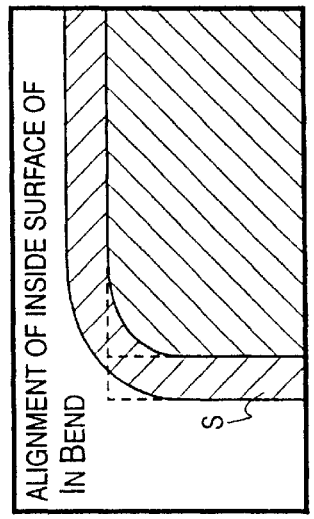
Fig. 3B(2)
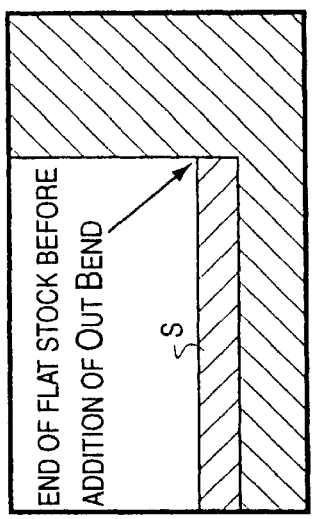
Fig. 3C(1)
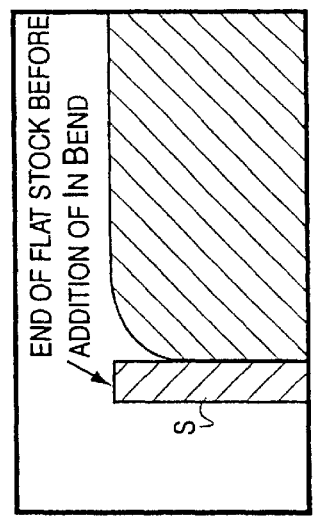
Fig. 3C(2)
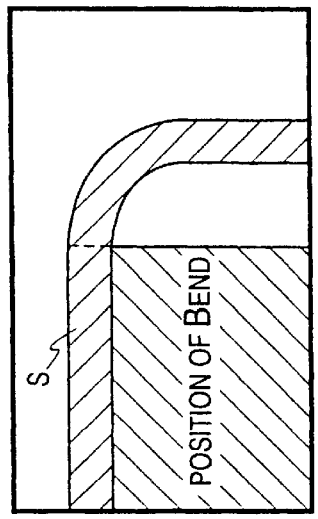
Fig. 3D(1)
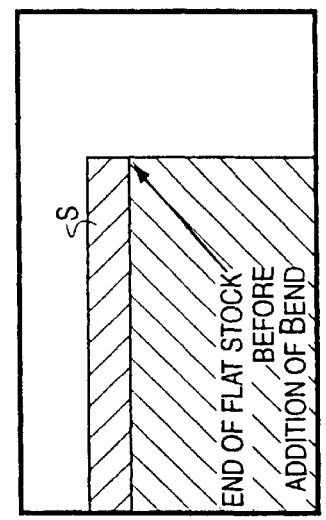
Fig. 3D(2)

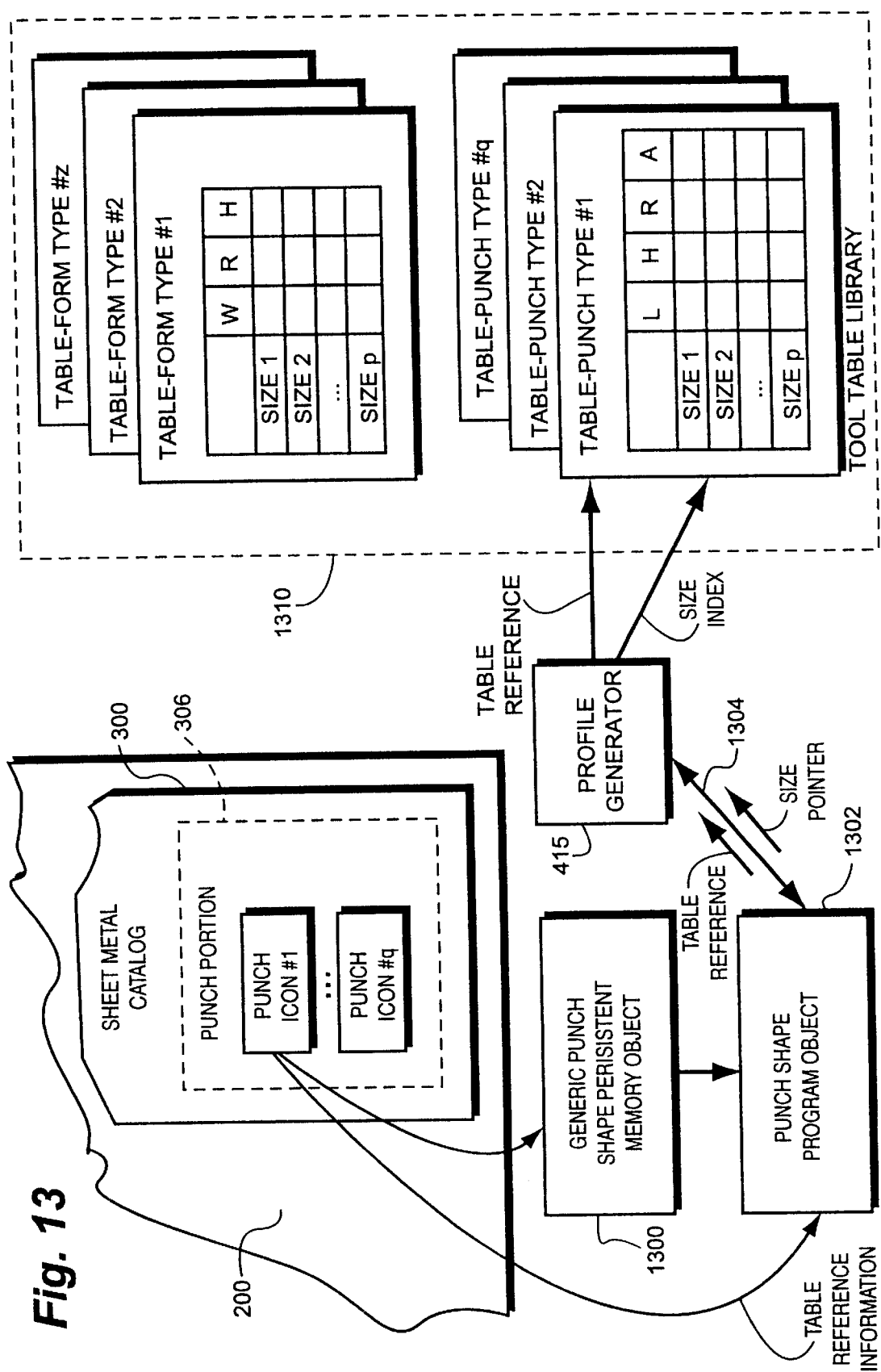

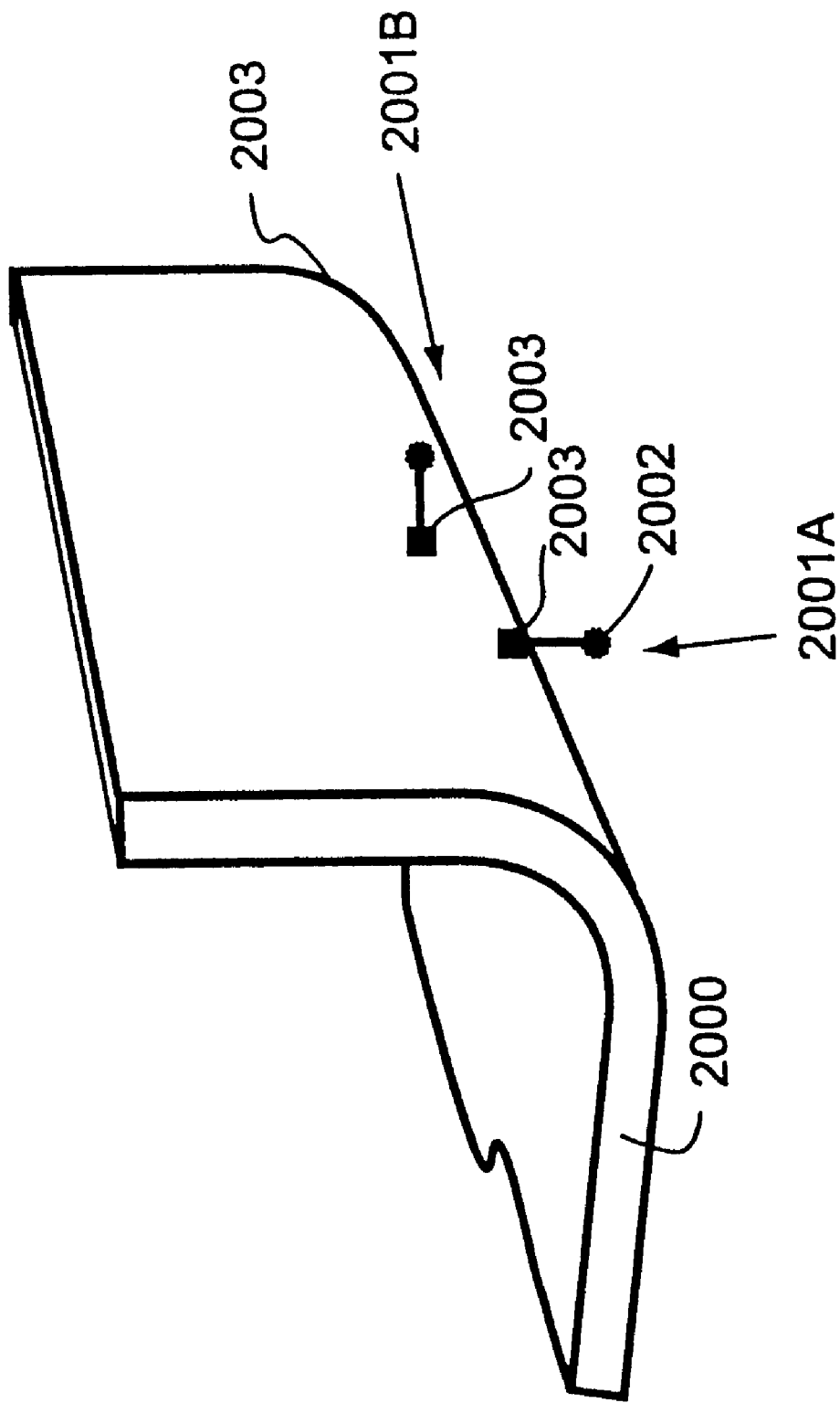

SHEET METAL GEOMETRIC MODELING SYSTEM

This application is related to simultaneously filed U.S. patent application Ser. No. 09/425,988, entitled "Edit Modes For Three Dimensional Modeling Systems", which is incorporated herein by reference.

BACKGROUND

1. Field of the Invention

The present invention pertains to computerized three dimensional geometric modeling systems, and particularly to a three dimensional geometric modeling system which is used for sheet metal modeling.

2. Related Art and Other Considerations

The computer has greatly affected essentially all forms of information management, including the geometric modeling arts. Nowadays there are numerous computer program products that allow the user to create, store, and modify geometric models and their graphical renderings of various types on a display screen, and to print or otherwise output such geometric models and their renderings. Such geometric models and their graphical renderings span the gambit from simple to complex, and can vary in subject matter, e.g., artistic, industrial, etc. Some geometric modeling computer program products are two dimensional, providing only length and width dimensions of objects. The more complex three dimensional computer program products, on the other hand, provide three dimensions—length, width, and depth/thickness.

Three dimensional geometric modeling programs can generate a scene or part which can comprise one or more constituent 3D solid shapes. For example, a scene or part featuring a simple table would comprise a solid shape for each leg of the table, as well as a solid shape for a flat table top. In one example object-oriented geometric modeling computer program, an executable object is used to define and generate each solid shape. The object for each solid shape can have several associated components, the components being a combination of executable code and data structure. For example, a boundary representation ("B-rep") component includes a data structure describing the geometry and topology data for the solid shape (e.g., length, width, depth, and coordinates of the solid part).

Most three dimensional geometric modeling programs employ a feature-based parametric modeling technique. In feature-based parametric modeling, the executable object for each solid shape has not only a boundary representation component, but also a history or creation component which includes a data structure reflecting how a solid shape has been created. That is, the history/creation component includes data which indicates an order or chronological sequence of steps employed to construct the solid shape. For a simple solid block, for example, the history/creation component may indicate that the solid block began as a simple two dimensional rectangle that was extruded into a third dimension. U.S. Pat. No. 5,894,310, entitled "Intelligent Shapes For Authoring Three-Dimensional Models", incorporated herein by reference, discloses solid shapes having various other components in addition to boundary representation and historical components: a visual component; a physical component; a functional component; and a behavioral component.

Solid parts can be formed from other solid parts. In geometric modeling terms, the building of more complicated solid shapes in hierarchical fashion from simpler solid shapes (known as "primitives") is known as "constructed solid geometry" ("CSG"). The simpler solid shapes can be combined using various operations (e.g., Boolean operations such as "and", "or", "not", etc.). The computer stores the overall (complex) solid shape as a tree, each of the "leaves" of the tree comprising a primitive solid shape.

One particular area of use for computer-aided modeling systems is in sheet metal design. Computer-aided modeling systems facilitate design of sheet metal parts, and subsequent fabrication of the parts. The computer-aided aspect of sheet metal design is particular advantageous for designing customized parts, as well as for optimizing stock on large projects. Various computer-aided modeling systems for sheet metal are commercially available. For example, "MetalMan 2.0" is a two dimensional manufacturing aid. A product known as "Sheet Advisor" has utility in a sheet metal environment, but lacks creation history and does not include tool definitions in a sheet metal part's data structure. The products "Solid Edge Version 4" and "SolidWorks 98" are both feature-based parametric modeling systems in which some types of modifications are very complex, and in which some tools are not easily reusable.

What is needed, and an object of the present invention, is a three dimensional computer aided geometric modeling system which effectively and efficiently handles sheet metal solid shapes.

BRIEF SUMMARY OF THE INVENTION

A three dimensional geometric modeling system featuring an executable program allows a user to select and then drag and drop sheet metal solid shapes into a scene or assembly depicted on a display screen. The user selects the sheet metal solid shapes from a sheet metal catalog which includes such sheet metal solid shape as flat stock, add-on stock, bend solid shapes, punch solid shape, and form solid shapes.

Upon selection of a solid shape from the sheet metal catalog, an instance of a program object is created for the selected solid shape. In view of the nature of and features associated with sheet metal solid shapes, a program object for a sheet metal solid shape carries an application-specific or customized procedure which governs the drag and drop behavior of the sheet metal solid shape, unlike non-sheet metal solid shapes which utilize a generic drag and drop procedure. Implementation of the application-specific or customized drag and drop procedure occurs upon detection of a special interface through which the program object for the sheet metal solid shape acquires environmental information.

Whereas some of the program objects for the sheet metal solid shape carry their own geometric profiles utilized for such evaluation, program objects for other sheet metal solid shapes (such as the punch solid shape and the bend solid shape) do not include profiles. Rather, the program objects which do not carry profiles rely upon a profile generator to generate the profile at the request of the program object. The program object provides the profile generator with certain table reference information which specifies a particular table in a tool table library, and size entry in the table, to be utilized in generating the profile for the selected sheet metal solid shape. The profile generator uses the table reference information to generate the profile for the selected sheet metal solid shape, and returns to the requesting program object a geometric profile for use during the evaluation. The provision of a profile generator also allows the user to edit parameters in the table for a selected shape for use in creating a sheet metal solid shape.

The bend sheet metal solid shapes of the present invention include plural child solid shapes, such as a first stock or flange segment, a second stock or flange segment, a bend segment, a first relief, and a second relief. The flange or stock segments between which the bend segment is situated can be adjusted independently of the bend solid shape if the user so specifies by setting a flange flag.

The bend sheet metal solid shapes of the present invention can be aligned in accordance with one of three configurations: an "Out Bend" alignment option; an "In Bend" alignment option; or a "Non-Trim Bend" alignment option. In the "Out Bend" option the bend solid shape is trimmed back to a target solid shape to which it is added to allow the outside surface of bend solid shape to align with the original position of the end surface of the target solid shape. In the "In Bend" option, addition of the bend solid shape trims back the target solid shape to which it is added to allow the inside surface of bend solid shape to align with the original position of the end surface of the target solid shape. In the "Non-Trim Bend" option the bend solid shape is added to target solid shape without trimming back the target solid shape.

The three dimensional sheet metal modeling system and program of the present invention provides numerous editing handles for editing sheet metal solid shapes either on a part level or a shape level.

The three dimensional sheet metal modeling system and program of the present invention also permits unified movement of plural solid shapes comprising a solid part. Upon the user defining a neighborhood of solid shapes comprising the part and the user prescribing a movement, all solid shapes of the neighborhood move in unison on the display device in accordance with the prescribed movement. For example, sheet metal solid shapes attached to one end of a sheet metal bend solid shape move in unison with a portion of the sheet metal bend solid shape as the bend angle of the sheet metal bend solid shape is adjusted or changed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3B(1) is a side view showing stock prior to addition of an "Out Bend" bend solid shape; FIG. 3B(2) is a side view showing stock after addition of the "Out Bend" bend solid shape.

FIG. 3C(1) is a side view showing stock prior to addition of an "In Bend" bend solid shape; FIG. 3C(2) is a side view showing stock after addition of the "In Bend" bend solid shape.

FIG. 3D(1) is a side view showing stock prior to addition of the "Non-Trim Bend" bend solid shape; FIG. 3D(2) is a side view showing stock after addition of the "Non-Trim Bend" bend solid shape.

FIG. 13 is a diagrammatic view depicting creation of an instance of a program object and utilization of both a profile generator and a tool table library to generate a geometric profile for the program object.

FIG. 20A is a diagrammatic view showing distance editing handles and angle editing handles of the present invention.

FIG. 24(1) is a flowchart showing sub-steps of sub-step 24-1 of FIG. 24.

FIG. 24(2) is a flowchart showing sub-steps of sub-step 24-2 of FIG. 24.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
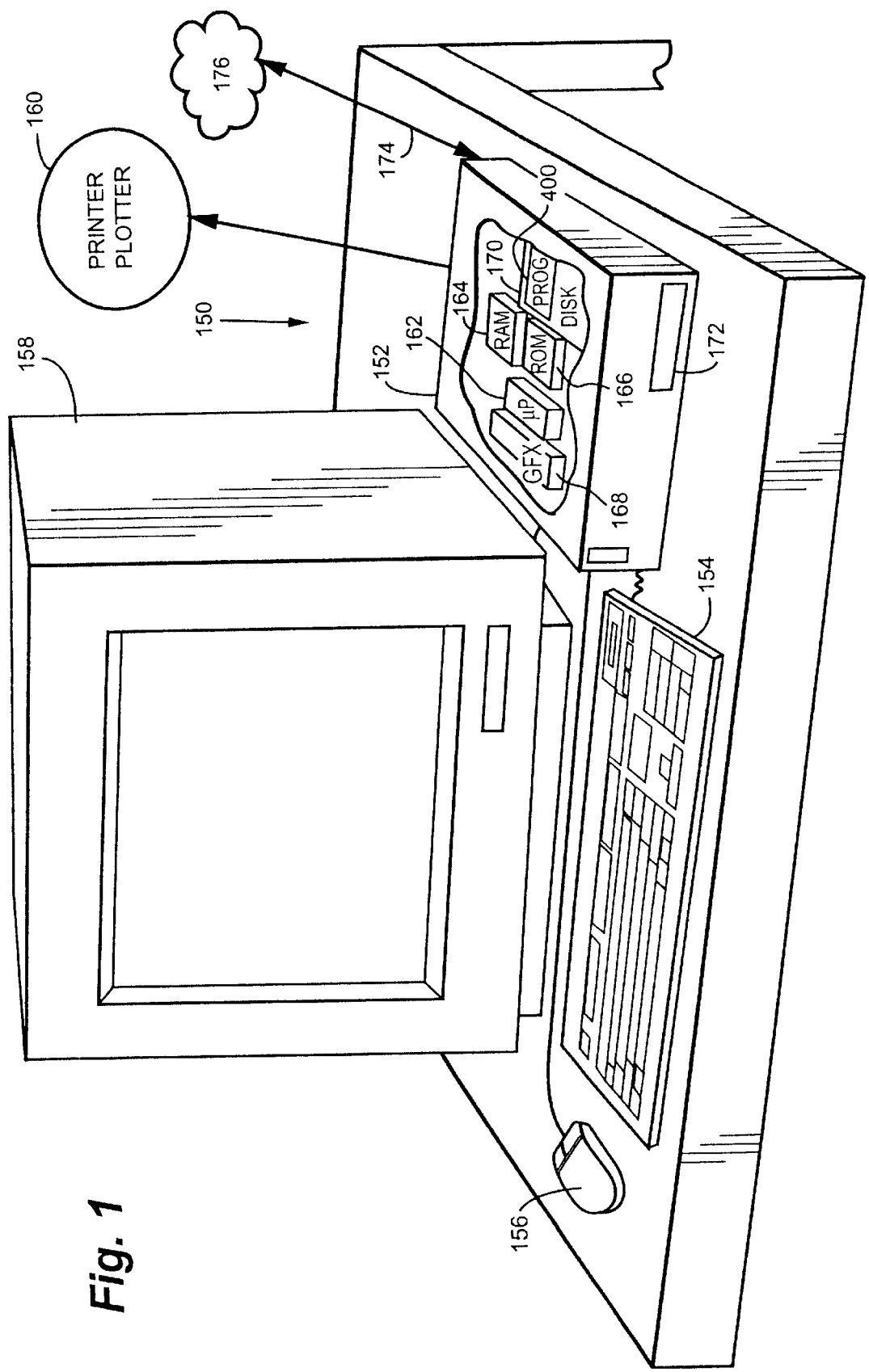
FIG. 1 is a schematic view of an example computer geometric modeling workstation according to an embodiment of the invention.

FIG. 1 shows an example computer graphics workstation 150 accordingly to an embodiment of the invention. Workstation 150 includes a general purpose computer 152, a keyboard 154, a mouse pointing device 156, a display 158, and a printer/plotter 160. Computer 152 may be, for example, a conventional microcomputer such as an IBM compatible personal computer including a microprocessor 162, random access memory 164, read only memory 166, a graphics video adapter 168, a mass storage device such as a magnetic disk 170, and an optical and/or floppy diskette drive 172. Computer 152 displays images on display 158 (and/or prints the images on printer/plotter 160) in response to user inputs via keyboard 154 and/or mouse pointing device 156. The computer 152 creates images based on steps it performs under control of a computer program product 400 stored on mass storage device 170 and/or another storage media (e.g., an optical or magnetic disk, not shown) provided via drive 172. A communications connection 174 between computer 152 and a network 176 (e.g., the Internet) may be provided to allow the user to access information from the network and/or exchange information with another computer also connected to the network.

Figure 2:
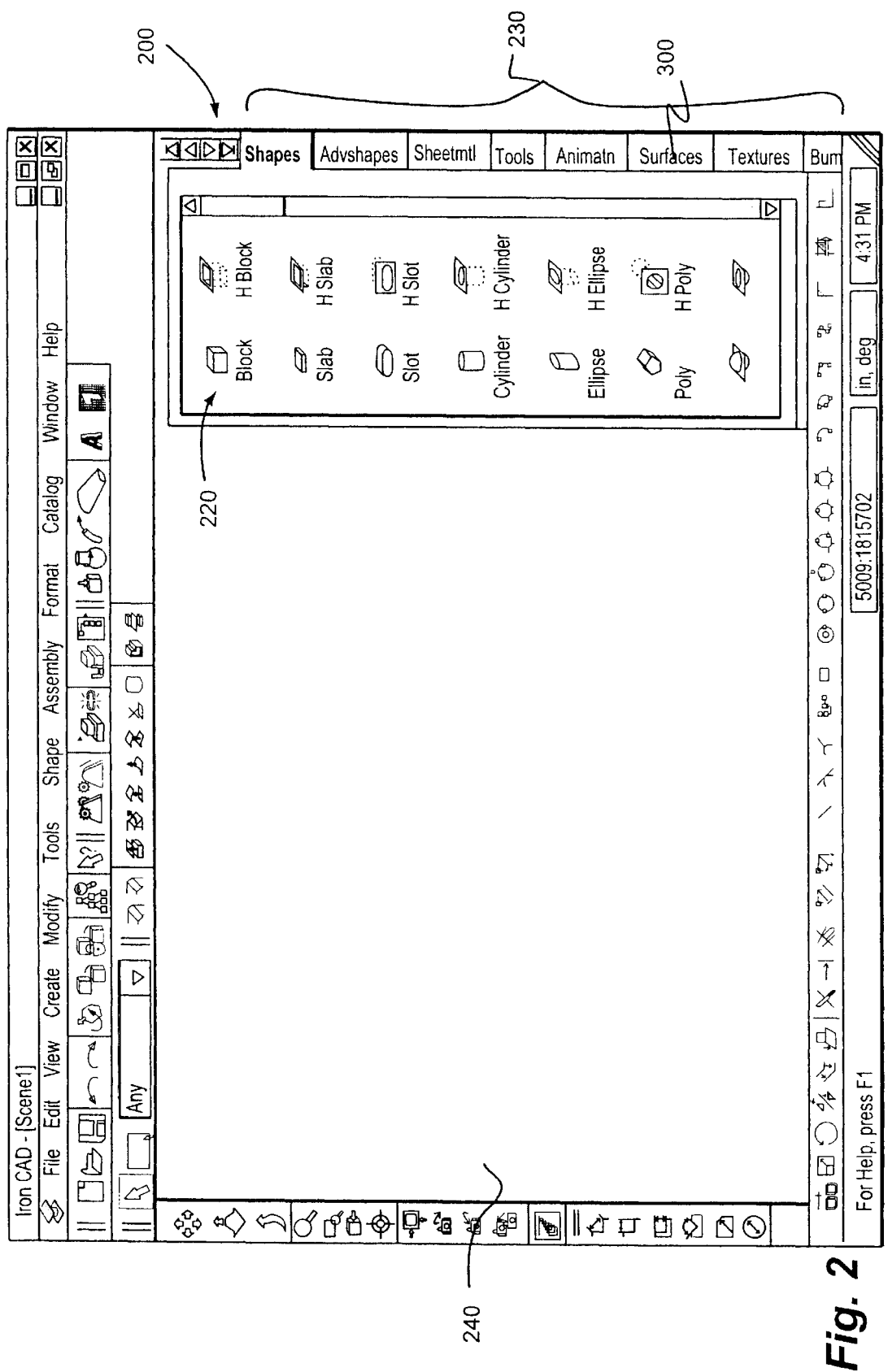
FIG. 2 is a diagrammatic view of a screen including tool bar and catalog browser generated upon start up of a three dimensional geometric modeling program of the invention.

Upon start up the three dimensional geometric modeling program generates a screen 200 as shown in FIG. 2. The screen 200 has various tool bars and a catalog browser 220 for browsing a set 230 of catalogs. The catalogs included in the set 230 are identified by the catalog tabs appearing in FIG. 2, and include a shapes catalog; an advanced shapes catalog; a sheet metal catalog; a tools catalog; an animation catalog; a surfaces catalog; a textures catalog; and a bumps catalog. In FIG. 2, the currently selected catalog is the shapes catalog. As explained in more detail subsequently, each catalog in set 230 includes icons corresponding to solid shapes which can be selected and positioned (clicked, dragged and dropped) into a scene being created in a work space portion 240 of screen 200. The work space portion 240 of screen 200 is still blank in the view of FIG. 2, but it should be understood that various types of solid structures can be displayed therein as the user selects and positions solid shapes from the various catalogs.

Figure 4:
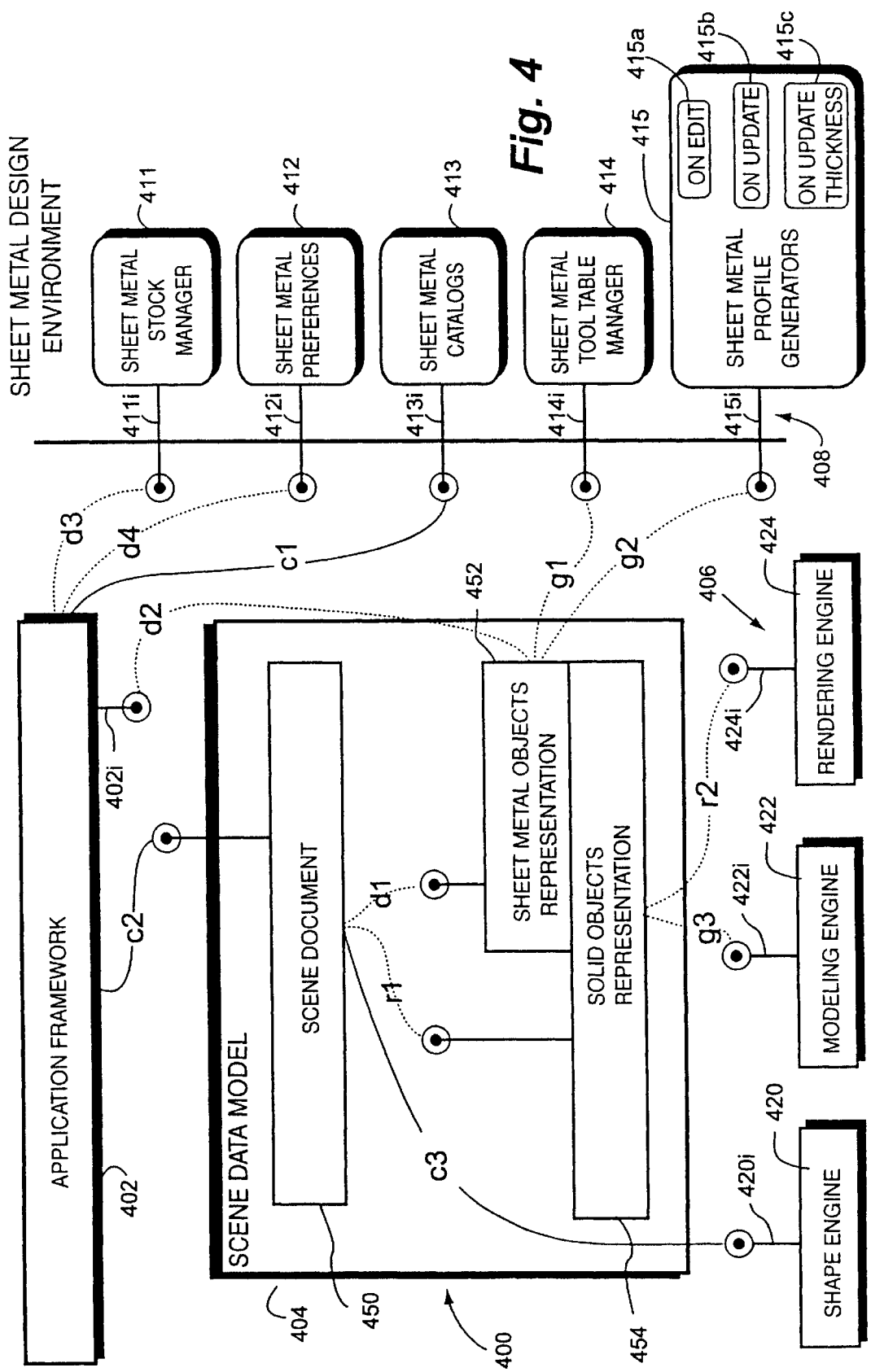
FIG. 4 is a schematic view of architecture of the three dimensional geometric modeling program of the invention.

Program 400 is stored on disk 172 and executed by microprocessor 162. An important aspect of program 400 is its ability to provide three dimensional geometric modeling for sheet metal. FIG. 4 shows an example architecture of program 400 according to one embodiment of the invention, with emphasis on the sheet metal aspects thereof. It should be understood that various architecture germane to non-sheet metal aspects of program 400 are not necessarily illustrated. Thus, program 400 includes an application (program) framework 402; a scene data model 404; a set 406 of engines; and a set 408 of software/data components that together define a virtual sheet metal fabrication facility.

The set 408 of software/data components included in program 400 comprise sheet metal stock manager component 411 (the "sheet metal stock manger"); sheet metal preferences component 412; sheet metal catalogs component 413 (the "sheet metal catalog"); sheet metal tool table manager component 414 ("sheet metal tool table manager"); and sheet metal profile generators component 415 ("sheet metal profile generators"). It is the sheet metal catalog 413 that is referenced by the sheet metal catalog tab in set 230 of catalogs (see FIG. 2).

The set 406 of engines includes shape engine 420; modeling engine 422; and rendering engine 424. As subsequently described herein, the shape engine 420 is invoked by scene document 450 to generate an in-memory instance of a sheet metal shape program object. The modeling engine 422 is invoked by a newly created sheet metal shape program object to construct, e.g., a B-rep and facets for the newly created sheet metal shape. The rendering engine 424 is invoked by the newly created sheet metal shape for displaying of the newly created sheet metal shape on the screen 200.

In FIG. 4, straight lines terminating with black circles represent software interfaces, each of which comprises one or more function calls. For example, each of components 411–415 have software interfaces 411*i*–415*i*; program framework 402 has software interface 402*i*; and engines 420, 422, and 424 have respective software interfaces 420*i*, 422*i*, and 424*i* (e.g., COM (Component Object Model) interfaces). In FIG. 4 the curved lines with hollow circles represent communication channels from one module to the interface of another module. Details of component object modeling and the operation of the COM Interfaces is understood by those skilled in the art, particularly with reference to such publications as Rogerson, Dale, *Inside COM* (Microsoft Press, 1997), ISBN 1-57231-349-8.

The scene data model 404 includes scene document 450; sheet metal objections representation 452; and, solid objects representation 454. In FIG. 4 the sheet metal objections representation 452 depicts functionality peculiar to sheet metal solid parts, while solid objects representation 454 depicts functionality common to all solid parts (e.g., functionality which sheet metal solid parts have in common with non-sheet metal solid parts). Each of the scene document 450, sheet metal objections representation 452, and solid objects representation 454 can comprise many executable objects (hereinafter referenced as "COM objects"). Each COM object is an executable object for its corresponding solid shape, and further communicates with the set 406 of engines using the COM Interfaces.

Returning now to the set 230 of catalogs, each of the solid shapes depicted by an icon in the catalogs of set 230 has a memory persistent program object which includes both executable code and a data structure. When the icon is selected and dragged into work space portion 240 of the screen (see FIG. 2), an in-memory instance of the program object is created by shape engine 420 (for interfacing with the scene document 450 [see FIG. 4]) to correspond to the solid object which the user is incorporating into the scene. As exemplified subsequently in more detail, the program objects for the solid shapes are of the type which have numerous components, each component being a combination of executable code and data structure. Illustrative types of such components include a solid shape component, an anchor component, a position component, a size box component, and a history component, as examples. These and other types of components are discussed in U.S. patent application Ser. No. 08/635,293, filed Apr. 19, 1996, entitled "Intelligent Shapes For Authoring Three-Dimensional Models", incorporated herein by reference.

Figure 2A:
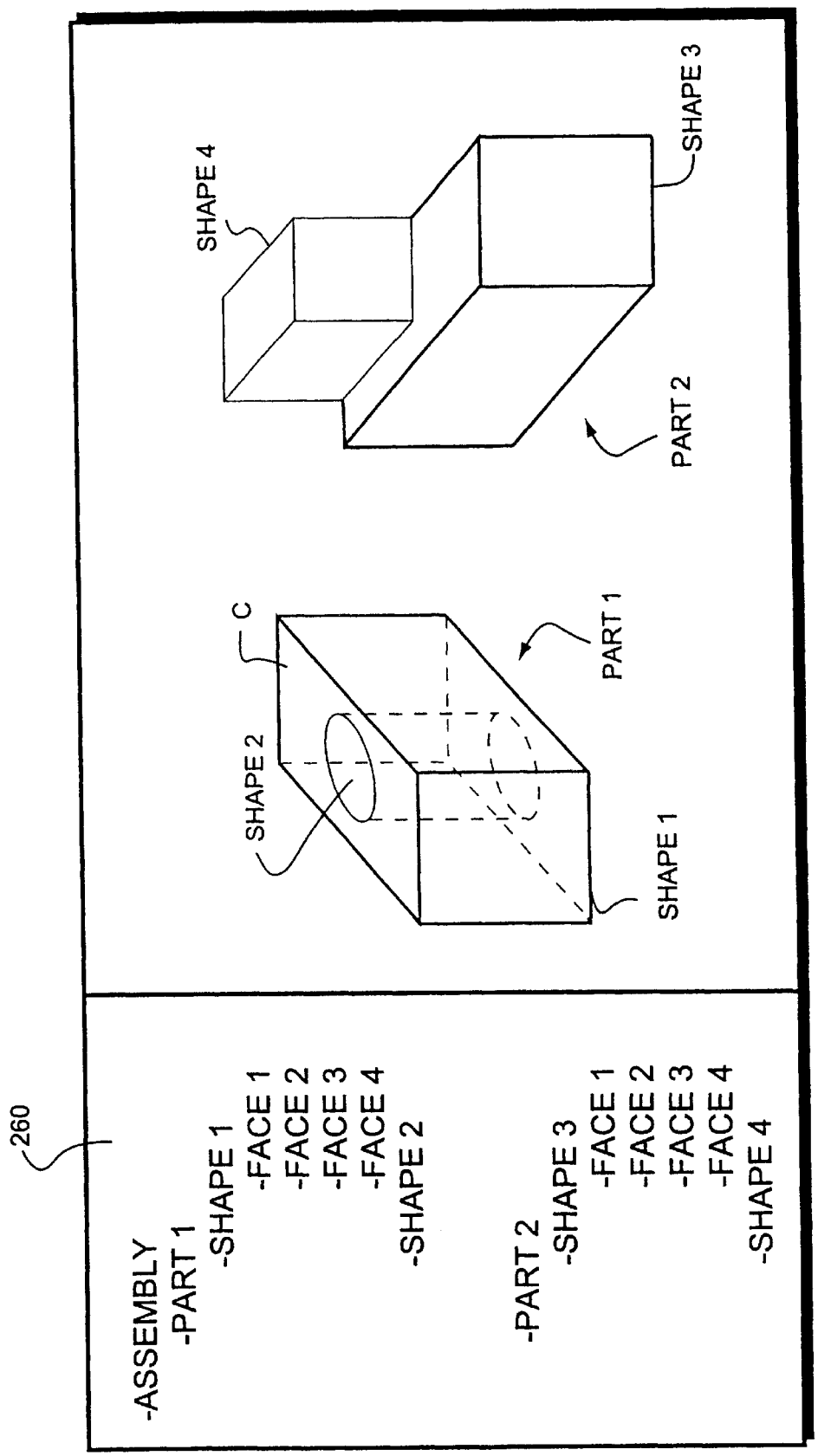
FIG. 2A is diagrammatic view showing a screen including displayed shapes and a scene browser which displays various shape editing levels.

An assembly is a collection of solid parts. The collection of solid parts need not be touching one another, but can have surfaces in contact (but the solid parts cannot intersect one another). The program 400 is structured to provide various levels of operation, including an assembly level, a part level, a shape level, and a face level. These hierarchical levels, also known as editing levels, are accessible in a drill-down manner, as illustrated in the scene browser 260 of FIG. 2A. For example, if the cursor is positioned over partl of FIG. 2A and the mouse is clicked once, the perimeter of the entire part is highlighted reflecting the part editing level. Upon a second click of the mouse, the particular solid shape (shape1) at which the cursor C is positioned is highlighted reflecting the shape editing level. Upon a third click of the mouse, the face of shape1 at which the cursor C is positioned is highlighted, reflecting the face editing level. Thus, in accordance with program 400, a part comprising plural solid shapes can be edited or modified on a part level of operation. Alternatively, the constituent solid shapes comprising the part can be edited on a shape level of operation.

SHEET METAL SOLID SHAPES

Figure 3:
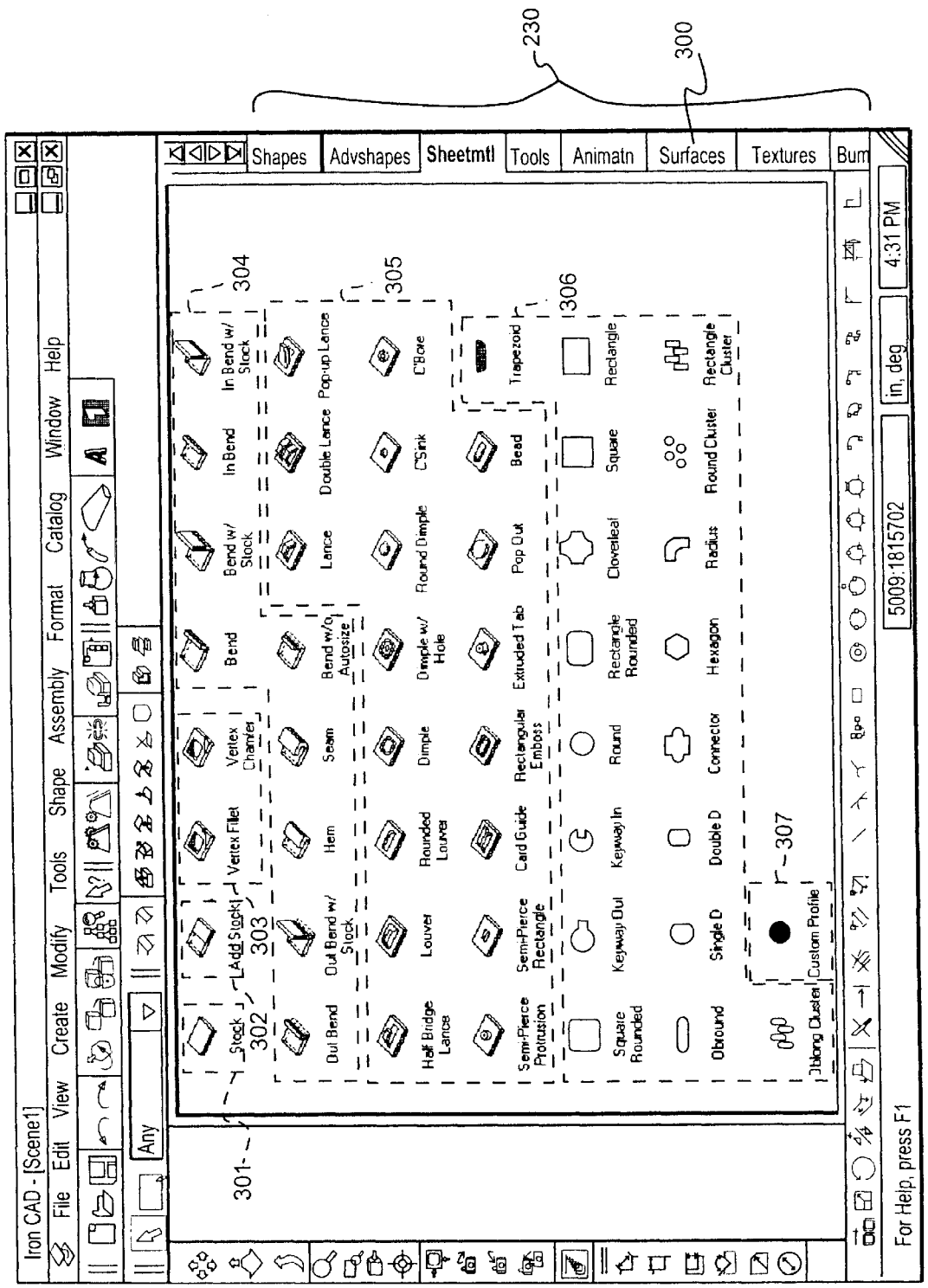
FIG. 3 is a diagrammatic view of groups of sheet metal shape icons included in a sheet metal catalog which can be opened from the screen of FIG. 2.

Of the catalogs shown in catalog set 230 on screen 200 of FIG. 2, of importance to the present invention is sheet metal catalog display 300, which is associated with sheet metal catalog 413 (see FIG. 4). When a tab for sheet metal catalog display 300 is selected for opening, the user can scroll through the icons of sheet metal catalog display 300. The icons of sheet metal catalog display 300 are divided into seven groups of sheet metal solid shape icons. The sheet metal shape icons of sheet metal catalog display 300 are shown in FIG. 3. Although not illustrated as such in FIG. 3, when displayed on screen 200 each group of sheet metal solid shapes icons can have a distinctive color.

Figure 3A:
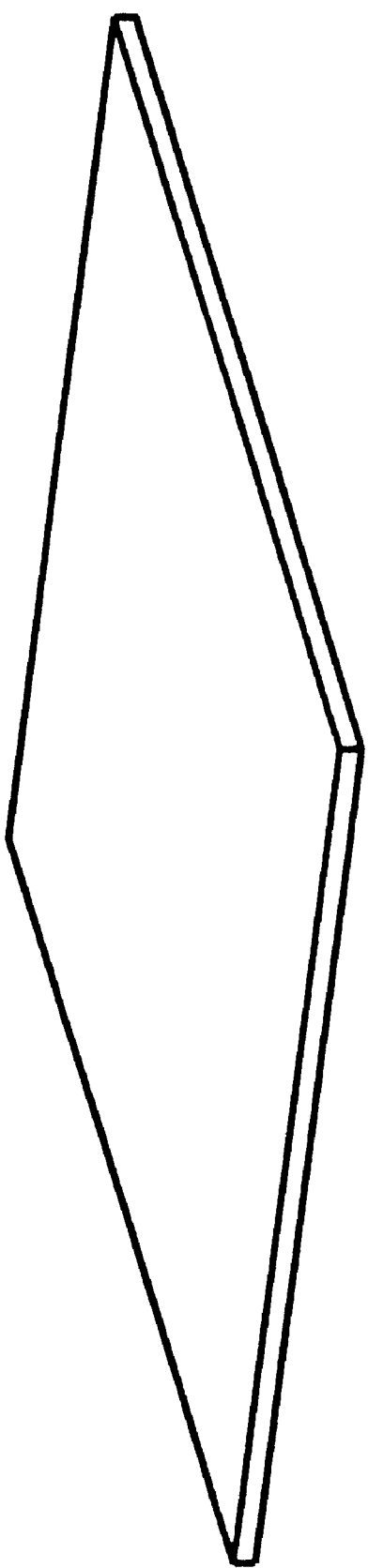
FIG. 3A is a diagrammatic view of a foundational sheet metal stock shape.

A first group of sheet metal solid shapes icons (framed by broken line 301 in FIG. 3) depicts a stock shape. There is only one icon in stock shape group 301. The stock shape icon depicts the stock shape which is the base or foundation to which other sheet metal solid shapes are added to create an initial design. The foundational stock shape is shown in FIG. 3A.

A second group of sheet metal solid shapes icons (framed by broken line 302 in FIG. 3) depicts stock add-on shapes. The stock add-on shapes are solid shapes which can be added to stock shapes, to other stock add-on shapes, and to bend shapes (to extend bend shapes). The add-on stock shapes can be added to existing sheet metal solid shapes, and are automatically sized to match the width/length of the surface to which it is added.

A third group of sheet metal solid shapes icons (framed by broken line 303 in FIG. 3) depicts vertex shapes. Vertex shapes are used to create fillets or chamfer on 90 degree corners of flat stock. Thus, vertex shapes in group 303 are either fillets or chamfers. These shapes are added to ninety degree corners on flat stock to create rounded or chamfered corners and have intelligence to add material to inside corners and remove material from outside corners.

A fourth group of sheet metal solid shapes icons (framed by broken line 304 in FIG. 3) depicts bend shapes. Bend shapes are added where flat stock requires a bend. There are three basic types of bend shapes: hem, seam, and basic bend. The hem bend solid shape adds a bend with an 180-degree angle and a radius of zero. The seam bend solid shape adds a bend with a 180-degree angle and a radius equal to the thickness of the stock material. A basic bend solid shape has a 90-degree angle and a minimum bend radius of the part. As explained below, program 400 provides a wide selection of variations on these three basic types of bend shapes.

A first variation type for a bend solid shape is that program 400 offers a "with stock" ("W/stock") or "add flange" option for the three basic types of bend solid shape. Whether or not the "with stock" option is selected, selection of a hem, seam, or basic bend solid shape also adds a segment or flange of stock to both ends of the incoming bend solid shape. However, selecting the "with stock" option permits the bend and the stock added to the ends of the bend to be edited independently of one another at the shape editing level (otherwise, if the "with stock" option is not selected, the stock and bend are considered as one shape and therefore not selected/edited independently at the shape editing level).

As a second variation type, the basic bend shape can have a "In Bend", "Out Bend", or "Non-Trim Bend" option. In accordance with the "Out Bend" option, the bend solid shape is trimmed back to the stock S to which it is added to allow the bend's outside surface to align with the original position of the end surface of the stock S. FIG. 3B(1) shows the stock S prior to addition of the "Out Bend" bend solid shape; FIG. 3B(2) shows the stock S after addition of the "Out Bend" bend solid shape. In the "In Bend" option, the bend shape trims back the stock S to which it is added to allow the bend's inside surface to align with the original position of the end surface of the stock S. FIG. 3C(1) shows the stock S prior to addition of the "In Bend" bend solid shape; FIG. 3C(2) shows the stock S after addition of the "In Bend" bend solid shape. In the "Non-Trim Bend" option, the bend shape is added to stock S without trimming it back. FIG. 3D(1) shows the stock S prior to addition of the "Non-Trim Bend" bend solid shape; FIG. 3D(2) shows the stock S after addition of the "Non-Trim Bend" bend solid shape.

A fifth group of sheet metal solid shapes icons (framed by broken line 305 in FIG. 3) depicts form shapes (e.g., stamp shapes). Stamp or form shapes represent manufacturing operations that deform stock.

A sixth group of sheet metal solid shapes icons (framed by broken line 306 in FIG. 3 and having blue colored icons on screen 200) depicts punch shapes. Punch shapes represent manufacturing operations that remove stock.

A seventh group of sheet metal solid shapes icons (framed by broken line 307 in FIG. 3 and having a dark blue colored icon on screen 200) depicts a custom profile shape. There is only one icon in group 307, a custom punch shape being defined by the user once it is dropped on a part/shape. For the custom punch shape in group 307, the user has the opportunity to interact creatively with the profile. That is, the user has direct access to all curves that make up the profile, so that the user can edit the profile curves using two dimensional tools provided by program 400.

The sheet metal solid shapes the sheet metal catalog are accessed in the same manner as other items in other catalogs, e.g., by clicking on the desired icon, dragging the solid shape depicted by the icon into the scene, and releasing ("dropping") the sheet metal solid shape in the desired location. As mentioned above, this creates an instance of the program object of the sheet metal solid shape. As explained hereinafter, however, how a sheet metal solid shape drops and drags differs from other types of solid shapes from other catalogs.

In addition to providing the sheet metal catalog display 300, the program 400 also provides and utilizes several editing handles and editing buttons for sheet metal solid shapes. Examples of these sheet metal editing handles and editing buttons are listed as follows: (1) editing handles at the part level for parts that include bend shapes; (2) sizebox handles for stock and vertex shapes; (3) shape editing handles for stock, vertex, and bend shapes; (4) relief handles/buttons for bend shapes; (5) sizing buttons for editing stamp and punch shapes. Each of these editing handles and editing buttons for sheet metal solid shapes is discussed subsequently.

PROGRAM OBJECT STRUCTURE FOR SHEET METAL SOLID SHAPE

The program 400 of the present invention accomplishes the dragging and dropping of sheet metal solid shapes in a different manner than for non-sheet metal solid shapes. For non-sheet metal solid shapes the drag and drop operations are essentially uniform. Each solid shape has a program object which includes both executable code and a data structure. Non-sheet metal solid shapes can invoke (e.g., by function calls) a common routine or procedure which handles drag and drop operations generically for all non-sheet metal solid shapes. Hereafter, this common routine which handles drag and drop operations for non-sheet metal solid shapes is termed the generic drag/drop routine 502.

The sheet metal solid shapes are of four fundamentally diverse types—flat stock, bend stock, punch, and form shape stock. Each of these four fundamentally diverse types has different orientation rules and different sizing rules in view of the differing functions and purposes of the types. Therefore, rather than utilize the generic drag/drop routine 502, as explained below program 400 of the present invention adopts a different approach for dragging and dropping of sheet metal solid shapes.

Figure 7A:
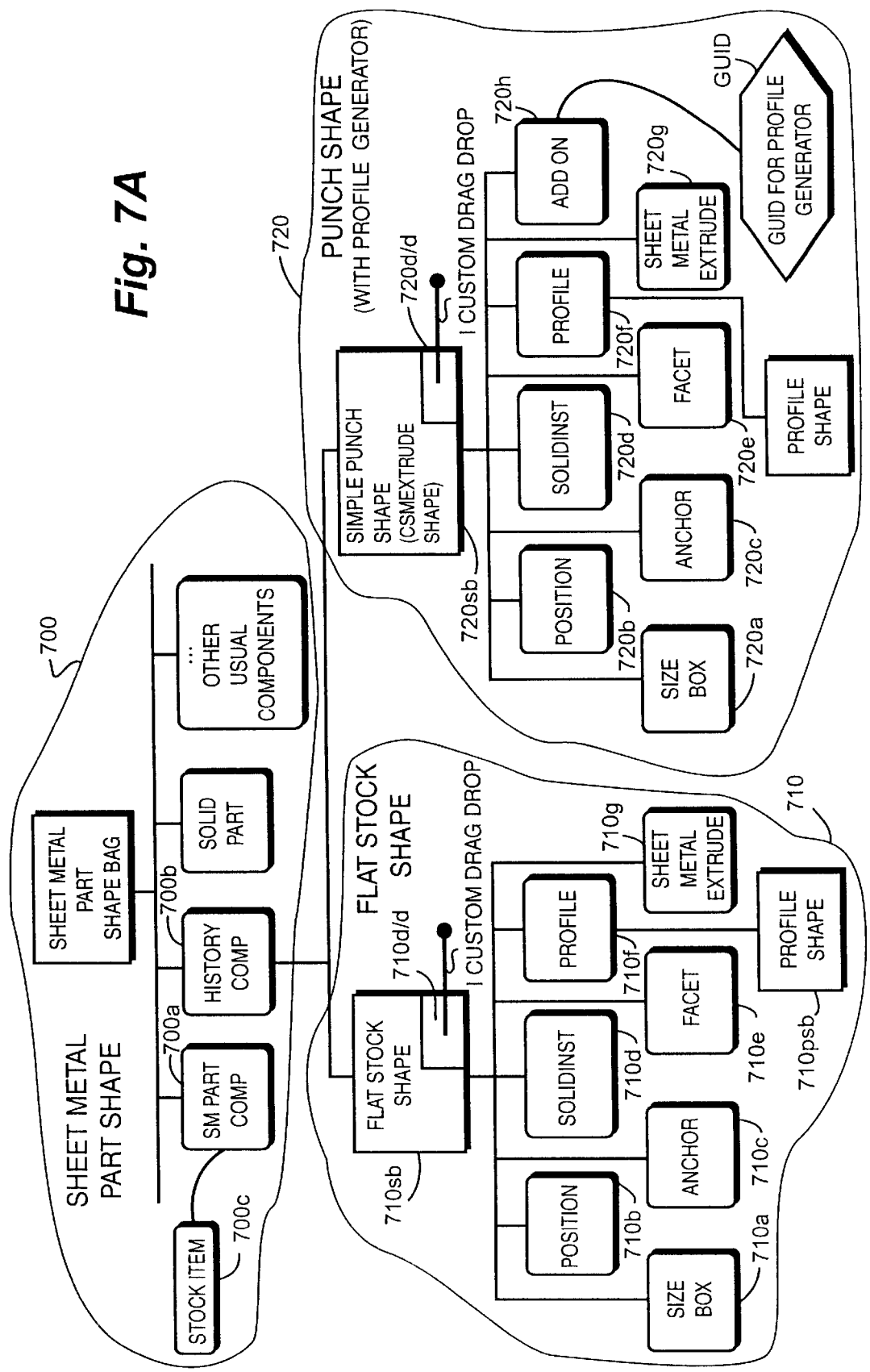
FIG. 7A is a diagrammatic view showing an illustrative CSG tree for an example sheet metal solid part, including a flat stock shape and a punch shape.

In order to understand how program 400 handles dragging and dropping operations for sheet metal solid shapes, one needs first to understand basics of the program object structure for a sheet metal solid shape. FIG. 7A shows a CSG tree for a compound sheet metal solid shape 700 (compound shape), which also can be termed a sheet metal solid part. The solid part 700 is formed from primitive solid shapes shown in FIG. 7A, particularly a flat stock shape 710 and a simple punch shape 720. The program objects for each solid shape of FIG. 7A have a shape bag and several components. As employed herein, a "shape bag" is a program object that holds onto (e.g., has a memory pointer) to an interface for components utilized for the solid shape. Only selected components of the program objects for each of the shapes 700, 710, and 720 are shown in FIG. 7A, it being understood that other components may also exist.

The program object for solid shape 700 of FIG. 7A has a sheet metal part component 700a and a history component 700b. The sheet metal part component 700a has data or a pointer to data pertaining to sheet metal specific properties, one such property being the stock item 700c. The sheet metal solid shape component contains boundary-representation ("B-rep") data, and for punch shapes and form shapes has references to appropriate tables and associated data. The stock item 700c is an object that contains information pertaining, e.g., to thickness and type (e.g., information corresponding to default values obtained from sheet metal stock manger 411).

The program object for flat stock shape 710 is shown in FIG. 7A as having a flat stock shape bag 710sb and the following components: size box component 710a; position component 710b; anchor component 710c; SolidInst component 710d; facet component 710e; profile component 710f; and sheet metal extrude component 710g. The profile component 710f is connected to a profile shape bag 710psb (which holds onto other unillustrated components). The program object for punch shape 720 is shown in FIG. 7 as having a simple punch shape bag 720sb and the following components: size box component 720a; position component 720b; anchor component 720c; SolidInst component 720d; facet component 720e; profile component 720f; sheet metal extrude component 720g; and add-on component 720h. Various of these components are explained in U.S. patent application Ser. No. 08/635,293, filed Apr. 19, 1996, entitled "Intelligent Shapes For Authoring Three-Dimensional Models", incorporated herein by reference. The add-on component 720h establishes a hook (e.g., pointer) or interface to a globally unique identifier (GUID) for a particular sheet metal profile generator 415. That is, the globally unique identifier (GUID) is a holder for the particular sheet metal profile generator 415 which is utilized for the solid shape.

The flat stock shape bag 710sb and the simple punch shape bag 720sb both have a ICustomDragDrop section. The ICustomDragDrop section for flat stock shape bag 710sb is depicted as 710d/d in FIG. 7A, while the ICustomDragDrop section for simple punch shape bag 720sb is depicted as 720d/d in FIG. 7A. As described hereinafter, the presence of ICustomDragDrop interfaces indicate that the shapes are not to use the generic generic drag/drop routine 502, but instead use the customized drag/drop routines described herein.

Figure 7B:
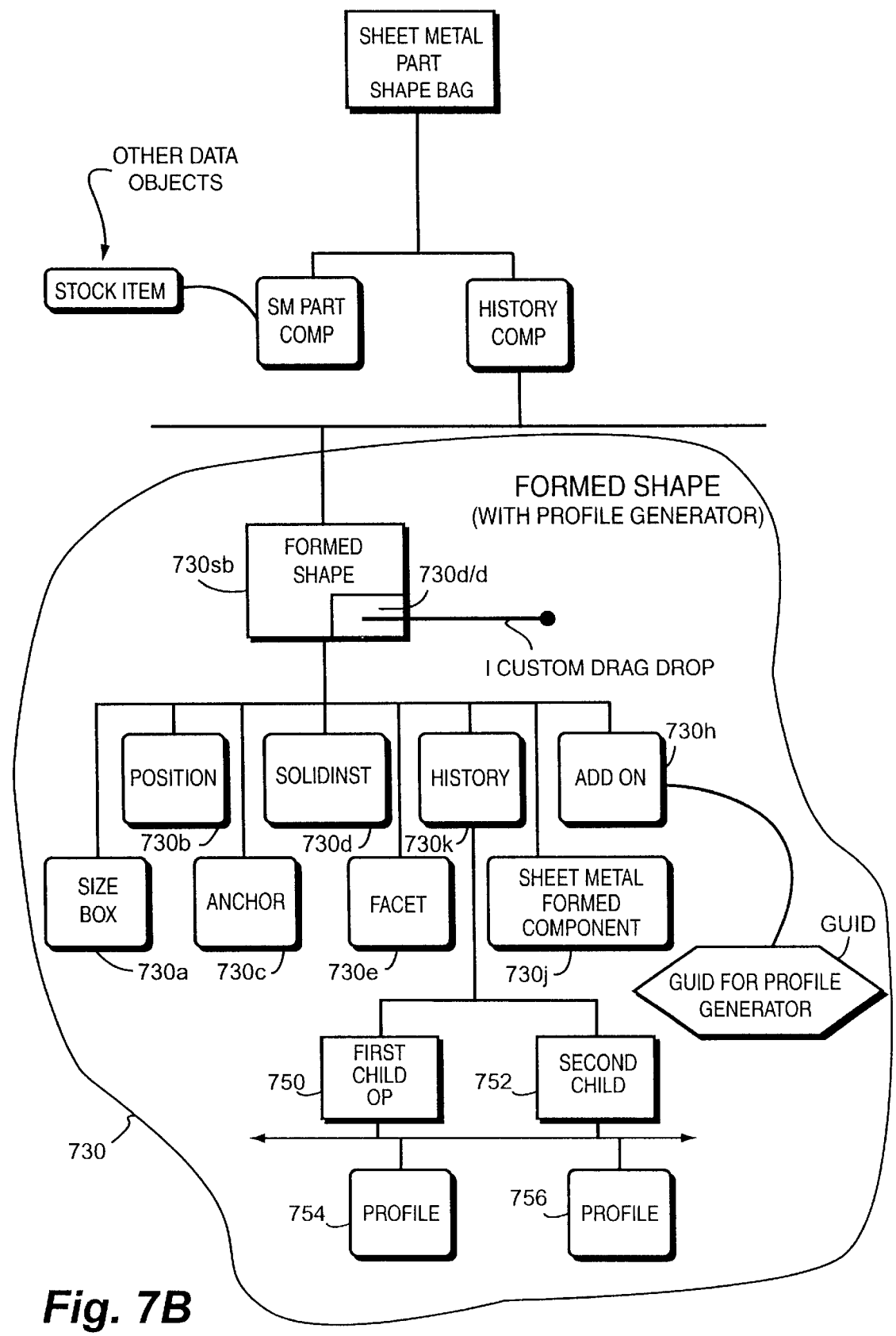
FIG. 7B is a diagrammatic view showing an illustrative CSG tree for an example sheet metal solid part including a formed shape.
Figure 7C:
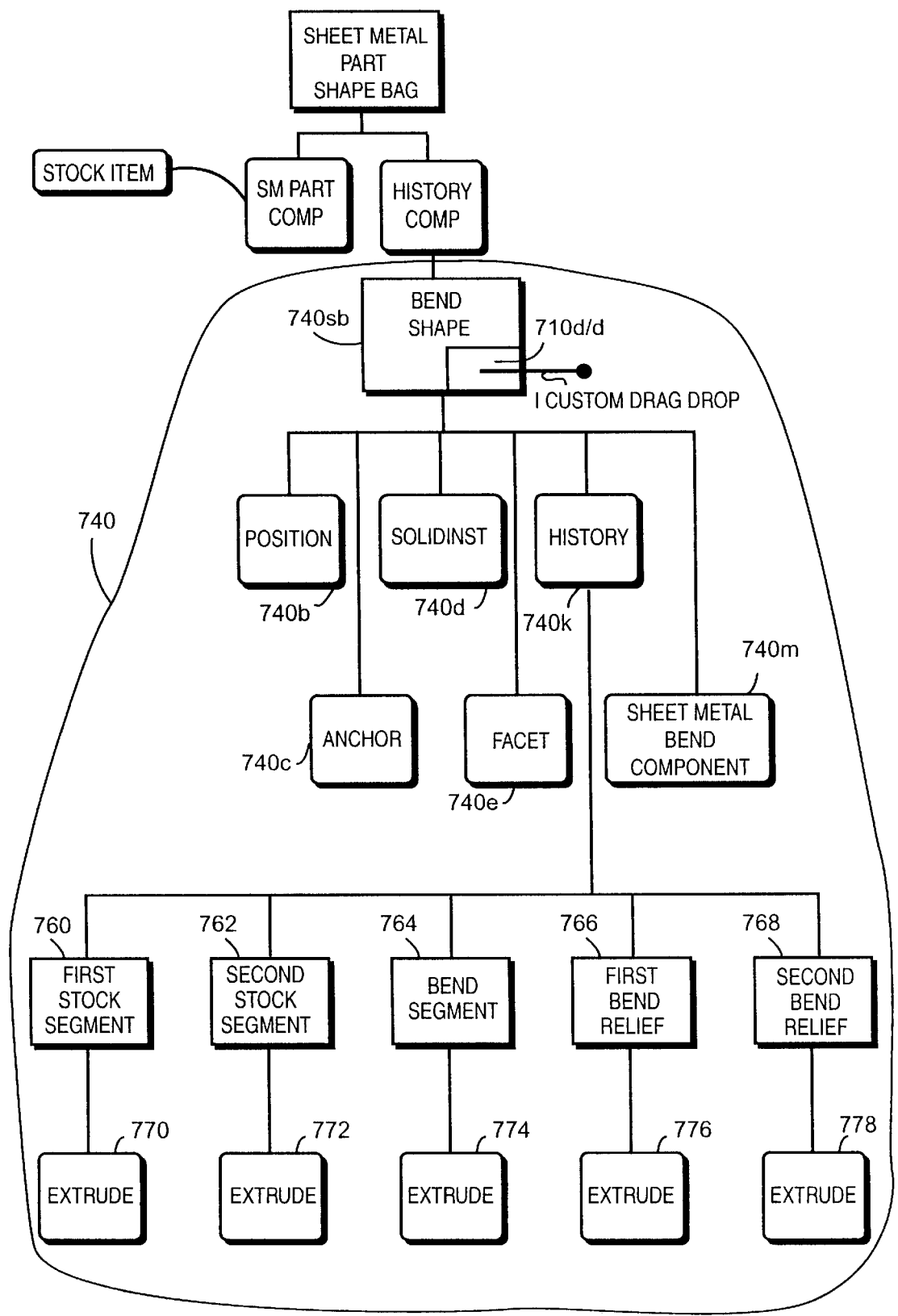
FIG. 7C is a diagrammatic view showing an illustrative CSG tree for an example sheet metal solid part including a bend shape.

The example sheet metal solid shape part 700 of FIG. 7A is shown only as including the flat stock shape 710 and the punch shape 720. However, it should be understood that sheet metal solid parts can include many sheet metal solid shapes, including types of sheet metal solid shapes other than flat stock shapes and punch shapes. For an illustration of the composition of program objects of other types of sheet metal solid shapes, see FIG. 7B and FIG. 7C. FIG. 7B particularly illustrates the program object for a formed shape 730; FIG. 7C particularly illustrates the program object for a bend shape 740.

The program object for formed shape 730 is shown in FIG. 7B as having components 730a–730j which are understood with reference to FIG. 7A. In addition to having various components similar to the components of the previously-described solid shape program objects, the program object for the formed shape of FIG. 7B includes formed shape bag 730sb, sheet metal formed component 720j, and a history component 720k. The formed shape bag 730sb is a sheet metal formed shape has an ICustomDragDrop section 730d/d.

Form solid shapes usually comprise plural child shapes, which means that form solid shapes require plural profiles and a history evaluation. Therefore, [in similar manner as understood with reference to history component 700b of FIG. 7A] the history component 720k of the formed shape program object 720 has a CSG tree. Included in the CSG tree of history component 720k are a shape bag 750 for a first child shape and a shape bag 752 for a second child shape. The first child shape (having shape bag 750) has a first child profile component 754 and the second child shape (having shape bag 752) has a second child profile component 756.

The program object for formed shape 740 is shown in FIG. 7C as having components 740b–740m which are understood with reference to FIG. 7A. In addition to having various components similar to the components of the previously-described solid shape program objects, the program object for the bend shape of FIG. 7C includes bend shape bag 740sb, sheet metal bend component 740m, and a history component 740k. The bend shape shape bag 740sb is a sheet metal bend shape and an ICustomDragDrop section 740d/d.

The history component 740m of the bend shape program object 740 has a CSG tree. Included in the CSG tree of history component 740m are shape bags for first stock segment 760; second stock segment 762; bend segment 764; first bend relief 766; and second bend relief 768. Each of the shape bags has a corresponding one of extrude components 770, 772, 774, 776, and 778 shown in FIG. 7C.

Each of the program objects for the flat stock shape 710 [see FIG. 7A], punch shape 720 [see FIG. 7A], form shape 730 [see FIG. 7B], and bend shape 740 [see FIG. 7C] include a customized drag and drop (d/d) instruction section and an associated interface ICustomDragDrop. In this regard, the program object for flat stock shape 710 has drag and drop (did) instruction section 710d/d; the program object for punch shape 720 has drag and drop (d/d) instruction section 720d/d; the program object for form shape 730 has drag and drop (d/d) instruction section 730d/d; and, the program object for bend shape 740 has drag and drop (d/d) instruction section 740d/d. Each drag and drop (d/d) instruction section is a customized structured block of memory having code for governing the peculiar drag and drop operations for the respective type of sheet metal solid shape. Therefore, unlike other solid shapes which utilize generic drag/drop routine 502, the sheet metal solid shapes of the present invention carry their own drag and drop code. That is, the sheet metal solid shapes of the present invention have program objects which include customized drag and drop instructions. Moreover, the drag and drop instruction sections each have a corresponding interface for acquiring from the environment the information that is necessary for executing the drag and drop instructions of the drag and drop section. The interfaces for these customized drag and drop instructions are shown as ICustomDragDrop and are collectively referred to herein as the customized drag/drop interface or the application-specific interface. Provision of this special customized drag/drop interface, which is specially invoked by a sheet metal solid shape program object, allows the sheet metal solid shape to override generic drag and drop behavior rules (e.g., generic drag/drop routine 502) that apply to other solid shapes, and instead to implement its own customized drag and drop behavior.

The program objects for the flat stock shape 710 [see FIG. 7A], punch shape 720 [see FIG. 7A], form shape 730 [see FIG. 7B], and bend shape 740 [see FIG. 7C] are examples of COM objects that can be stored in the scene data model of FIG. 4. Aspects (e.g., components) of these program objects which are peculiar or distinctive for sheet metal functionality (e.g., the sheet metal extrude components) are conceptualized as being in sheet metal objections representation 452, while other components not specific to sheet metal functionality are conceptualized as being in solid objects representation 454.

SETTING DEFAULT VALUES

Figure 5:
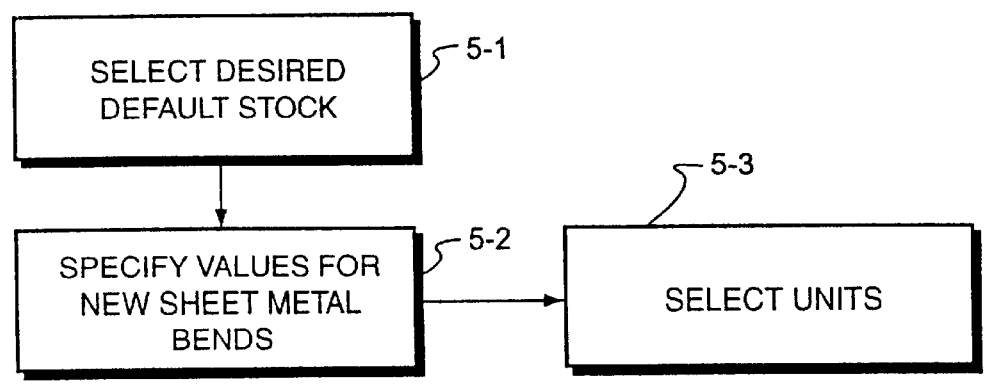
FIG. 5 is a flowchart showing basic steps involved in a default set up operation of the three dimensional geometric modeling program of the invention.
Figure 5A:
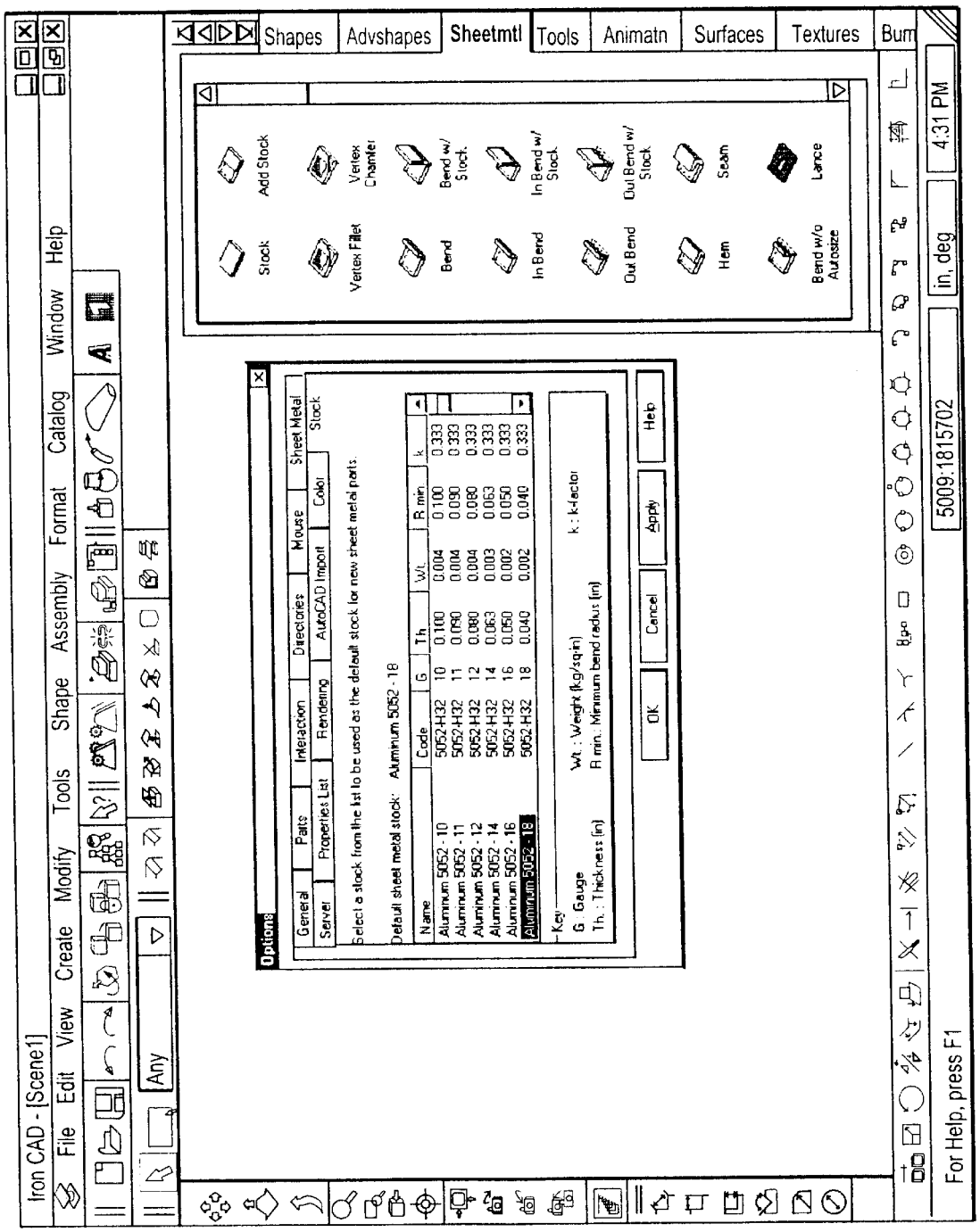
FIG. 5A is a diagrammatic view showing a sheet metal stock list as appears in a default set up operation of the three dimensional geometric modeling program of the invention.

At appropriate times, such as in advance of creating a scene or assembly, the program 400 enables a user to set up certain sheet metal default values in sheet metal stock manger 411 (see FIG. 4). Basic steps involved in the operation of program 400 concerning the set up of default values are shown in FIG. 5. In step 5-1 the program 400 permits the user to select a desired default sheet metal stock. This is done by going to the tools menu in screen 200 (see FIG. 2), and in the tools menu selecting "Options" to obtain an Options Display as shown in FIG. 5A. In the Options Display, the user selects the tab "Stock Properties". As a result, a sheet metal stock list, such as that shown in FIG. 5A, is then displayed in the tool options display. The sheet metal stock list contains the available stock types included in program 400 with the current default type highlighted. The user can employ the scroll bar to browse the list and select an appropriate stock type for the user's purposes.

Figure 5B:
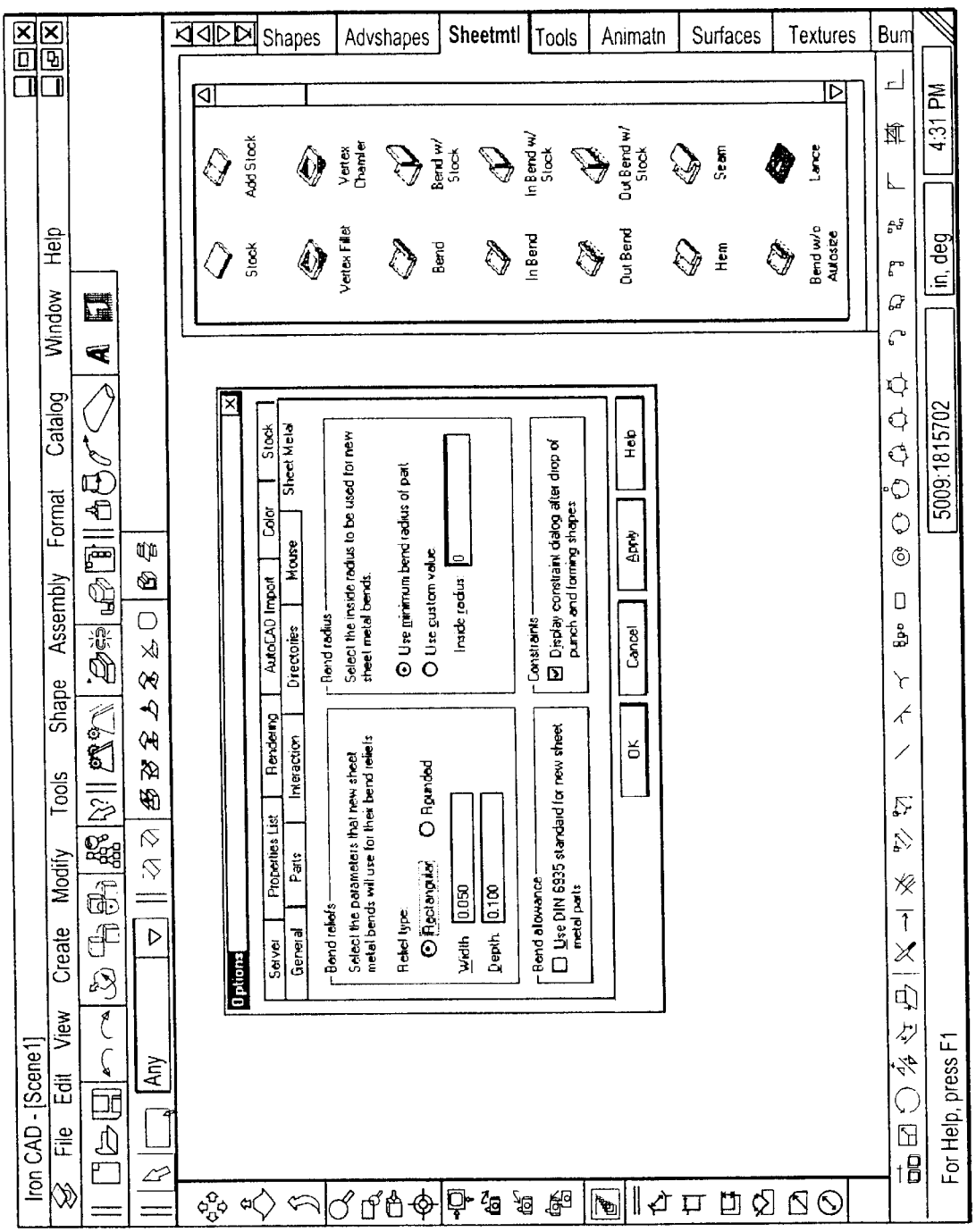
FIG. 5B is a diagrammatic view showing a display of the properties options in a default set up operation of the three dimensional geometric modeling program of the invention.

As step 5-2 of the default set up procedure, the user specifies values for new sheet metal bends. Step 5-2 is commenced by the user selecting the sheet metal tab under the tool options display (see FIG. 5A). Selecting the sheet metal tab results in the display of FIG. 5B allows the user to specify the type, width, and depth that new sheet metal bend solid shapes will use for their reliefs.

As part of the default set up procedure, and as depicted at step 5-3, the user can selects units. From the format menu, the user selects the "Units" option. This results in a units dialog box being displayed which allows the user to input the units of such parameters as length, angle, mass.

CREATING A SHEET METAL PART

Figure 6:
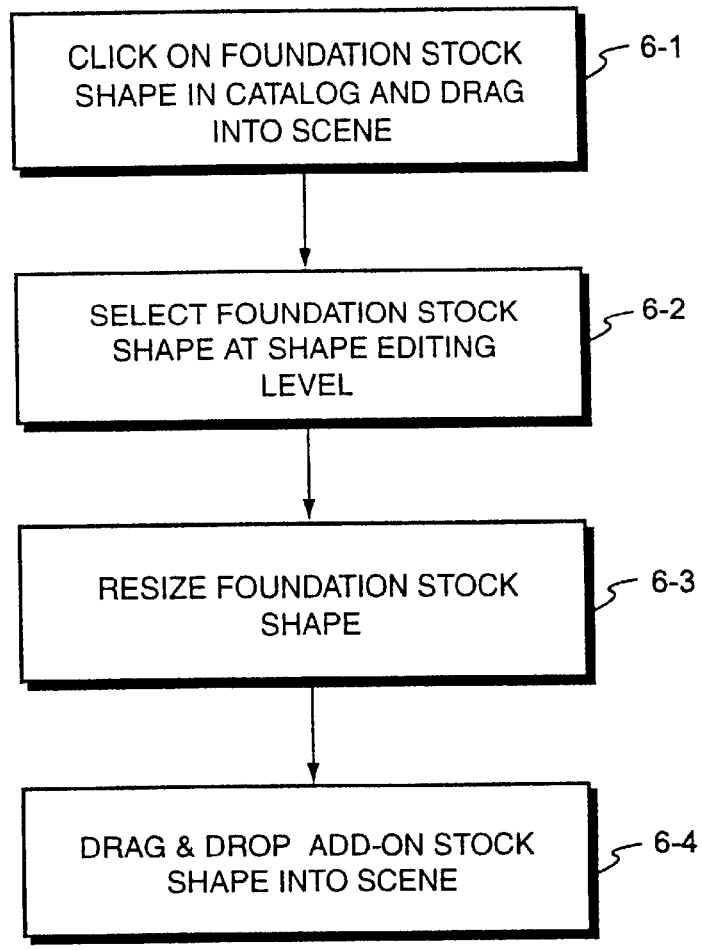
FIG. 6 is a flowchart showing basic steps involved in creation of a sheet metal solid part using the three dimensional geometric modeling program of the invention.
Figure 8:
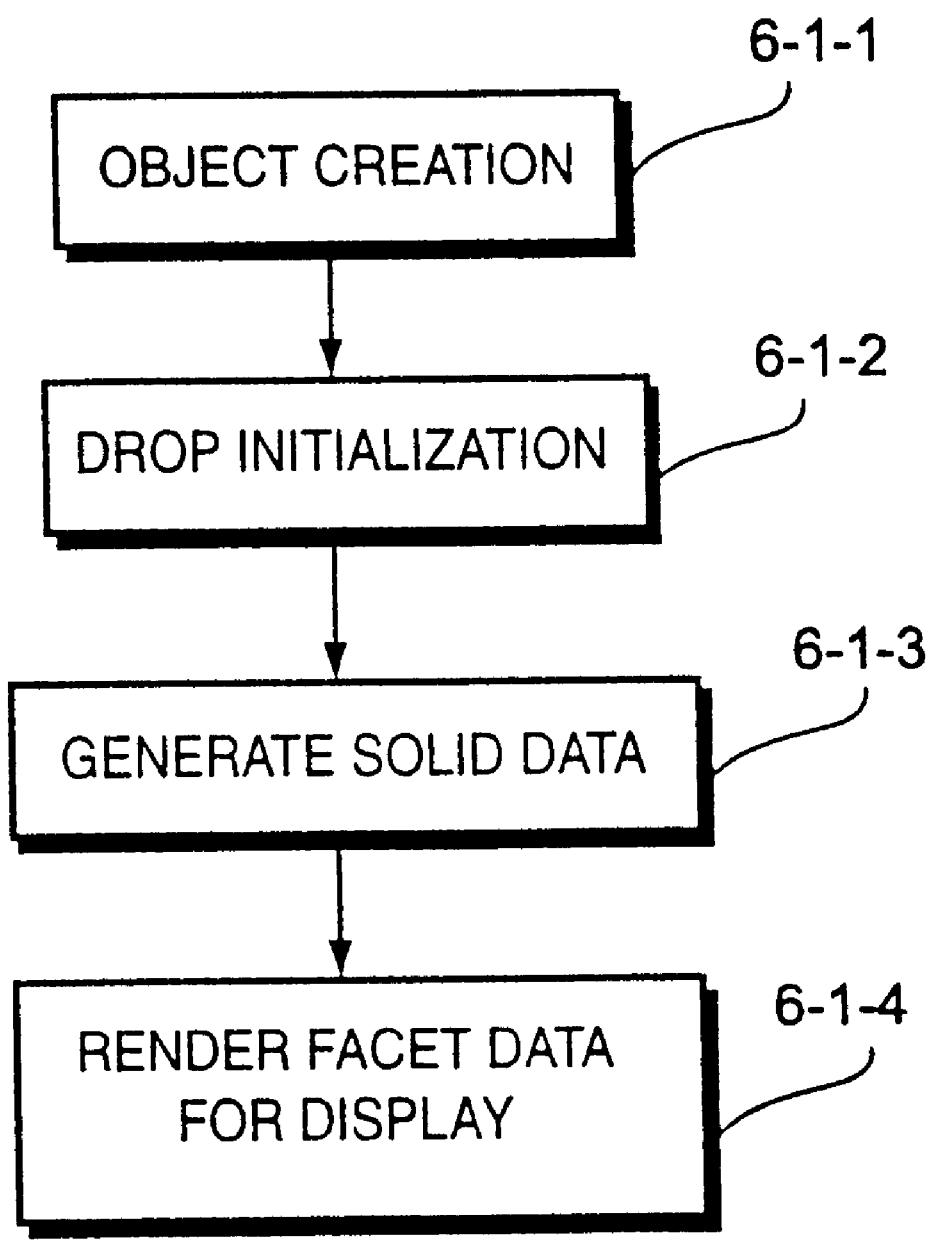
FIG. 8 is a flowchart showing selected sub-steps involved in a step of FIG. 6 concerning selecting, dragging and dropping of a sheet metal shape.
Figure 8A:
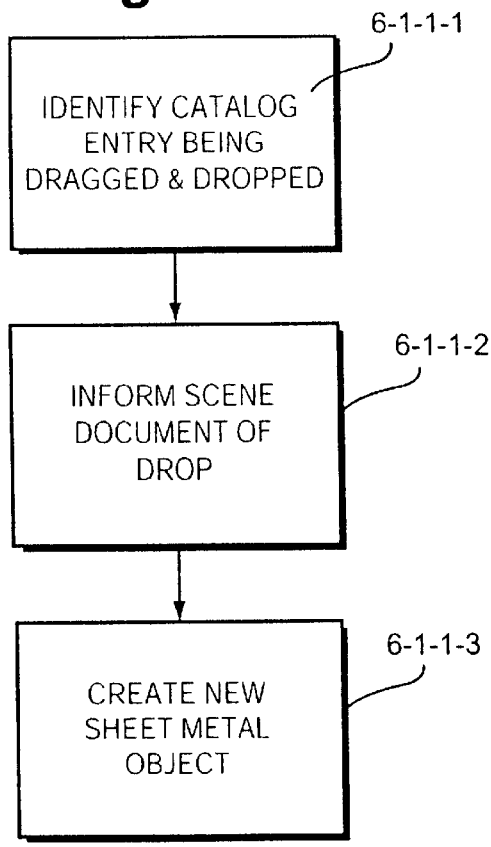
FIG. 8A–FIG. 8D are flowcharts showing selected sub-steps of the sub-steps of FIG. 8.

After the default value set up operation of FIG. 5 has been completed, the user can create a sheet metal solid part using, e.g., sheet metal catalog display 300 of program 400. The sheet metal part may comprise several sheet metal solid shapes. FIG. 6 shows the basic steps involved in creation of a simple sheet metal solid part in accordance with program 400; FIG. 8 shows sub-steps of step 6-1 of FIG. 6, with FIG. 8A–FIG. 8D in turn showing sub-steps of the sub-steps of FIG. 8.

At step 6-1, the user clicks on the foundation sheet metal solid stock shape in sheet metal catalog display 300 and drags and drops the foundation stock shape into the scene on screen 200. The foundation stock shape was illustrated previously in FIG. 3A. Sub-steps involved in the clicking, then dragging and dropping of any sheet metal shape, such as foundation stock shape, are illustrated in FIG. 8, and are understood with reference to the communication channels of FIG. 4.

A first basic sub-step of the step 6-1 (i.e., the step of clicking, then dragging and triggering of the dropping [e.g., by user interaction with the mouse] of the sheet metal shape) is creation of an in-memory instance of the sheet metal object corresponding to the selected icon in sheet metal catalog display 300, as depicted as step 6-1-1 in FIG. 8. Sub-steps of object creation are illustrated further in FIG. 8A. In this regard, at step 6-1-1-1, using communication channel c1 (see FIG. 4) the program framework 402 identifies the catalog entry in sheet metal catalog 413 (corresponding to an icon in sheet metal catalog display 300) which has been selected. As step 6-1-1-2, using communication channel c2 the program framework 402 informs scene document 450 of the user's intent to drop the selected sheet metal shape onto screen 200. As step 6-1-1-3, using communication channel c3 the scene document 450 requests the shape engine 420 to create a new sheet metal object corresponding to the selected icon, i.e., the in-memory instance of the program object. The in-memory instance of the newly created program object, hereinafter referenced as the newly created sheet metal shape, is included in the sheet metal objections representation 452 shown in FIG. 4.

Figure 8B:
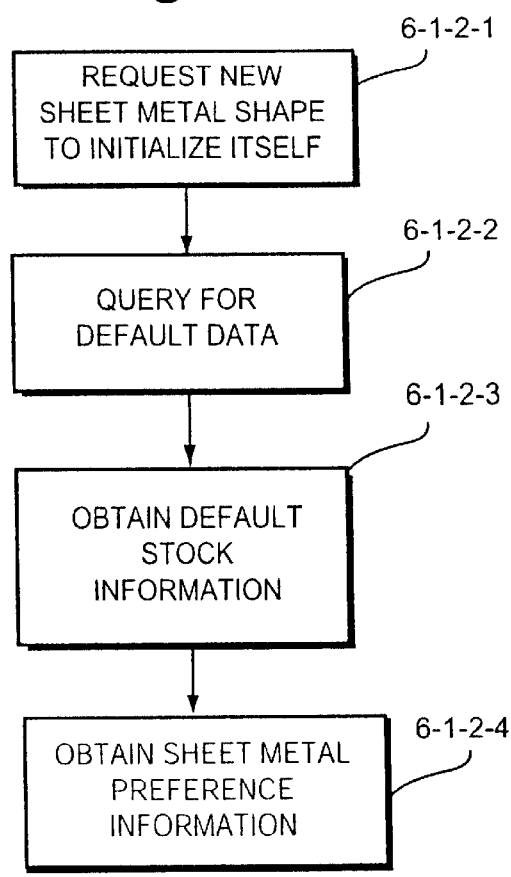

Step 6-1 also involves drop initialization substep 6-1-2 of FIG. 8, the basic sub-steps of which are described in FIG. 8B. The drop initialization substep 6-1-2 utilizes various drop initialization communication channels shown in FIG. 4. In this regard, and as shown in more detail as step 6-1-2-1 in FIG. 8B, using communication channel d1 the scene document 450 requests that the newly created sheet metal shape initialize itself.

Figure 9:
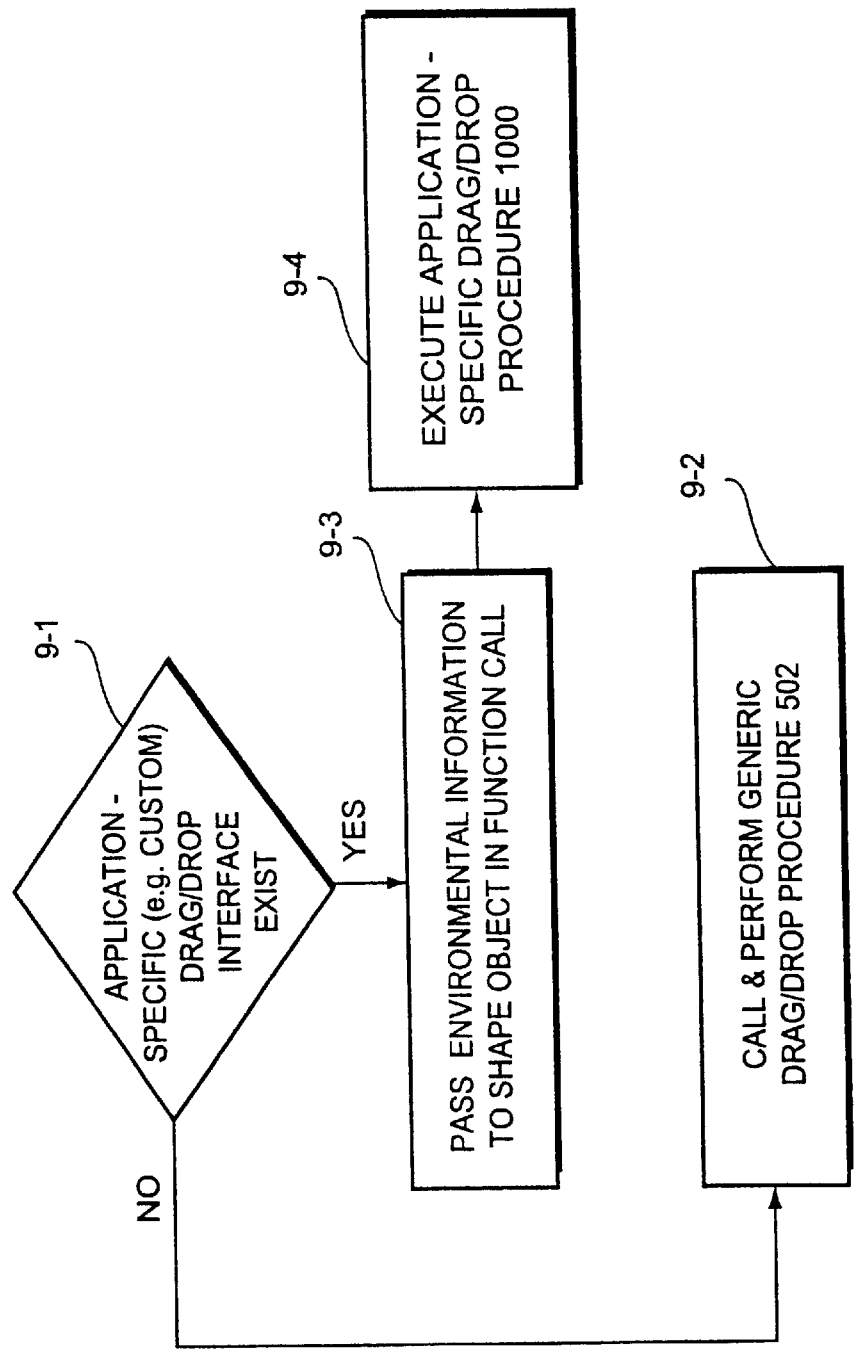
FIG. 9 is a flowchart showing basic steps included in a drop initialization step of the three dimensional geometric modeling program of the invention.

The initialization of step 6-1-2-1 further includes some of the actions of FIG. 9, and particularly the action of checking (at action 9-1) whether an application-specific drag/drop interface exists for the solid shape. For example, at action 9-1 a check is made whether the solid shape has the ICustomDragDrop interface (such as that shown in FIG. 7A, FIG. 7B, and FIG. 7C). The sheet metal solid shapes of the present invention all have the ICustomDragDrop interface (see the flat stock solid shape 710 and the punch shape 720 in FIG. 7A, the formed shape in FIG. 7B, and the bend shape in FIG. 7C).

Figure 9A:
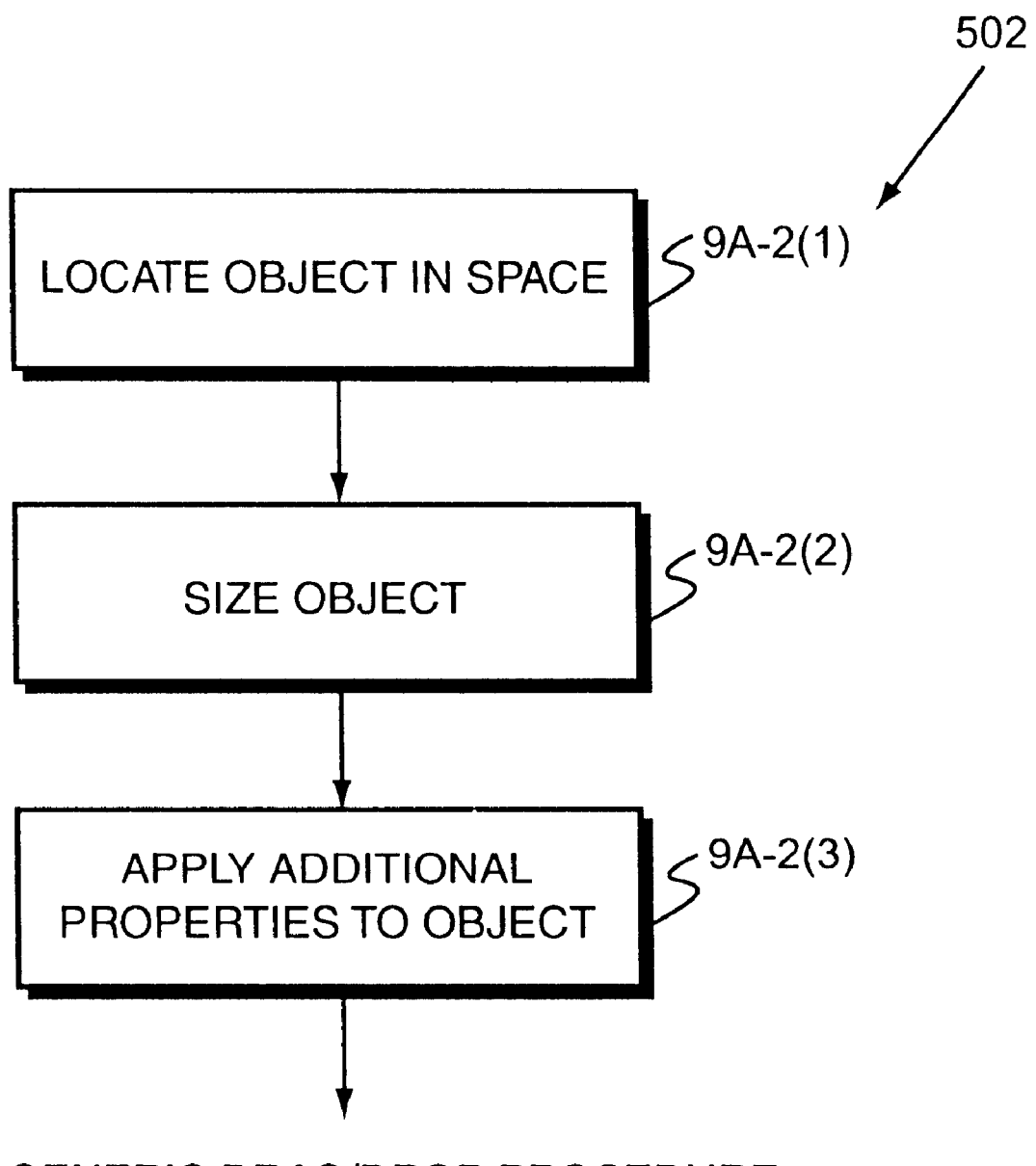
FIG. 9A is a flowchart showing basic steps forming part of a generic drag and drop procedure included in the three dimensional geometric modeling program of the invention.

If the application-specific drag/drop interface does not exist for the solid shape, then the generic drag/drop routine 502 is utilized (as indicated by step 9-2 in FIG. 9). Actions included in the generic drag/drop routine 502 are depicted in FIG. 9A. At step 9A-2(1), generic drag/drop routine 502 locates the solid shape in space as the solid shape is being dragged into the work space 240 of screen 200. Locating the solid shape in space involves determining where the anchor of the solid shape is to affix. At step 9A-2(2) generic drag/drop routine 502 enables the user to size the solid shape, much in the manner herein described with reference to sizebox and shape handles and dialogue boxes. Then, at step 9A-2(3), generic drag/drop routine 502 enables the user to apply additional properties to the solid shape.

When the application-specific drag/drop interface does exist for the solid shape, then actions 9-3 and 9-4 of FIG. 9 are performed for the solid shape. As action 9-3, program 400 passes environmental information over the application-specific interface (e.g., via function call(s)) to the program object for the sheet metal solid shape. Then, as action 9-4, the drag and drop (d/d) instruction procedure (section) of the program object for the sheet metal solid shape is executed. The nature and manner of execution of the drag and drop (d/d) instruction section for different types of sheet metal solid shapes are explained subsequently (e.g., with reference to FIG. 10A–FIG. 10C). In FIG. 9, the application-specific drag/drop procedure is generally referred to as procedure 1000. As will be understood subsequently, the particular version of procedure 1000 implemented as action 9-4 can be either a flat stock drag/drop procedure 1000A (shown in FIG. 10A), a punch drag/drop procedure 1000B (shown in FIG. 10B), a form punch stock drag/drop procedure (understood with reference to FIG. 10B in view of its similarity to the punch drag/drop procedure), or bend shape drag/drop procedure 1000C (shown in FIG. 10C). Which particular customized (e.g., application-specific) drag/drop procedure is utilized depends, of course, on the type of solid shape which has been selected.

The actions of the application-specific drag/drop procedure 1000 are encompassed by steps 6-1-2-2 through 6-1-2-4 in FIG. 8B. As step 6-1-2-2 and using communication channel d2, the newly created sheet metal shape queries the program framework 402 for default data. The program framework 402 then uses communication channel d3 to obtain default stock information from sheet metal stock manger 411 (step 6-1-2-3) and uses communication channel d4 to obtain sheet metal preference information from sheet metal preferences component 412 (step 6-1-2-4).

Figure 8C:
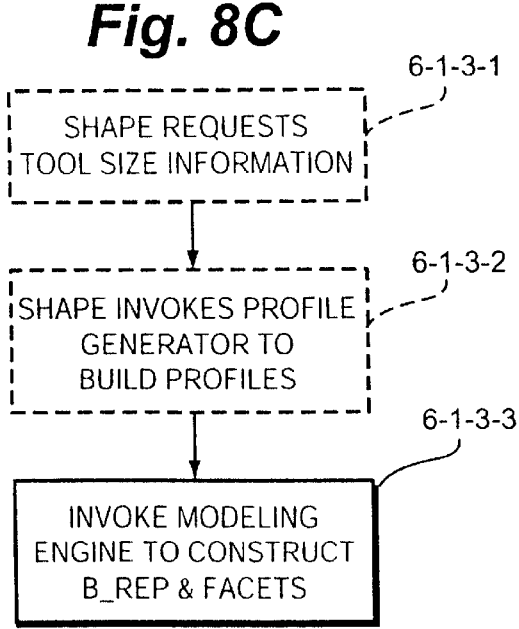
Figure 8D:
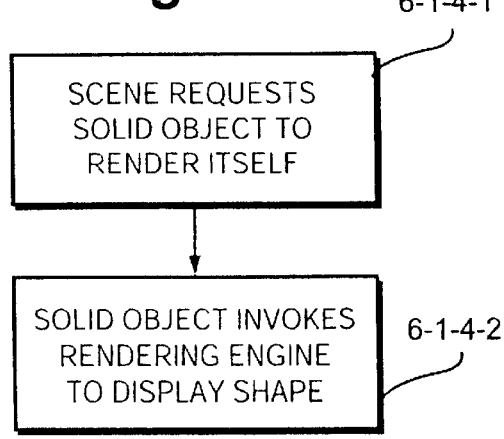

As indicated by sub-step 6-1-3 of FIG. 8, step 6-1 further involves generation of solid data using various solid data generation communication channels shown in FIG. 4. Selected details of the solid data generation sub-step 6-1-3 are illustrated in FIG. 8C.

Program objects for the punch solid shapes, form solid shapes, and the custom profile shape 307 do not carry their own profile component, but instead call upon an appropriate one of the profile generators 415 to generate the profile necessary for the program object. Such solid shapes that do not carry their profile component use communication channel g1 to requests tool size information from sheet metal tool table manager 414 (sub-step 6-1-3-1) and use communication channel g2 to invoke a particular sheet metal profile generator 415 to build the appropriate profile(s) (sub-step 6-1-3-2). Solid shapes which do carry their own profile component already know their profile information (e.g., size and shape), do not need to have a profile generated, and therefore do not perform sub-steps 6-1-3-1 and 6-1-3-2. For this reasons, sub-steps 6-1-3-1 and 6-1-3-2 are optional depending on shape type, and thus are depicted by broken lines in FIG. 8C.

All newly created sheet metal solid shapes, whether having their own profile component or not, via their solid object capabilities, use communication channel g3 to invoke the modeling engine 422 to construct a B-rep body and facets for itself (sub-step 6-1-3-3).

Step 6-1 also includes a sub-step 6-1-4 of rendering facet data for display (see FIG. 8). Aspects of sub-step 6-1-4 are shown in more detail in FIG. 8D. In particular, using communication channel r1 the scene document 450 requests the newly created sheet metal shape to render itself (sub-step 6-1-4-1 of FIG. 8D). In response, using communication channel r2, the newly created sheet metal shape invokes rendering engine 424 to display the shape on the screen (sub-step 6-1-4-2 of FIG. 8D).

Returning now to the basic steps illustrated in FIG. 6, it is assumed that the foundation stock shape, after having been rendered on the screen by step 6-1, should be resized. In order to do so, at step 6-2, the user selects the foundation stock shape at the shape editing level (see FIG. 2A). The resizing or editing of the foundation solid shape can be done using either sizebox handles (see FIG. 20E) or shape handles (see FIG. 20G). By default, the sizebox and sizebox handles of the foundation stock shape are initially displayed. To display the shape handles for the foundation stock shape, the user either (1) clicks on the Handle Toggle or (2) right clicks on the foundation stock shape, selects "Show Edit Handles" from a resulting pop-up menu, and then selects "Shape". The shape handles are not displayed on the foundation stock shape until the cursor is moved over the center of the surface that is to be resized. The shape handles can then be used to resize the shape of the foundation stock material.

To resize the foundation solid shape, at step 6-3 the user can drag either the sizebox handles or the shape handles for the foundation solid shape. To precisely resize the foundation solid shape, the user can right-click on the editing handles and then choose "Edit Sizebox" or the "Edit Distance" from the resulting pop-up menu, edit the available values, and then select "OK". If the user needs to edit the cross section of the foundation stock shape, the user can right-click on the foundation stock shape, select "Edit Cross-section" from the resulting pop-up menu, and then modify the cross section, as necessary.

Figure 6A:
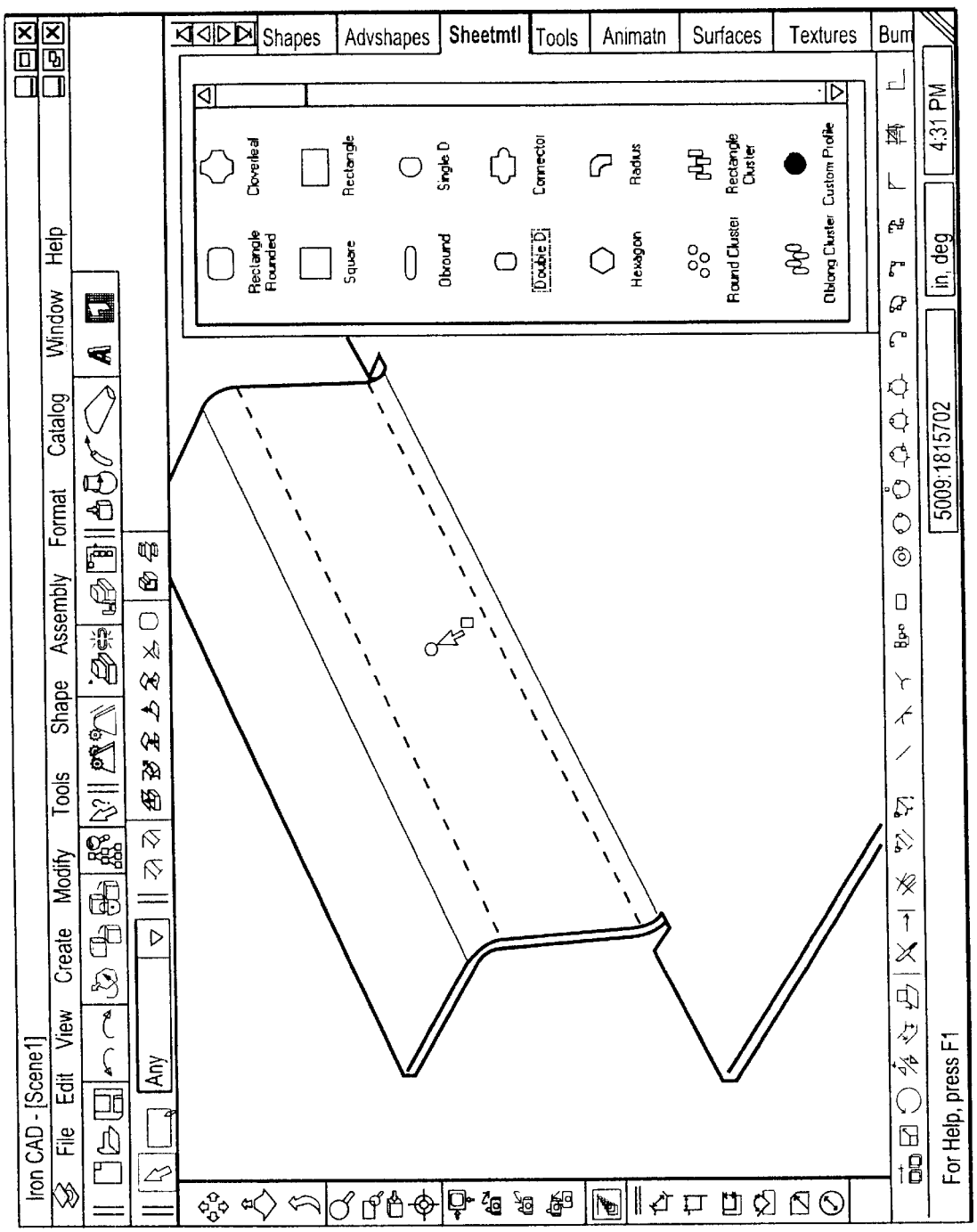
FIG. 6A is a diagrammatic view showing a selected add-on stock being dragged over an edge of a surface stock shape to which it will be added, with the edge displaying a SmartSnap highlight.
Figure 6B:
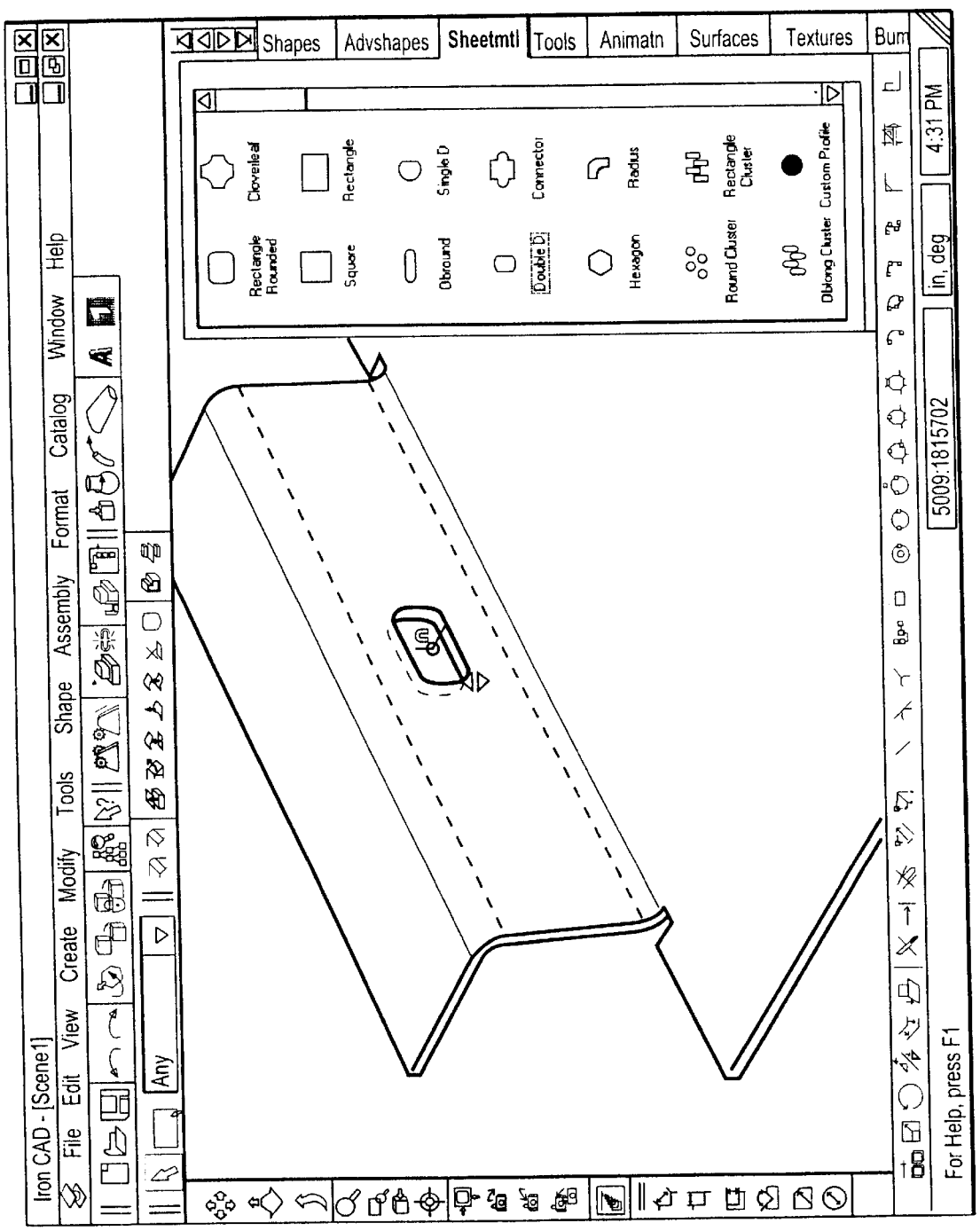
FIG. 6B is a diagrammatic view showing the selected add-on stock of FIG. 6A being dropped over a surface stock shape to which it is added.

The program 400 allows the user to create a sheet metal solid part using the foundation stock shape as a base. In this regard, and as shown as step 6-4, the user can drag and drop another solid shape, such as a punch solid shape, onto the foundation stock shape. The metal solid punch solid shapes are illustrated in group 306 of sheet metal catalog display 300 in FIG. 3. In step 6-4, the user selects the desired type of punch solid shape from group 306 of sheet metal catalog display 300, and drags the selected punch solid shape over a surface (of the foundation stock shape) to which it will be added, the dragging continuing until the surface displays a green SmartSnap highlight as shown in FIG. 6A. In FIG. 6A, it will be understood that the foundation shape has already been operated upon to have other features, e.g., a bend and reliefs. When the SmartSnap highlight is displayed, the user releases the punch solid shape. As shown in FIG. 6B, upon dropping the punch solid shape is automatically sized to match the thickness of the surface to which it is added. Once the punch solid shape is in place, it can be resized in the same manner as described earlier in connection with the foundation stock shape (step 6-3), using the up arrow and down arrow which appear near the punch solid shape.

The dropping and dragging of another solid shape onto the foundational shape such as the solid shape selected at step 6-4 (e.g., the punch solid shape) utilizes the same communication channels of FIG. 4 in essentially the same way as described above with respect to step 6-1.

The solid shape part being constructed in the scene can have further solid shapes dragged and dropped onto it, in similar manner as described with respect to the punch solid shape of step 6-4. That is, the user can select additional solid shapes (of the same or differing type) from sheet metal catalog display 300 and construct as simple or as complex a sheet metal solid part as is required.

THE APPLICATION-SPECIFIC DRAG/DROP PROCEDURE

As indicated above, there are four fundamentally diverse types of sheet metal solid shapes—flat stock, bend stock, punch, and form solid shapes. For each of these four types of sheet metal solid shapes, at step 9-4 of FIG.9 an appropriate customized version of an application-specific drag/drop procedure is implemented and performed. Thus, whenever at step 6-1 an instance of the program object for the selected sheet metal solid shapes is created from the persistent program object and loaded into memory, the instance includes the appropriate customized version of the drag/drop procedure for the particular sheet metal solid shape according to its type. In this regard, a first version of the application-specific drag/drop procedure is created and performed for flat stock (see FIG. 10A); a second version of the application-specific drag/drop procedure for bend stock (see FIG. 10C); and third and fourth versions of the application-specific drag/drop procedure for punch solid shapes and form solid shapes, respectively (see FIG. 10B).

Figure 10A:
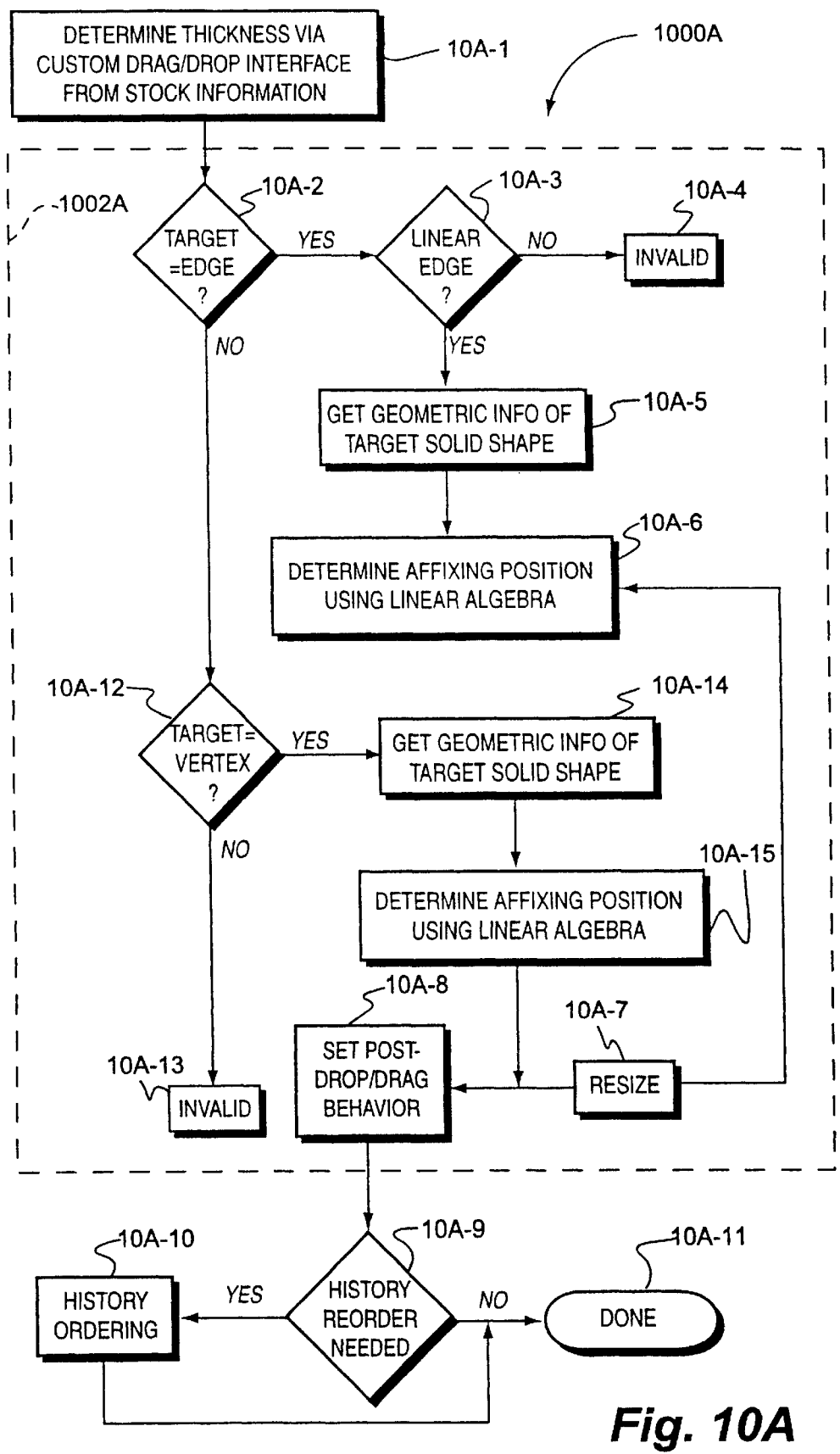
FIG. 10A–FIG. 10C are flowcharts showing customized drag and drop procedures in accordance with respective types of sheet metal solid shapes.

Basic steps involved in the application-specific drag/drop procedure 1000A for an instance of a sheet metal flat stock program object are shown in FIG. 10A. It will be understood from the foregoing that the flat stock drag/drop procedure is included in step 9-4 of FIG. 9. At step 10A-1, the flat stock drag/drop procedure determines the thickness of the sheet metal flat stock which is associated with the sheet metal solid part by referencing a stock item. The thickness of the selected or dropped flat sheet metal solid shape is the same as the thickness of the target sheet metal shape on which the selected flat stock is dropped. In particular, the function call of step 10A-1 inquires from a sheet metal part component the thickness of the top part. As an example, with reference to the sheet metal part shown in FIG. 7A, the function call of step 10A-1 consults sheet metal part component 700*a* to ascertain the thickness of top part 700, with the sheet metal part component 700*a* obtaining data from stock item object 700*c*. The stock item of a sheet metal top part includes various types of information about the stock item, including thickness in terms of physical and gauge size; bend allowance; weight per unit area; a material code; and a maximum bend radius, for example.

After the thickness of the sheet metal flat stock is determined at step 10A-1, the sheet metal flat stock must be positioned in the scene relative to the solid shape onto which it is dropped. The positioning of sheet metal solid shapes in general depends on the type of solid shape being dropped, as well as the type of feature (e.g., a face, edge, or vertex) which is "hit" when the selected solid shape is dropped after dragging and a mouse click. As depicted by the broken line frame 1002A of FIG. 10A, step 10A-2 through step 10A-8 pertain to positioning of a sheet metal flat stock.

In positioning the flat stock, the flat stock drag/drop procedure of FIG. 10A permits dropping of flat stock only at a linear edge or a vertex of another solid shape. For this reason, at step 10A-2 a check is made whether the feature of the solid shape which the flat stock is dropped (the target solid shape) is an edge. If the check at step 10A-2 is affirmative, at step 10A-3 further check is made whether the edge on which the flat stock is dropped is linear (e.g., is straight rather than curved). Any attempt to drop the flat stock on a non-linear edge is invalid (as indicated by step 10A-4).

Assuming that the selected solid shape is to be dropped on a linear edge of a target sheet metal solid shape, at step 10A-5 the flat stock drag/drop procedure obtains the geometric information of the target solid shape from its stock item object (see, for example, stock item 700c of FIG. 7A). Then, at step 10A-6, the flat stock drag/drop procedure uses linear algebra to determine the position on the target solid shape at which to affix the selected (dragged) flat stock sheet metal solid shape.

Figure 11:
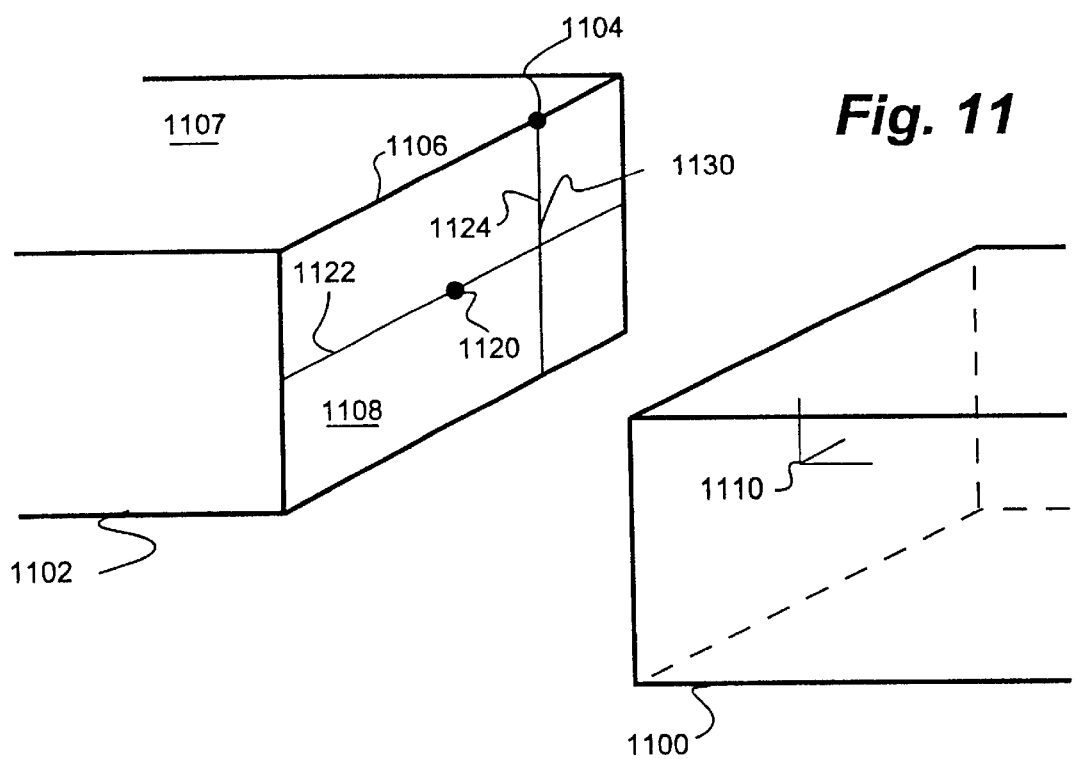
FIG. 11 is a diagrammatic view illustrating steps included in a determination of a position on a target solid shape at which to affix selected flat stock.

The determining of the position on the target solid shape at which to affix the selected flat stock at step 10A-6 is illustrated by the example scenario of FIG. 11. In FIG. 11, flat stock sheet metal solid shape 1100 is being dragged into the scene and hits target sheet metal solid shape 1102 at hit point 1104 on edge 1106. Edge 1106 boarders faces 1107 and 1108 of target solid shape 1102. The flat stock sheet metal solid shape 1100 has an anchor 1110. The flat stock drag/drop procedure selects a face neighboring the edge 1106 of shape 1102. The face selected is the face which runs through the thickness of the material. Given this criteria, face 1108 is selected for the affixation. The center of the face is then calculated. The center of face 1108 is shown in FIG. 11 as point 1120. The affixing position on face 1108 is determined to be the intersection of (1) a line 1122 through center point 1120 which is parallel to edge 1106, and (2) a perpendicular 1124 to edge 1106 at hit point 1104. The affixing position on face 1108 in FIG. 11 is thus point 1130.

Certain information utilized at step 10A-6 for making the determination of the affixing point is obtained from step 10A-5. In this regard, it is the information obtained at step 10A-5 that enables face selection, the computation of the center of the face, etc., as above described with reference to step 10A-6.

With the affixation point 1130 thus determined at step 10A-6, flat stock drag/drop procedure can make the linear algebra calculations for positioning the flat stock 1100 so that its anchor 1110 is coincident with the affixation point 1130 of target solid shape 1102.

After the affixation point has been determined at step 10A-6, at step 10A-7 a resizing operation is performed to determine how large the flat stock shape should be. As part of step 10A-7, the flat stock shape resizes itself to the size of the edge on which it is dropped. Then, at step 10A-8, the post-drop drag behavior is set. For a flat stock shape, the post-drop drag behavior is disallowed.

At step 10A-9 the flat stock drag/drop procedure determines whether the flat stock being added requires a reordering of the history component for the composite part which includes the newly added flat stock (see component 700b in FIG. 7A). Whether history reordering is required depends on factors such as the relationship of the added solid shape to the target solid shape. If history reordering is required, the history reordering occurs at step 10A-10.

Figure 12A:
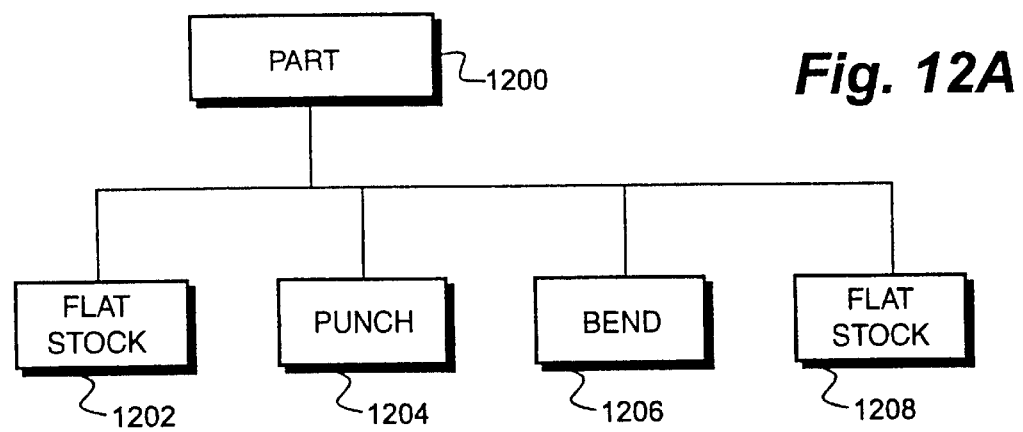
FIG. 12A and FIG. 12B are diagrammatic views of portions of CSG trees before and after history re-ordering, respectively.
Figure 12B:
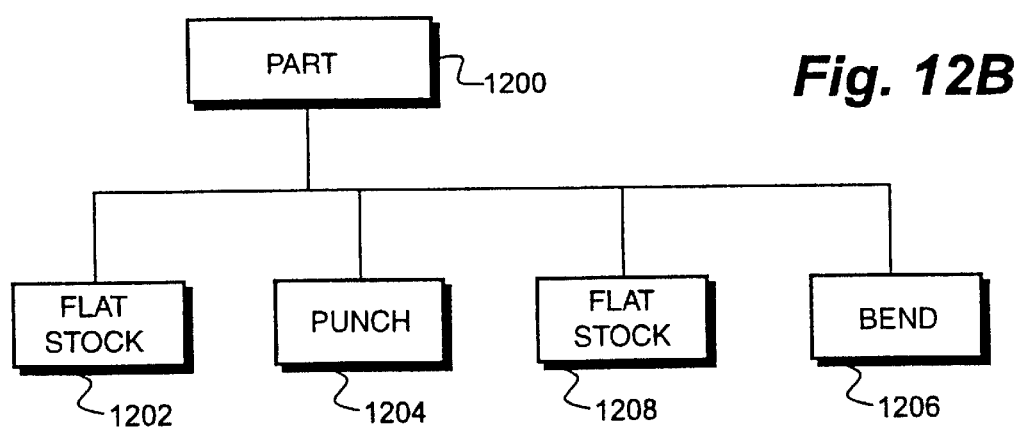

A history reordering is required at step 10A-10 in the case of adding flat stock on lo a bend, for example. A CSG tree for such a case (prior to history reordering) is illustrated in FIG. 12A. FIG. 12A shows a composite part 1200 having a first flat stock solid shape 1202, a punch 1204 formed in the first flat stock solid shape 1202, and a bend solid shape 1206 to which second flat stock solid shape 1208 is added. In view of the feature-based parametric modeling approach of program 400, the order of the solid shapes in the CSG tree is important. Since the second flat stock solid shape 1208 should be evaluated at step 9-6 prior to the bend solid shape 1206, at step 10A-10 the history is reordered to appear as shown in FIG. 12B with second flat stock solid shape 1208 preceding the bend solid shape 1206 in the CSG tree. If a history reordering is determined unnecessary at step 10A-10, or after history reordering is performed at step 10A-10, the flat stock drag/drop procedure is completed as indicated by symbol 10A-11 of FIG. 10A.

If it is determined at step 10A-2 of the flat stock drag/drop procedure that the target is not an edge, a check is made at step 10A-12 whether the target is a vertex. The target being a vertex occurs for the third group of sheet metal solid shapes icons, i.e., vertex shapes (framed by broken line 303 in FIG. 3). If that this juncture the target is not a vertex, an invalid indication is provided as indicated by step 10A-13. If the target is a vertex, at step 10A-14 the flat stock drag/drop procedure obtains the geometric information of the target solid shape from its stock item object and then, at step 10A-15, uses linear algebra to determine the position on the target solid shape at which to affix the selected (dragged) flat stock sheet metal solid shape. While the step 10A-14 and step 10A-15 resemble step 10A-5 and step 10A-6, respectively, it should be understood that different geometric computations specific to vertex shapes are performed. Upon completion of step 10A-5, execution resumes with step 10A-8 which has been discussed above (e.g., there is no need for resizing step 10A-7).

Figure 10B:
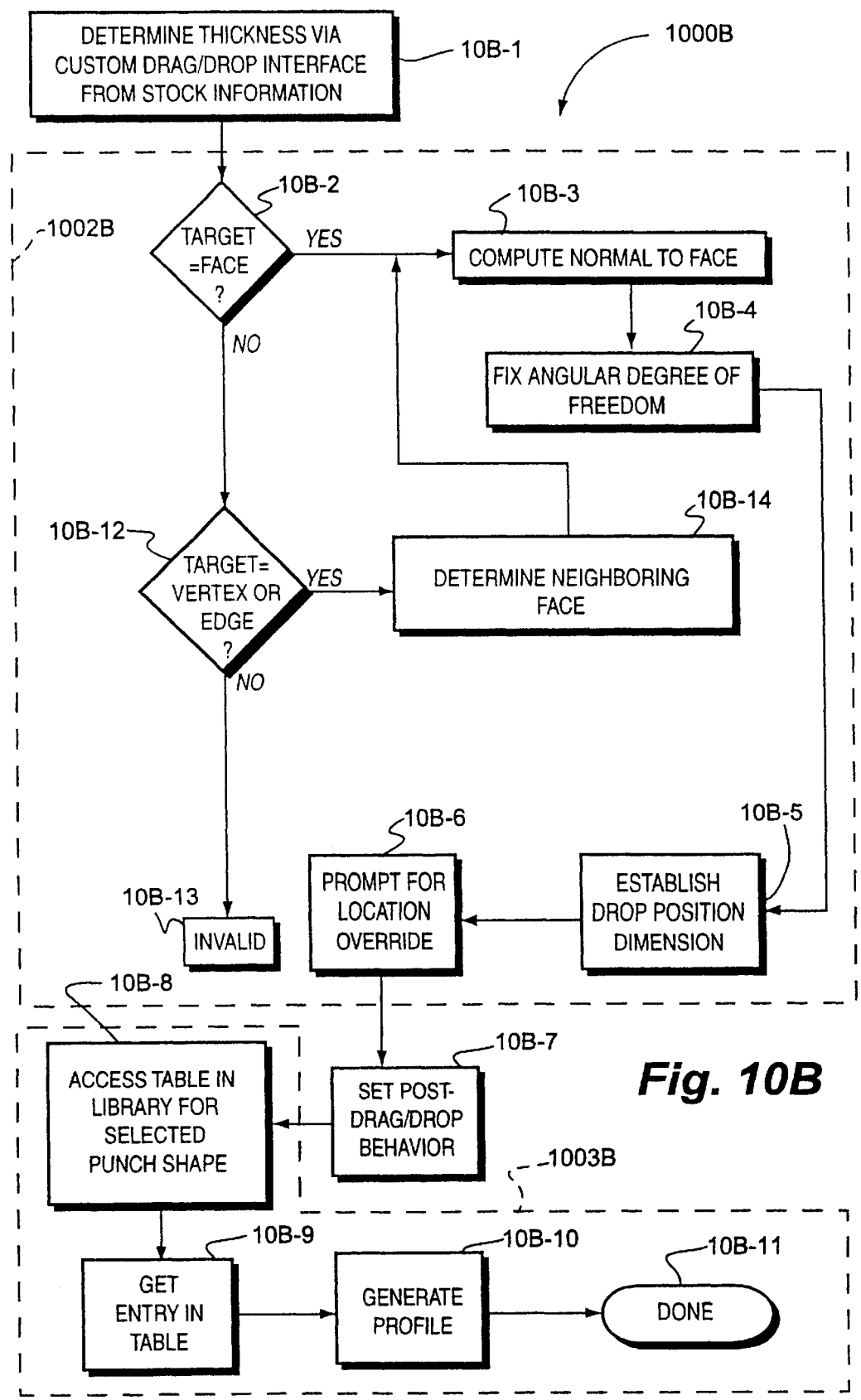

Basic steps involved in the application-specific drag/drop procedure 1000B for an instance of a sheet metal punch program object are shown in FIG. 10B. As explained with reference to FIG. 13, a particular punch solid shape has already been selected from the punch shape set of catalog display 300 (framed by broken line 306 in FIG. 3 and FIG. 13), and a program object created for the selected punch shape. For example, of the various punch shape icons in punch portion 306 of catalog display 300, punch icon #1 is shown in FIG. 13 as having been selected. Punch icon #1 may have a circular punch hole, for example, while punch shapes for other icons may be of other configurations (e.g., rectangular, triangular, etc.).

In actuality, although plural punch shapes are shown in portion 306 of catalog display 300, there is only one generic punch sheet metal memory persistent object 1300 for punch shapes. The generic memory persistent object 1300 for punch shapes is duplicated upon selection of a punch shape to form a punch shape program object 1302 for the particular punch shape whose icon was selected from catalog portion 306. Upon being loaded into memory the program object 1302, the add-on component 720h establishes a hook or interface to a globally unique identifier (GUID) for a particular one of the sheet metal profile generators 415 [see FIG. 4]. As shown by the arrow labeled "table reference information", the program object 1302 for the selected punch shape is provided with table reference information indicating the particular shape and size of the selected punch solid shape. The table reference information includes both a table reference index and a size index. The table reference identifies or indexes to a particular one of plural punch type tables stored in tool table library 1310. Tool table library 1310 is managed by sheet metal tool table manager 414 (see FIG. 4). The table reference information (e.g., the table index and size index) are provided to profile generator 415 over interface 1304. The profile generator 415 uses the table reference information to access the appropriate table information and to generate a profile for the punch solid shape.

In like manner as the flat stock drag/drop procedure, at step 10B-1 the punch drag/drop procedure begins with a determination of the thickness of the target sheet metal shape in which the punch shape will be formed, since the thickness of the target sheet metal shape will also be the thickness of the selected or dropped punch sheet metal solid shape. The determination of step 10B-1 is made using a function call in like manner as previously described with reference to step 10A-1 of FIG. 10A in order to access the stock item object for the target sheet metal shape, since the stock item object has the thickness information of the target sheet metal shape.

The sheet metal punch solid shape is positioned on the target sheet metal solid shape by steps in FIG. 10B framed by broken line 1002B. At steps 10B-2 and step 10B-12, the punch drag/drop procedure determines what type of feature was hit upon the dropping of the punch solid shape onto the target sheet metal solid shape.

Figure 14:
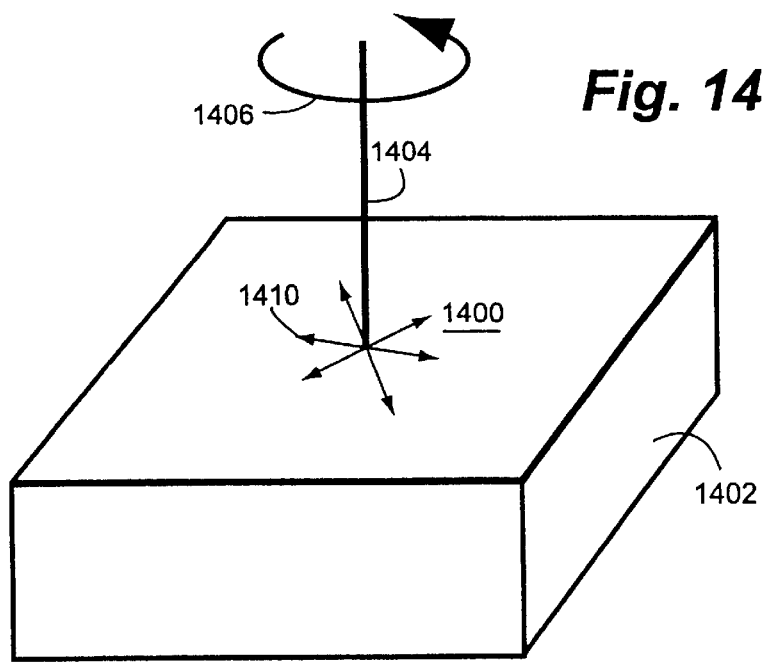
FIG. 14 is a diagrammatic view showing determination of a normal line to a face of a target solid shape as well as cruising on the face.

If the hit feature of the target sheet metal solid shape is determined at step 10B-2 to be a face, step 10B-3 through step 10B-6 are performed. At step 10B-3, the punch drag/drop procedure computes a normal to the face. For example, for the hit face 1400 of target sheet metal solid stock 1402 in FIG. 14, the normal 1404 is computed. Then, at step 10B-4, an angular degree of freedom for the punch solid shape is established about the normal to the hit face. In this regard, FIG. 14 shows by arrow 1406 a 360 degree angular freedom about normal line 1404. The angular degree of freedom becomes fixed when an angle based on the orientation of the surrounding geometry is adjusted by the system (e.g., the angle needed for the alignment of the sizeboxes).

At step 10B-5 the punch drag/drop procedure establishes drop position dimensions based on the foregoing. Then, at step 10B-6, the punch drag/drop procedure prompts the user to ascertain whether the user desires to override the computed location for the punch solid shape on the face. Step 10B-6 gives the user the opportunity to input dimensions or values at which the punch solid shape should be located relative to the face on which the punch solid shape is dropped.

Step 10B-7 involves setting the post-drop drag behavior of the punch solid shape. The post-drop drag behavior of the punch solid shape is such that the punch solid shape can still "cruise" over the hit face 1400. By "cruise" is meant that the dropped solid shape can be slid to any position on the hit face (as indicated by arrows 1410), but must stay on the surface of the hit face.

The formation of the image of the punch shape in the target solid shape is reflected by steps framed in FIG. 10B by broken line 1003B, e.g., step 10B-8 through step 10B-11. At step 10B-8 the punch drag/drop procedure accesses an appropriate one of the tables in the tool table library 1310. In particular, the punch drag/drop procedure accesses the particular table identified by the table reference acquired from the catalog for the selected punch shape. There is a separate table in library 1310 for each punch type having an icon in punch portion 306 of sheet metal catalog display 300. For the example scenario depicted in FIG. 13, in view of selection of punch icon #1, the table for punch type #1 is identified by the table reference and accessed at step 10B-8.

After the appropriate table in library 1310 has been accessed, at step 10B-9 the =punch drag/drop procedure uses the size index to determine which row of the table to access. Using the size index, the punch drag/drop procedure obtains from the table information which facilitates the display of the magnitude of the hole of the punch. As shown in FIG. 13, each punch type table has plural rows for each of plural sizes available for the punch type covered by the table. For example, size I may be a smallest size, size 2 a next larger size, and so forth. In the particular example illustrated in FIG. 13, the size index corresponds to the second size (size 2) of the punch type #1 table, i.e., to the second row. Each row of the table has plural columns in which are stored certain parameter values pertaining to the punch shape. For example, as shown in FIG. 13, the punch type #1 has parameters "L" (length), "H" (height), "R" (radius), and "A" (angle of trapezoid side). For each row (size) in the table, there may be different corresponding parameters for each column.

After accessing the appropriate table and row at step I10B-8 and step 10B-9, the profile for the punch shape is generated at step 10B-10. In this regard, the information obtained from the appropriate row of the table for punch type #1 is used by the sheet metal profile generator 415 for generation of the profile for the punch solid shape, after which the punch drag/drop procedure for the punch shape is essentially complete (as reflected by step 10B-11).

FIG. 13 thus illustrates how the sheet metal catalog 413, sheet metal tool table manager 414, and sheet metal profile generator 415 are utilized in conjunction with obtaining a profile for a solid shape that requires a profile generator.

Figure 19:
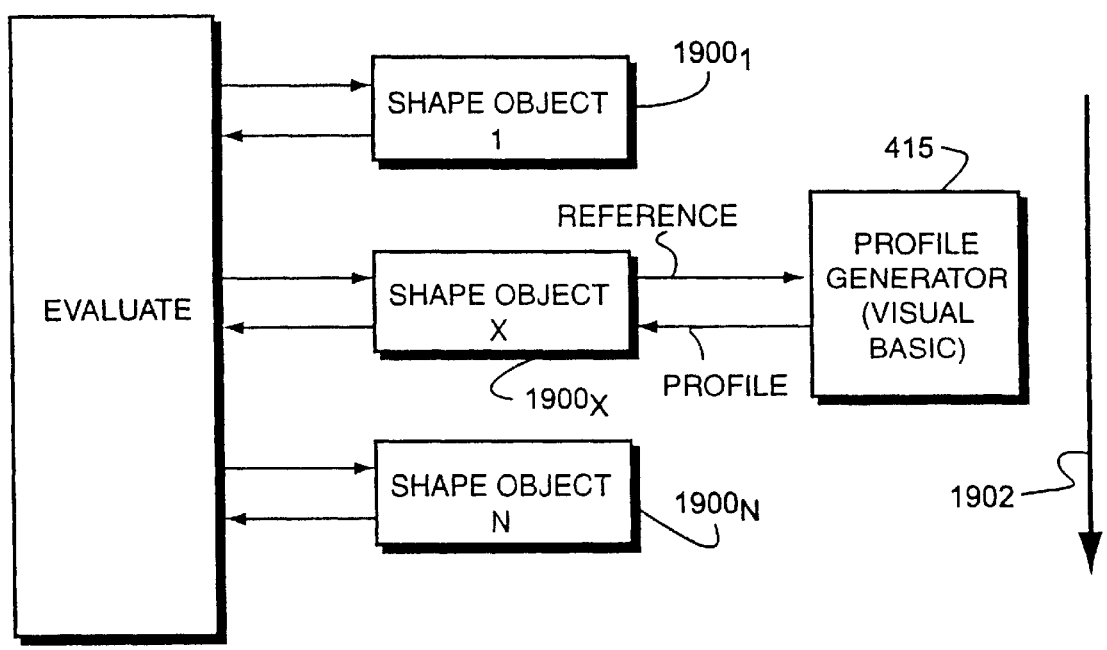
FIG. 19 is a flowchart showing basic steps performed by a solid part re-evaluation procedure of the three dimensional geometric modeling program of the invention.

Thus, the sheet metal profile generators 415 are employed for generating the profiles for certain sheet metal solid shapes, such as the punch solid shape, upon addition to a scene document. Moreover, the sheet metal profile generators 415 are also used when a sheet metal solid part is re-evaluated, as depicted in example manner in FIG. 19. FIG. 19 shows a re-evaluation procedure for re-evaluating a sheet metal solid part having shapes corresponding to shape objects 1900$_1$ through 1900$_N$. Solid shape x having shape program object 1900$_x$ in FIG. 19 is a punch shape. As indicated above, a punch shape program object such as program object 1900$_x$ does not have its own profile, but instead utilizes one of the sheet metal profile generators 415. Therefore, as indicated by the arrow in FIG. 19 labeled "references", the shape program object 1900$_x$, must send its table reference and size index (see FIG. 13) to the appropriate profile generator 415. That profile generator 415 in turn consults the appropriate table (e.g., punch type #1 table of FIG. 13) and size row thereof to generate a profile for the requesting object. The profile generated by profile generator 415 is returned to the requesting shape program object as indicated by the arrow labeled "profile" in FIG. 19.

The sending of the table references to profile generator 415 is, in the illustrated embodiment, a function call to a module of profile-generating code in Visual Basic™ language of Microsoft Corporation. In essence, the shape program object gives its table reference and size index to profile generator 415, so that profile generator 415 can access the appropriate table and appropriate row thereof to generate a profile for the solid shape.

The foregoing discussion of the punch drag/drop procedure of FIG. 10B has thus far concerned a situation in which a punch shape was dropped on a hit face of a target solid shape. As indicated previously, the feature hit by the dropped punch shape could instead be a vertex or edge of the target solid shape. When it is detected by punch drag/drop procedure at step 10B-12 that such vertex or edge was hit, step 10B-14 is performed to determnine a neighboring face for the hit vertex or edge of the target solid shape. Step 10B-14 involves using a hit test result, which essentially amounts to the punch drop/drag procedure using as the hit face the face at which the user looks most directly. After a face is determined, execution of punch drag/drop procedure continues with step 10B-3 (computing the normal to the face) and step 10B-4 (fixing the angular degree of freedom), as well as the ensuing steps of FIG. 10B described above.

The form solid shape is very similar to a punch solid shape, in that both the form solid shape and the punch solid shape drop onto existing flat stock. Whereas the punch solid shape merely cuts away some of the existing target flat stock onto which it is dropped, the form solid shape not only cuts away but also adds some further material. Examples of the form solid shape are the lancet and double lancet. Examples of form solid shapes are shown in portion 305 of sheet metal catalog display 300 of FIG. 3.

A form shape drag/drop procedure is also provided for the sheet metal form solid shapes. In essence, a form shape is created in like manner as a punch shape (as described in connection with FIG. 13) and the steps of the form shape drag/drop procedure are the same as those illustrated in FIG. 10B for the punch drag/drop procedure. That is, the formn shape drag/drop procedure determines thickness, determines position, and permits cruising in like manner as does the punch drag/drop procedure. Moreover, like the punch drag/drop procedure, the form shape drag/drop procedure uses table reference information to access the tool table library 1310 (see FIG. 13). In this regard, FIG. 13 shows a collection of form type tables (for form type #1 through form type #Z) which correspond to form type icons in the sheet metal catalog display 300. Further, in like manner with the punch solid shape discussed above, the program object for the form solid shape does not carry its own profile for evaluation, but instead requests the profile generator 415 to generate a profile for the form solid shape. A difference between the form solid shape and the punch solid shape is that the sheet metal profile generator 415 generates a profile for each of the plural child shapes comprising the form solid shape, such as the first child shape and the second child shape [having shape bags 750 and 752 respectively in FIG. 7B].

Figure 10C:
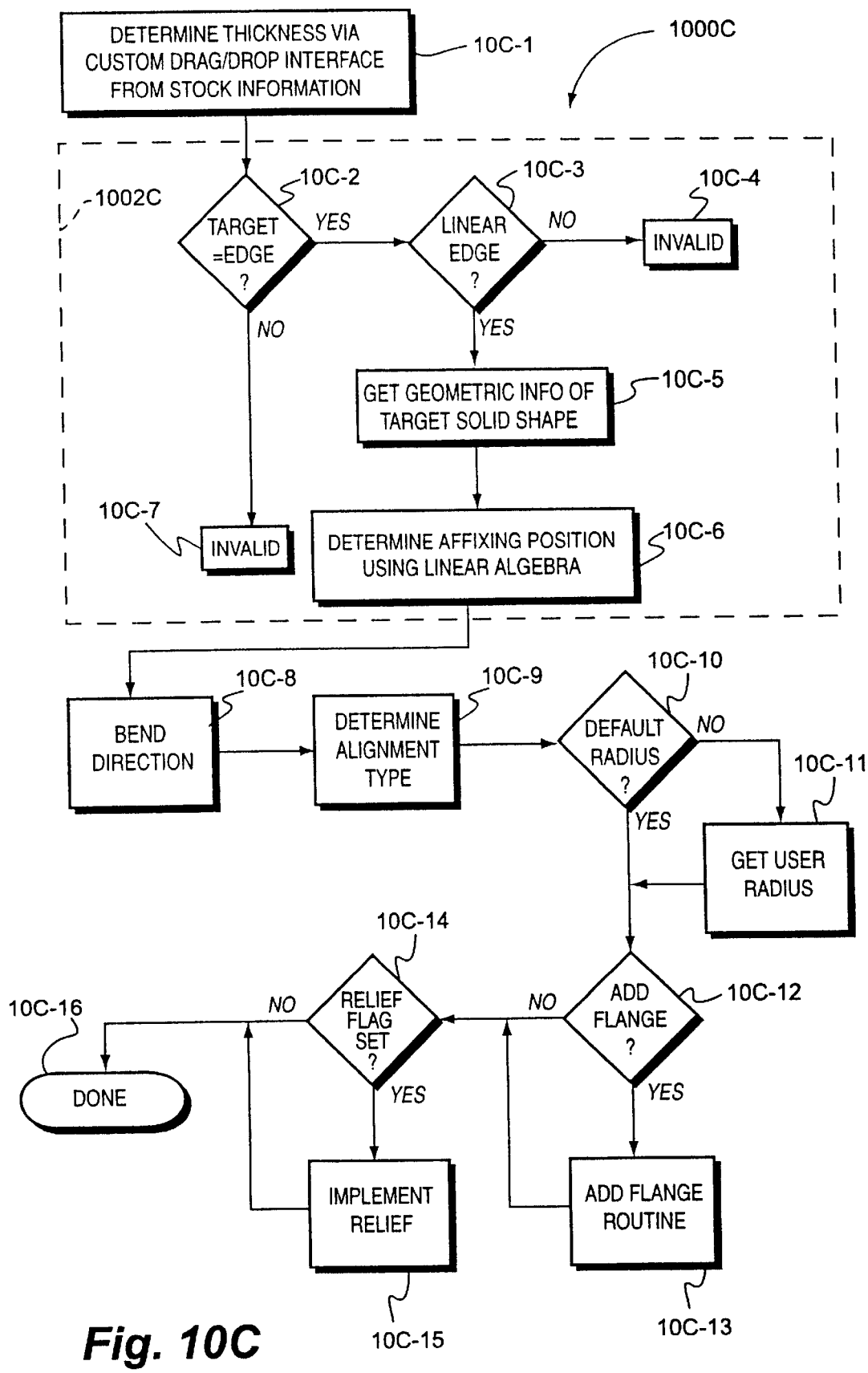

Basic steps involved in the application-specific drag/drop procedure 1000C for an instance of a sheet metal bend program object are shown in FIG. 10C. A particular bend solid shape has already been selected from the bend shape set of catalog display 300 (framed by broken line 304 in FIG. 3), and a program object created for the selected bend shape.

Figure 15A:
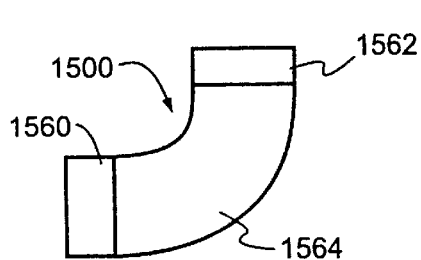
FIG. 15A is a side view of a sheet metal bend solid shape in accordance with an embodiment of the invention.
Figure 15B:
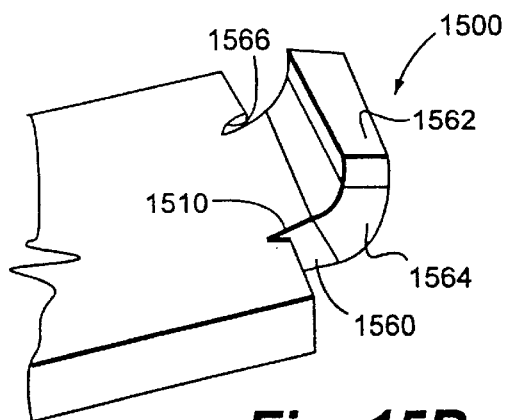
FIG. 15B is an isometric view of the sheet metal bend solid shape of FIG. 15A as attached to a target sheet metal solid shape.
Figure 15C:
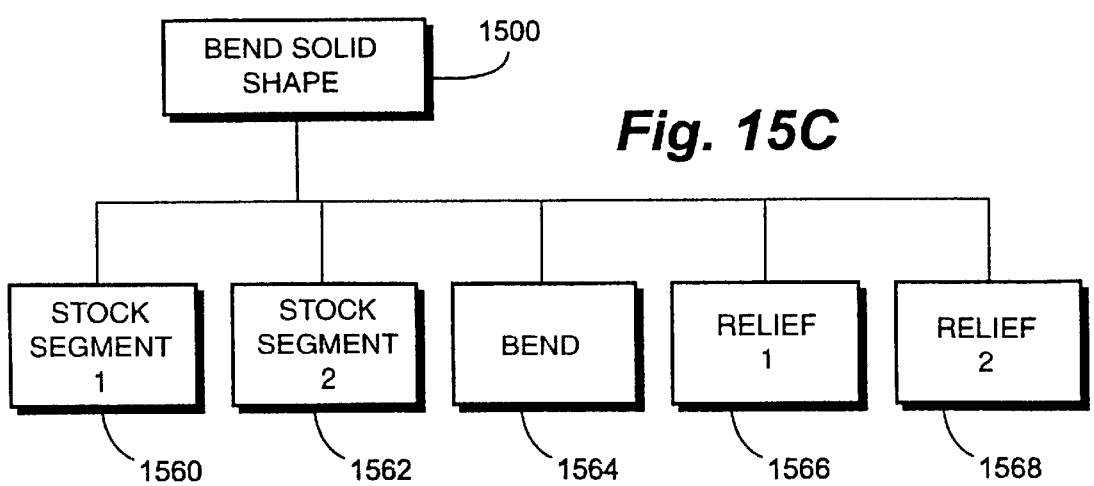
FIG. 15C is a diagrammatic view of a CSG tree for the sheet metal bend solid shape of FIG. 15A and FIG. 15B.

Prior to describing the bend shape drag/drop procedure, it should be noted that a bend solid shape is a rather complex solid shape, and can have plural child solid shapes. In this regard, and as illustrated in FIG. 15A, FIG. 15B, and FIG. 15C, a representative bend solid shape 1400 comprises as many as five child solid shapes, including a first stock or flange segment 1560, a second stock or flange segment 1562, a bend segment 1564, a first relief 1566, and a second relief 1568. The child solid shapes 1560, 1562, 1564, 1566, and 1568 have corresponding shape bags [such as respective shape bags 760, 762, 764, 766, and 768 in FIG. 7C], along with extrude components [such as respective extrude components 770, 772, 774, 776, and 778 in FIG. 7C]

Thus, bend solid shape 1500 is not just an arc-shaped segment (e.g., not just bend segment 1564), but a zone of influence which includes a stock segment on either side of the bend segment (e.g., segments 1560 and 1562 adjoining opposite ends of bend segment 1564). The relief solid shapes 1566, 1568 are notches which are cut out to allow tearing of the target solid shape. The reliefs are typically have a rectangular or rounded rectangular shape. Whether a bend solid shape has relief solid shapes is a user-selected option. Rounded rectangular reliefs are provided as default in the illustrated version of program 400, and can be overriden by the user. When a bend solid shape is to have a relief, program 400 sets a relief flag for the bend solid shape in the properties of the sheet metal bend component 740*m* [see FIG. 7C]. As explained subsequently, the bend solid shape thus has sufficient intelligence to have one or more of its child shapes to change between positive and negative solid shapes.

As with the other procedures described above, the bend shape drag/drop procedure 1000C of FIG. 10C is included in step 9-4 of FIG. 9. Moreover, in like manner as the other procedures (e.g., flat stock drag/drop procedure), at step 10C-1 the bend shape drag/drop procedure begins with a determination of the thickness of the target sheet metal shape to which the bend shape will be added, since the thickness of the target sheet metal shape will also be acquired by the selected or dropped sheet metal bend shape. As previously described, the determination of step 10C-1 is made using a function call to the stock item object by the solid part component.

The sheet metal bend solid shape is positioned on the target sheet metal solid shape by steps in FIG. 10C framed by broken line 1002C. In particular, step 10C-2 through step 10C-6 are performed, which are analogous to step 10A-2 through step 10A-6, respectively, of FIG. 10A. A bend solid shape is added to an edge of an existing (target) sheet metal solid shape, for which reason the only permissible feature of the target solid shape to hit with the dropped added bend solid shape is an edge. As indicated by step 10C-7, the hitting of any other feature is invalid.

In like manner as described in connection with flat stock drag/drop procedure, the bend shape drag/drop procedure obtains the geometric information of the target solid shape (step 10C-5), and using the geometric information determines the affixing position (step 10C-6).

In view of the particular nature of the bend solid shape, the bend shape drag/drop procedure has additional steps as illustrated in FIG. 10C. As one of these bend-peculiar steps, at step 10C-8 the bend shape drag/drop procedure must determine whether the bend solid shape is to bend up or down relative to the target solid shape. As an example, in FIG. 16A a determination must be made whether bend solid shape 1600, which hits target solid shape 1602 at edge 1604, is to bend upward as indicated by the solid line version of bend solid shape 1600, or to bend downward as indicated by the broken line version of bend solid shape 1600'. In the illustrated embodiment, at step 10C-8 the bend shape drag/drop procedure always situates the bend solid shape so that a smaller arc of the bend shape (e.g., arc 1610 in FIG. 16A) is adjacent the selected edge (e.g., hit edge 1604 in FIG. 16A). Therefore, in the particular example illustrated in FIG. 16A, the bend solid shape 1600 is situated so that the bend turns "up".

At step 10C-9 the bend shape drag/drop procedure determines the alignment type for the dropped bend solid shape. As discussed previously, the selected bend shape may have an "Out Bend" alignment option [see the discussion in connection with FIG. 3B(1) and FIG. 3B(2)], an "In Bend" alignment option [see the discussion in connection with FIG. 3C(1) and FIG. 3C(2)]; or a "Non-Trim Bend" alignment option [see the discussion in connection with FIG. 3D(1) and FIG. 3D(2)]. The particular option exercised in connection with the selected bend solid shape is ascertained in the sheet metal catalog 413, which defines behavior when dropped.

Figure 16A:
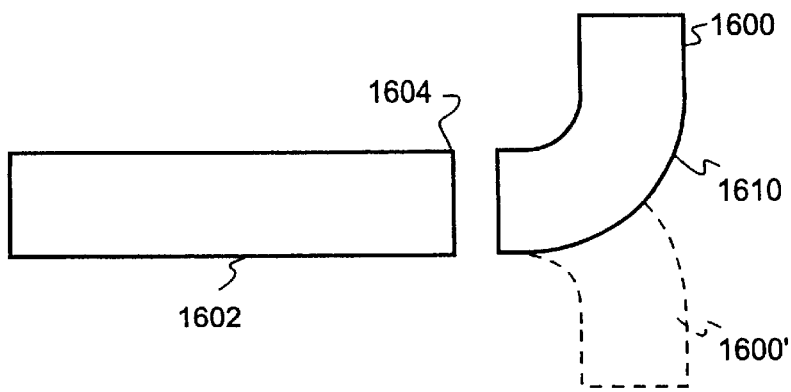
FIG. 16A is a diagrammatic view for explaining determination of bend direction for a sheet metal bend solid shape.
Figure 16B:
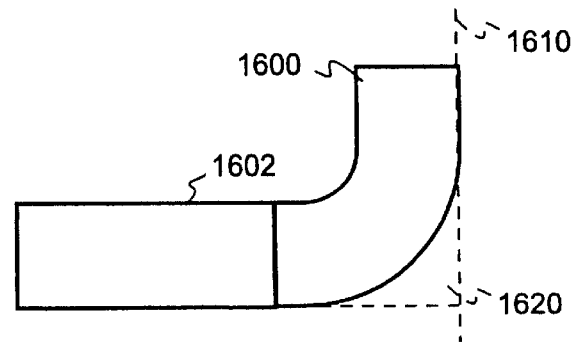
FIG. 16B–FIG. 16D are diagrammatic views for explaining differing alignment techniques for sheet metal bend solid shapes according to the present invention.

In the context of the bend solid shape 1600 illustrated in FIG. 16A, FIG. 16B shows the "Out Bend" option wherein the bend solid shape 1600 is trimmed back to target solid shape 1602 to which it is added to allow the outside surface 1610 of bend solid shape 1600 to align with the original position of the end surface 1604 of the target solid shape 1602. Thus, with the addition of the bend solid shape 1600 using the "Out Bend" option, the bend solid shape both adds its own material but also removes some of the material of the target solid shape 1602. The portion of target solid shape 1602 which is removed is denoted by reference numeral 1620 in FIG. 16B.

Figure 16C:
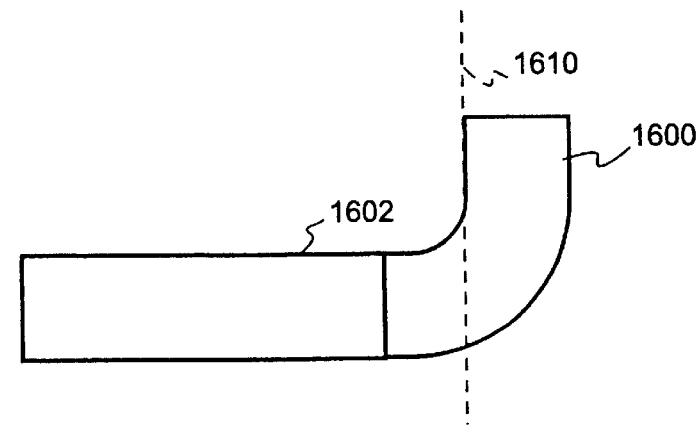

FIG. 16C shows the "In Bend" option wherein addition of the bend solid shape 1600 trims back the target solid shape 1602 to which it is added to allow the inside surface of bend solid shape 1600 to align with the original position of the end surface 1604 of the target solid shape 1602.

Figure 16D:
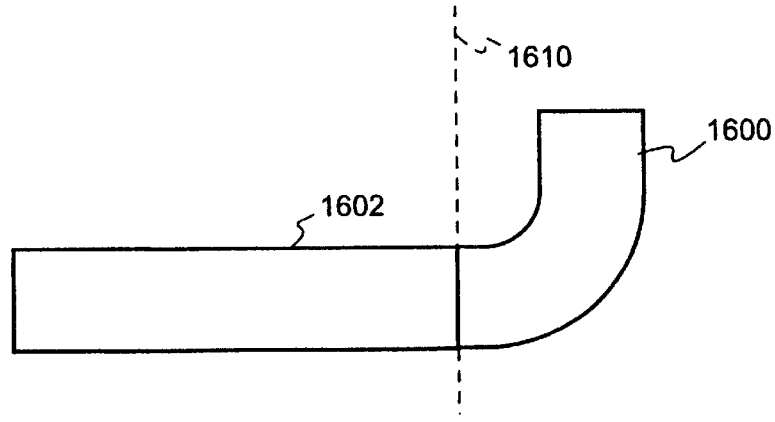

FIG. 16D shows the "Non-Trim Bend" option wherein the bend solid shape 1600 is added to target solid shape 1602 without trimming back the target solid shape 1602.

At step 10C-10 the bend shape drag/drop procedure determines whether the bend segment of the bend solid shape is to have a default radius or a user-defined radius. The default radius is an inner radius, but can be overridden as the user may specify at step 10C-11 that the outer radius to be used as the default radius, in which event the outer radius is calculated. Thus, if the default radius is not to be used, at step 10C-11 the bend shape drag/drop procedure obtains the user-defined radius for the bend solid shape. The user-defined radius is stored in the catalog entry for the bend solid shape.

At step 10C-12 the bend shape drag/drop procedure determines whether an add flange flag has been set with respect to the bend solid shape. When the add flange flag is set, the bend shape drag/drop procedure knows that the two stock segments for the bend solid shape (e.g., stock segments 1560 and 1562 to bend segment 1564 in the example of bend solid shape 1400 shown in FIG. 15A–FIG. 15C) are to be adjustable independently of the bend solid shape generally. The add flange flag is set in the sheet metal bend component 740m [see FIG. 7C]. When the add flange flag is set, step 10C-13 is performed. At step 10C-13, the fact that the add flange flag is set creates an independent add stock shape of the appropriate size and position.

At step 10C-14 the bend shape drag/drop procedure checks in the sheet metal bend component 740m [see FIG. 7C] to determine if the relief flag has been set for the selected bend solid shape. If the relief flag has been set, then bend shape drag/drop procedure performs step 10C-15 to create and add the child relief solid shapes to the CSG tree for the selected bend solid shape. For example, in the context of the illustration of FIG. 15A–FIG. 15C, the bend shape drag/drop procedure adds relief solid shapes 1566 and 1568 to the parent bend solid shape 1400. After execution of the latest of step 10C-14 or step 10C-15, the bend shape drag/drop procedure is completed as indicated by step 10C-16 in FIG. 10C.

Figure 17:
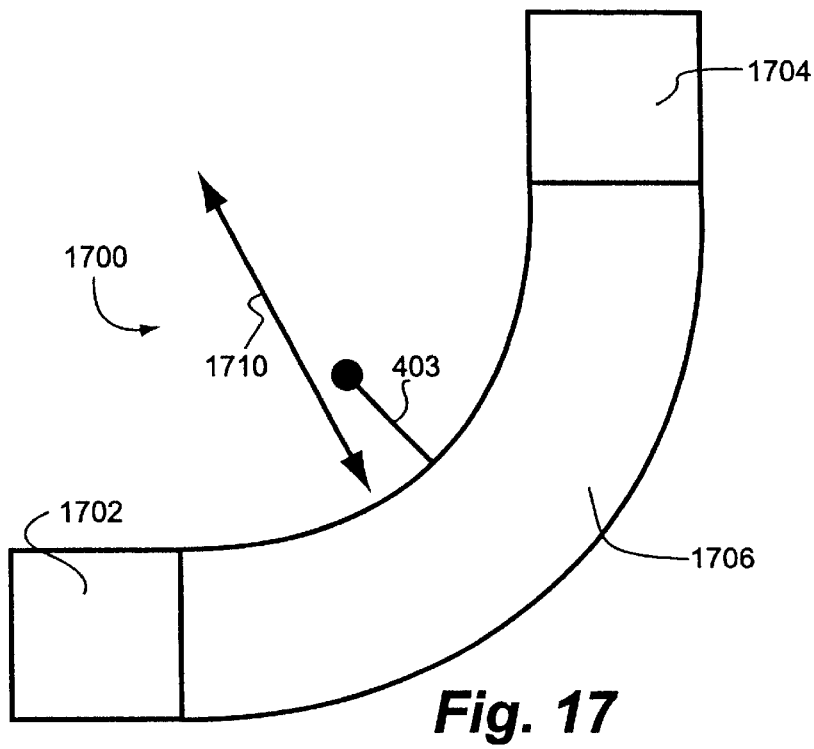
FIG. 17 and FIG. 18 are side views of a sheet metal bend solid shape used for explaining how segments thereof can expand and contract.
Figure 18:
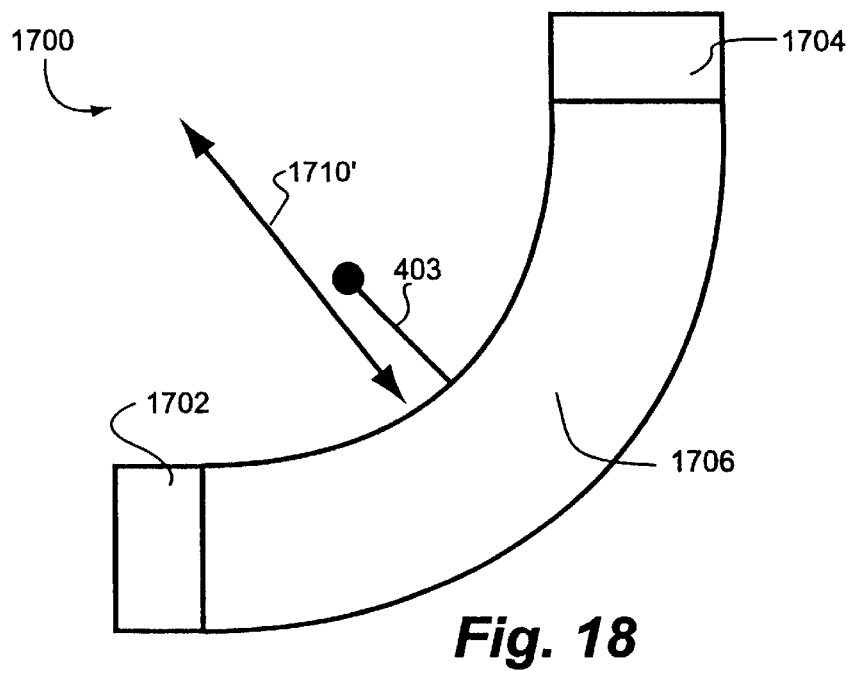

The complexity of the bend solid shapes is further illustrated by the fact that user manipulation of one of the editing handles for the bend solid shape may cause shrinking and stretching of one or more of the bend segment and the stock segments (e.g., bend segment 1564 and stock segments 1560, 1562 in FIG. 15A–FIG. 15B). Consider, for example, the bend solid shape 1700 of FIG. 17, with bend segment 1706 and stock segments 1702, 1704. If the user were to manipulate the angle editing handle 2003 (see, e.g., the discussion of FIG. 20A) so that the radius 1710 is changed from that shown in FIG. 17 to a larger value 1710' as shown in FIG. 18, material is added after the manipulation as shown in FIG. 18 to bend segment 1706 but removed from stock segments 1702, 1704. Thus, the child segments of a bend solid shape may, as a result of user manipulation of editing handles, start with a positive length, and go to a zero or even a negative length as material is removed and an adjacent segment overtakes some or all of the space previously occupied by the child segment. This capability for the flanges of the bend solid shape to change from positive to negative is a reason that a history reordering of the bend solid shape may be required at step 10A-10 of flat stock drag/drop procedure.

USER EDITING OF, E.G., TOOL TABLE PARAMETERS

It has been described above, e.g., in connection with step 9-4 of FIG. 9 and FIG. 13, how program objects for the punch solid shapes and form solid shapes do not carry their own profile component, but instead call upon an appropriate one of the profile generators 415 to generate the profile necessary for the program object. As mentioned above, the profile generator 415 obtains a table reference and a size index from the program object. The table reference and the size index are used for accessing an appropriate table, and an appropriate entry in the table, as provided in tool table library 1310. The tool table library 1310, as shown in FIG. 13, has a collection of standard tables for various types of punch solid shapes and form solid. shapes, specifically punch type #1 through punch type #q and form type #1 through form type #Z.

The program 400 of the present invention also gives the user the capability of editing the parameters in tool table library 1310 for a shape being created. In this regard, the sheet metal profile generators 415 provide three functions implemented using user programmable interfaces. These three functions, illustrated in FIG. 4, are OnEdit function 415a, OnUpdate function 415b, and OnUpdateThickness function 415c.

The OnEdit function 415a is invoked when the user wants to edit one or more parameters that define a tool. For instance, a trapezoidal punch has parameters for length, width, fillet radius, and angle. When the user desires to modify the length of the trapezoid, the OnEdit function is invoked. The OnEdit function is responsible for presenting a user interface that is suitable for editing the defining parameters for the punch. In the present invention, this is accomplished by displaying a dialog box which includes the tool table for the selected tool, and allows the user to choose an entry from the table, or specify a custom value. When the OnEdit function is invoked, the tool shape, along with the current values of the parameters, are passed to it. When the OnEdit function is finished, the new values are returned to the function caller.

Figure 13A:
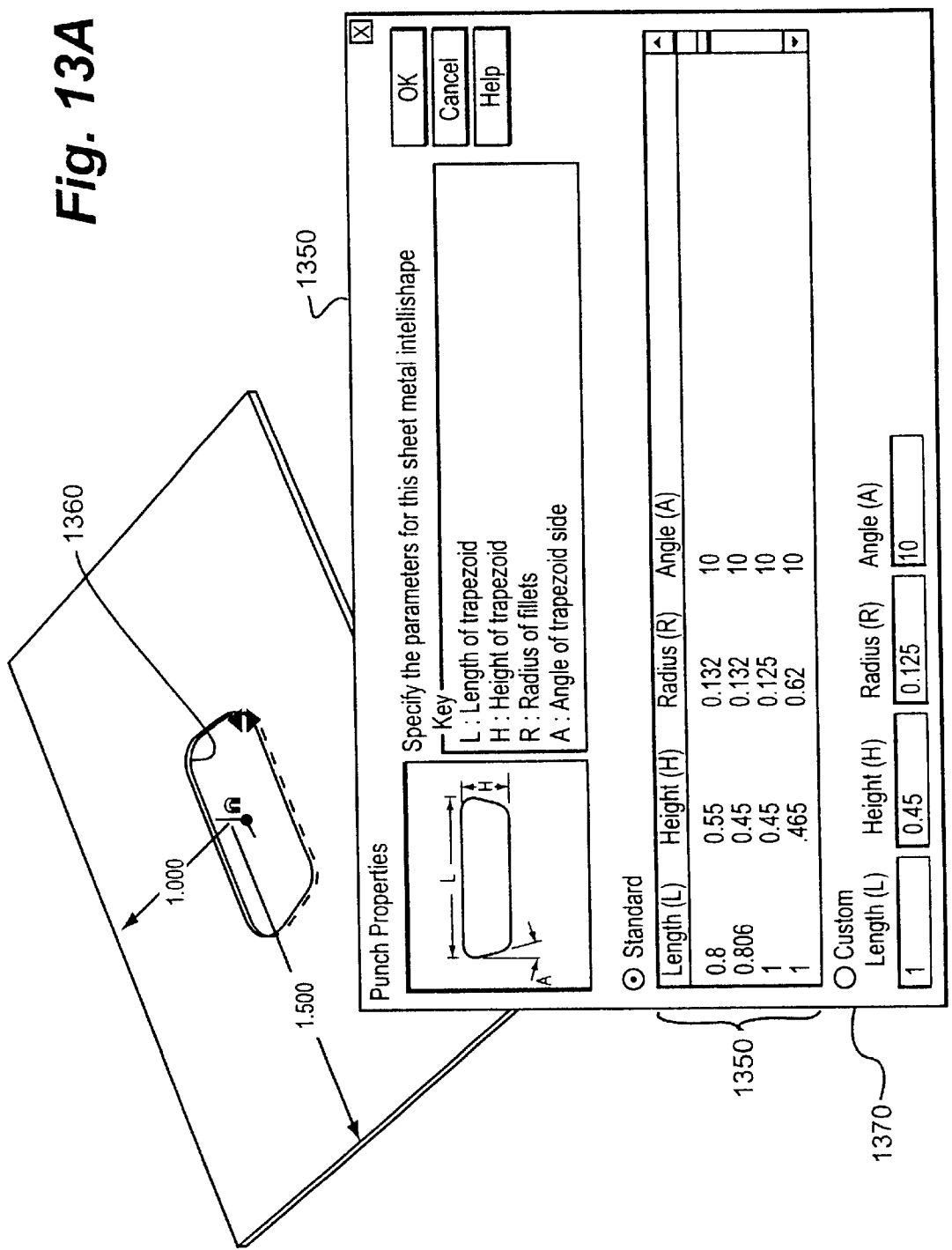
FIG. 13A is diagrammatic view depicting a punch properties dialog box used in connection with an OnEdit function of a sheet metal profile generator.

As an example of the foregoing, the OnEdit function 415a is performed when the user, after selecting a solid shape that requires profile generation, conducts an action (e.g., a right mouse click) that invokes display of a tooling properties dialog box. FIG. 13A shows such a tooling properties dialog box, in particular a punch properties dialog box 1350. The punch properties dialog box 1350 includes a schematic of the punch shape for the selected punch type, as well as a table 1350 for the punch type (e.g., of the table format shown in FIG. 13). FIG. 13A also shows, in the background, for sake of illustration only, a larger depiction of the punch shape 1360 corresponding to the selected punch type.

By clicking or selecting the "Custom" section 1370 of the punch properties dialog box 1350, the user can edit the particular size entry currently highlighted in the table portion 1350 of the punch properties dialog box 1350. The "Custom" section 1370 of the punch properties dialog box 1350 affords the user an opportunity to edit one or more of the parameters for the highlighted size entry of the corresponding punch type. The user can select the size entry to be highlighted. Upon editing and selection of the OK button in punch properties dialog box 1350, the edit values are not saved in the table 1350, but are used for the creation of the punch solid shape (e.g., stored in the solid shape sheet metal component).

When the shape created by utilization of the OnEdit function needs to be regenerated (e.g. evaluated), the OnUpdate function 415*b* is invoked in connection with utilization of the "g" communication channels of FIG. 4. Thus, the OnUpdate function 415*b* is invoked when program 400 needs to update the profile geometry, and is responsible for generating the profiles that will be used to create the tool geometry. When the OnUpdate function 415*b* is invoked, the tool shape, along with the current values of the parameters, is passed to it. During processing, the OnUpdate function 415*b* modifies the profiles held by the tool's shape.

The OnUpdateThickness function 415*c* enables the user to change the thickness value associated with a particular sheet metal part. The thickness value is originally specified as a default value in the stock properties. However, the thickness value can be changed by the user. For some sheet metal shapes, the profiles depend on the thickness of the part. For such thickness-dependent sheet metal shapes, the OnUpdateThickness function is utilized. Thus, the OnUpdateThickness function 415*c* is invoked when the tool shape is first dropped out of the catalog, or when a different stock is selected for the part. The OnUpdateThickness function 415*c* is responsible for modifying any profiles that depend on the thickness of the stock. Since the profiles of punch shapes typically do not depend on thickness, the OnUpdateThickness function 415*c* is typically empty for punch shapes. Most formed tools, however, do have profiles that depend on the thickness of the stock, and accordingly must implement the OnUpdateThickness function 415*c*. When the OnUpdateThickness function 415*c* is invoked, the tool shape, along with the current values of the parameters, are passed to it. In addition, the stock thickness is also passed to it. During processing, the OnUpdateThickness function 415*c* modifies the thickness-dependent profiles held by the tool's shape.

The tool shape defined in the sheet metal catalog is an important part of program 400. It is this shape, through the add-on component (see FIG. 7A and FIG. 7B) that possesses the link from the shape to the appropriate sheet metal profile generator 415. It is also this shape, thorough the sheet metal components, that hold onto the current values of the parameters.

SHEET METAL EDITING HANDLES AND EDITING BUTTONS

As mentioned above, program 400 provides and utilizes several editing handles and editing buttons for sheet metal solid shapes. Examples of these sheet metal editing andles and editing buttons are: (1) editing handles at the part level for parts that include bend shapes; (2) sizebox handles for stock and vertex shapes; (3) shape editing handles are available for stock, vertex, and bend shapes; (4) relief handles/buttons for bend shapes; (5) sizing buttons for editing stamp and punch shapes.

Figure 20B:
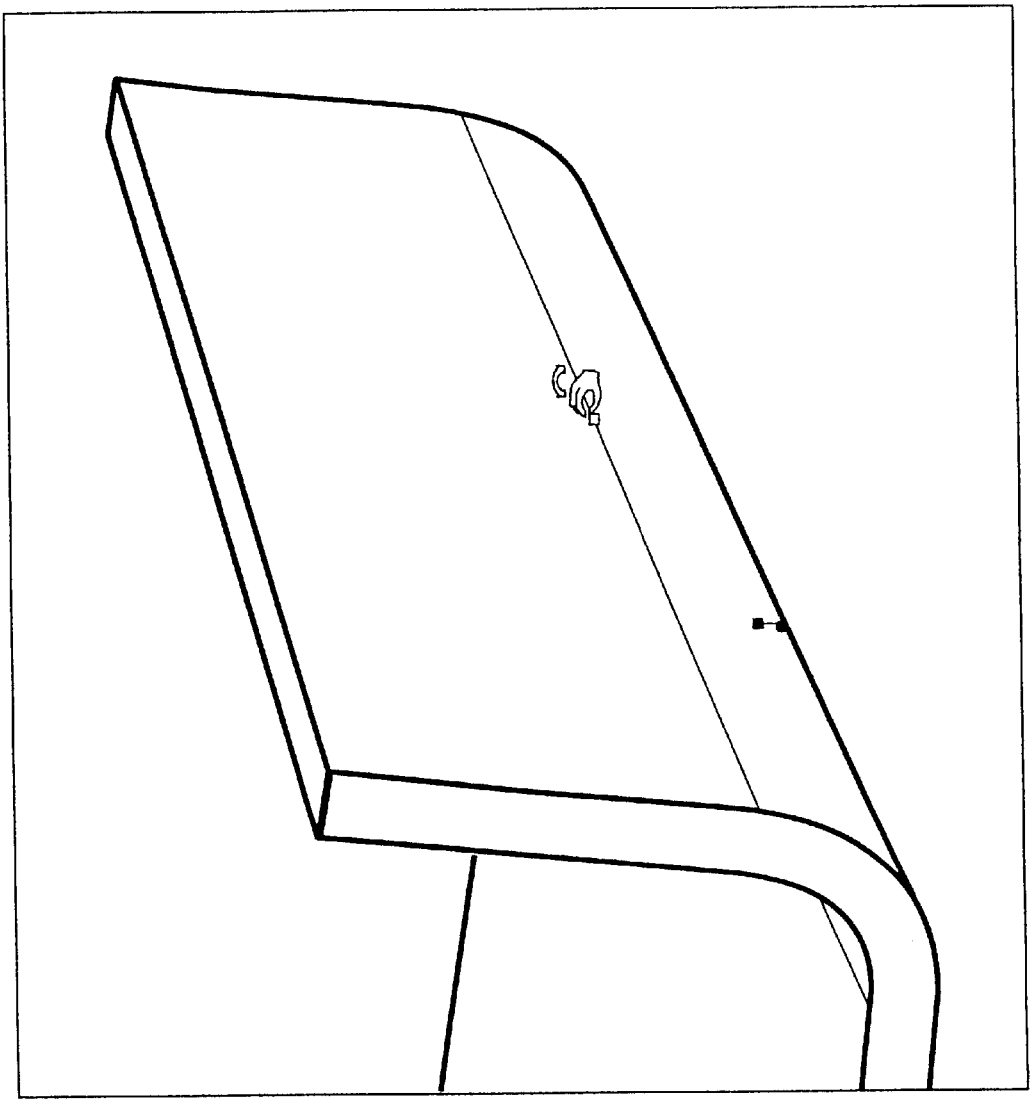
FIG. 20B is a diagrammatic view of a cursor changed to a hand and double-pointed arc proximate the angle editing handle of FIG. 20A.

FIG. 20A illustrates editing handles for parts that include bend shapes. In particular, FIG. 20A shows a bend solid shape 2000 along with two sets of handles 2001A, 2001B. Each set of handles 2001A, 2001B includes a distance editing handle 2002 and an angle editing handle 2003. The two sets of handles 2001A, 2001B are displayed when bend sold shape 2000 is selected at the part editing level and the cursor is placed over bend solid shape 2000. The two distance editing handles 2002 are shown as having a spherical shape; the two angle editing handles 2003 are shown as having a square shape. One of set of handles 2001A is located at a start of the bend where it is attached to flat stock; the other of set of handles 2001B is situated at the other end of the bend. The angle editing handles 2003 can be used visually to edit the angle of the bend by moving the cursor over the desired angle editing handle 2003 until the cursor changes to a hand and double-pointed arc (as shown in FIG. 20B). The user then clicks and drags on angle editing handle 2003 to obtain the approximate angle desired.

Figure 20C:
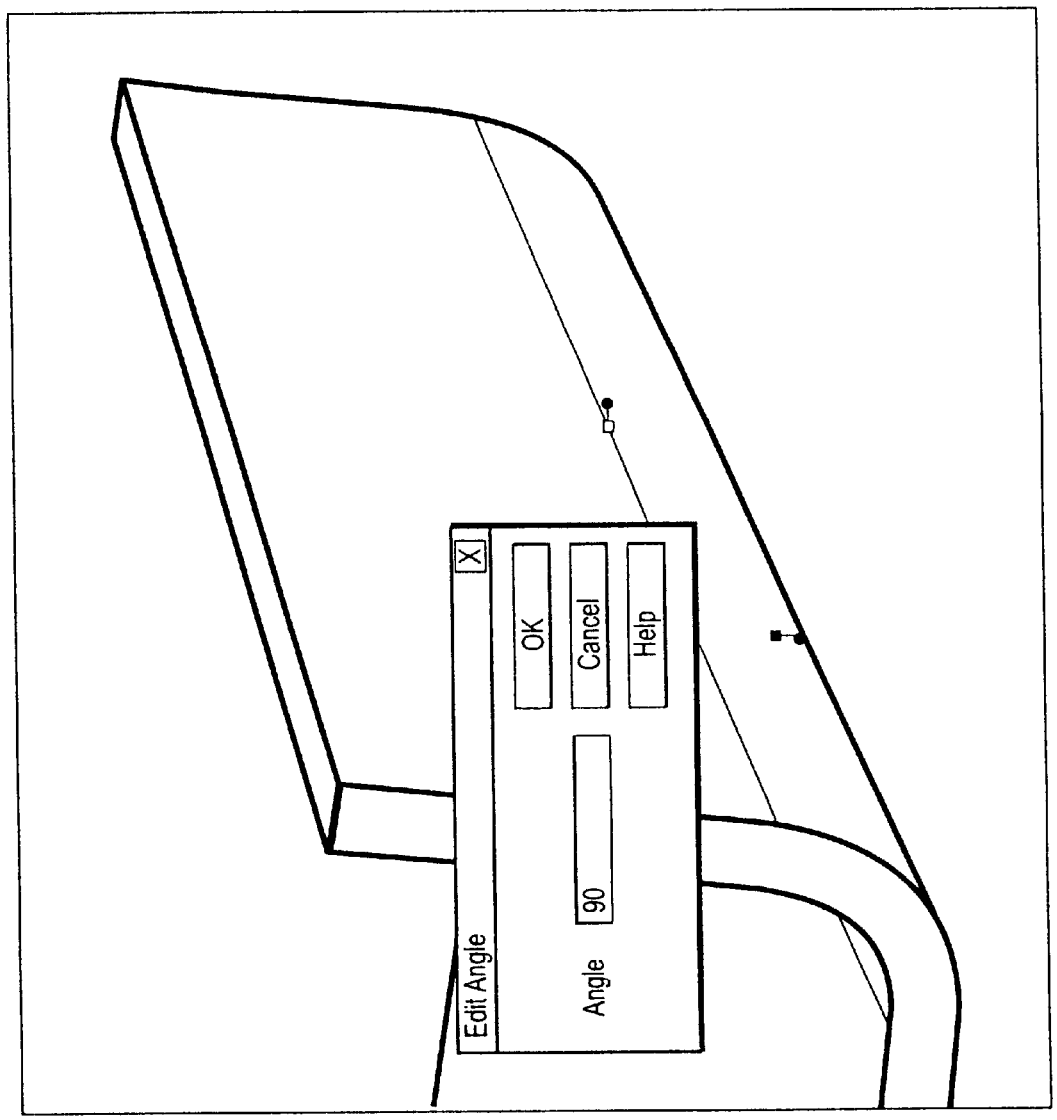
FIG. 20C is a diagrammatic view of a edit angle dialog box.

Dragging on the angle editing handle 2003 of FIG. 20A modifies the angle by repositioning the associated side of the bend, along with any unconstrained solid shapes also connected to that side of the bend. In addition, program 400 permits the user to right click on angle editing handle 2003, and thereby obtain. a pop-up menu having a list of the following options from which to select: (1) edit angle; (2) switch edit side; (3) parallel to edge. Upon selecting the edit angle option, the user is presented with the edit angle dialog box of FIG. 20C. The user can enter a user desired value in the edit angle dialog box of FIG. 20C, and thereby precisely edit the angle of the bend shape relative to the flat stock to which it was added.

Figure 20D:
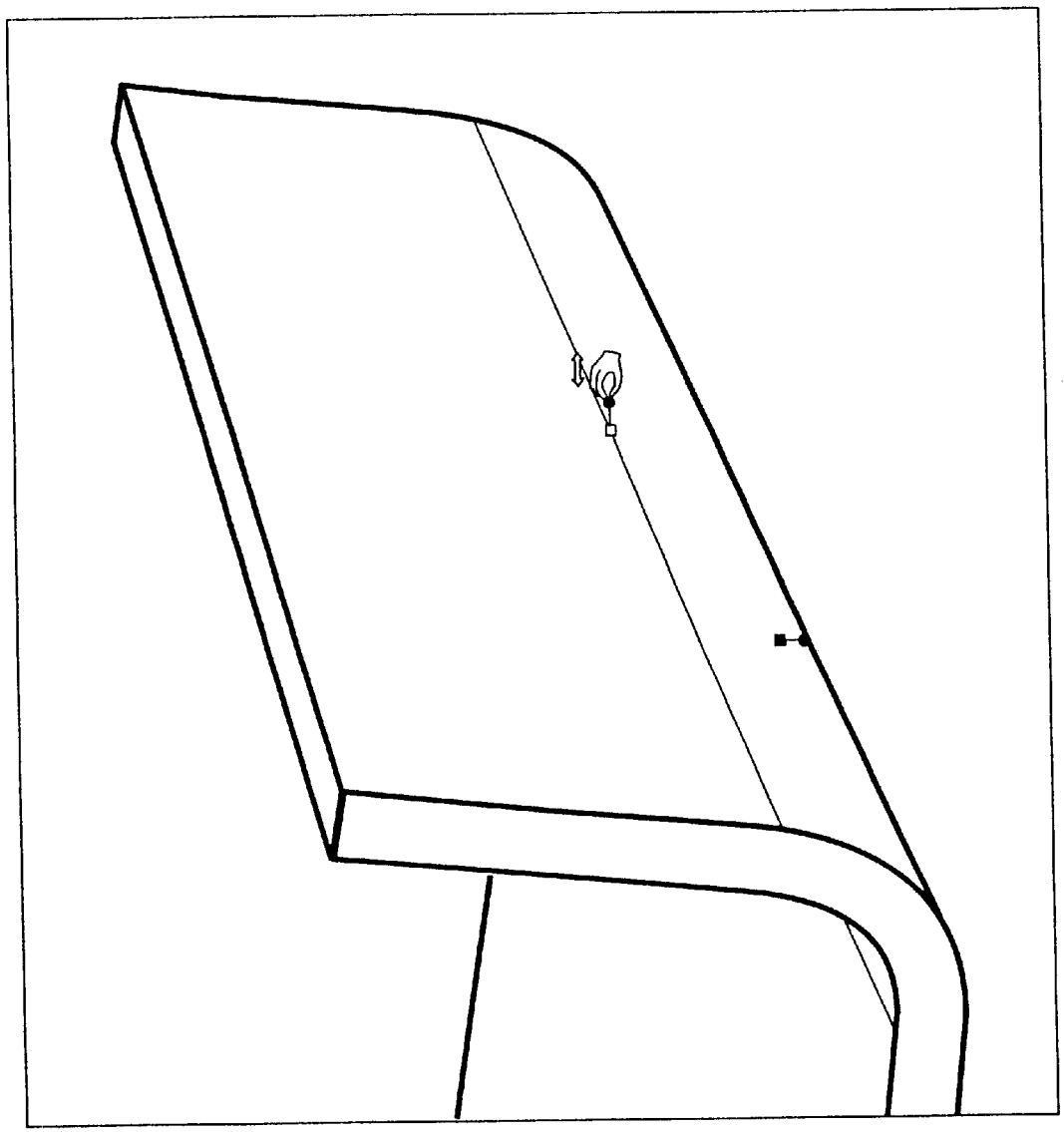
FIG. 20D is a diagrammatic view of a cursor changed to a hand and double-pointed arrow proximate the distance editing handle of FIG. 20A.

The alignment handles 2002 can be used to edit visually the height or length of the solid shape. The cursor can be moved over the distance editing handle 2002 until the cursor changes to a hand and double-pointed arrow as shown in FIG. 20D, and the distance editing handle 2002 then dragged to employ the neighborhood calculation to move a half space as defined by a corresponding half bend. The distance editing handle 2004 can similarly be used.

Figure 20F:
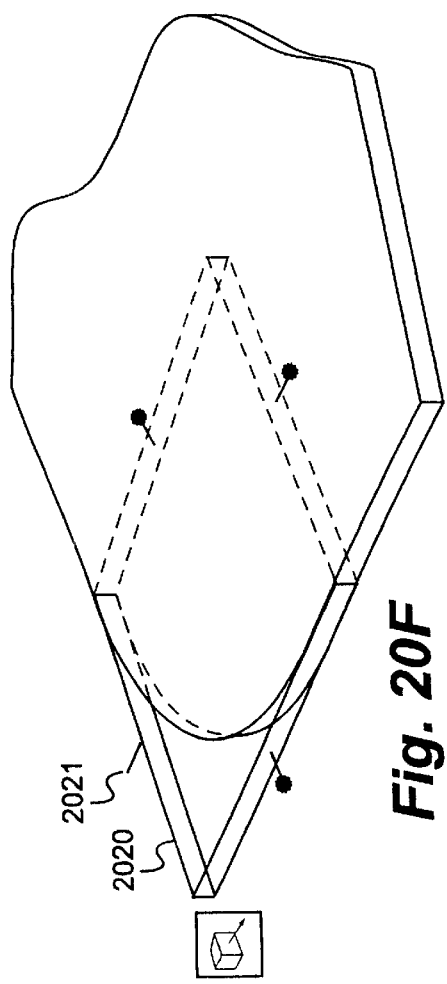
FIG. 20F is a diagrammatic view of a sizebox for a vertex shape with sizebox handles.
Figure 20H:
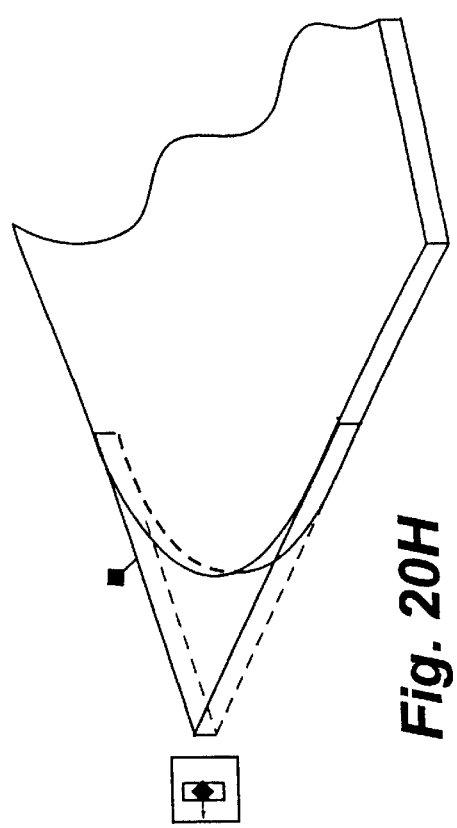
FIG. 20H is a diagrammatic view showing vertex shape editing handles.
Figure 20E:
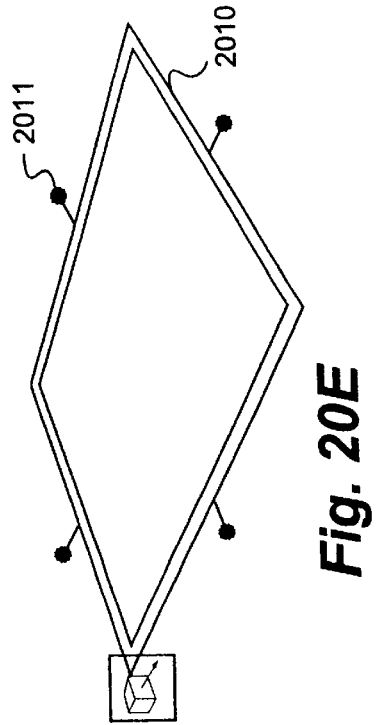
FIG. 20E is a diagrammatic view of a sizebox for a stock shape with sizebox handles.

The sizebox handles are used for editing stock shapes and vertex shapes at a shape editing level. FIG. 20E shows a sizebox 2010 for a stock shape with sizebox handles 2011; FIG. 20F shows sizebox 2020 for a vertex shape with sizebox handles 2021.

Figure 20G:
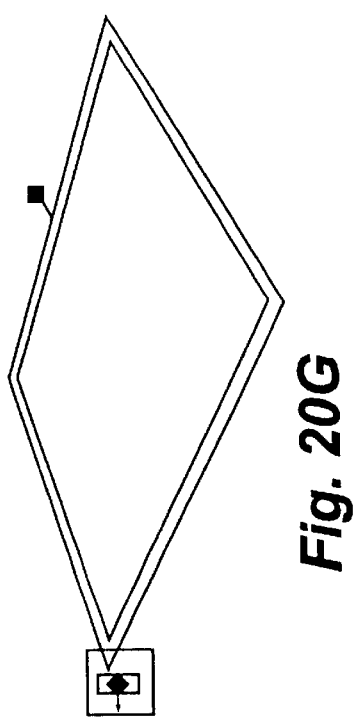
FIG. 20G is a diagrammatic view showing stock shape editing handles.

Shape editing handles are available for stock, vertex, and bend shapes, but are specialized for bend shapes due to the unique demands of sheet metal design. The stock shape editing handles are illustrated in FIG. 20G; the vertex shape editing handles are shown in FIG. 20H.

Figure 20J:
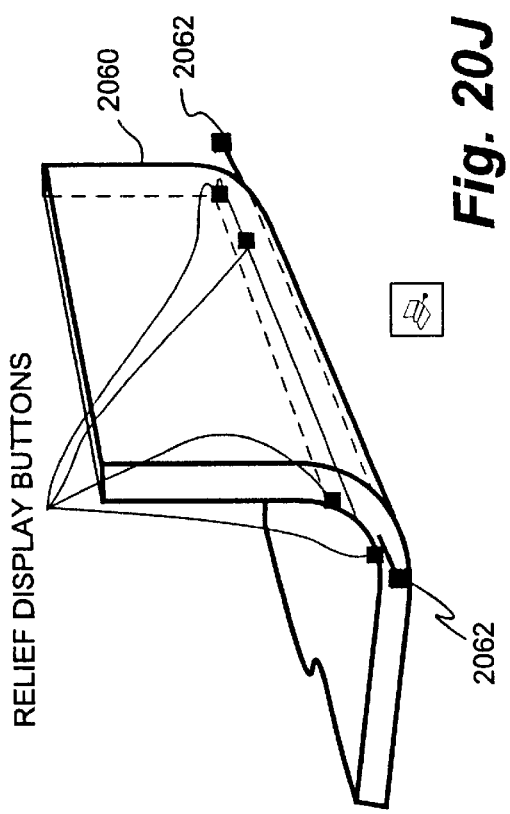
FIG. 20J is a diagrammatic view showing bend relief editing tools.
Figure 20I:
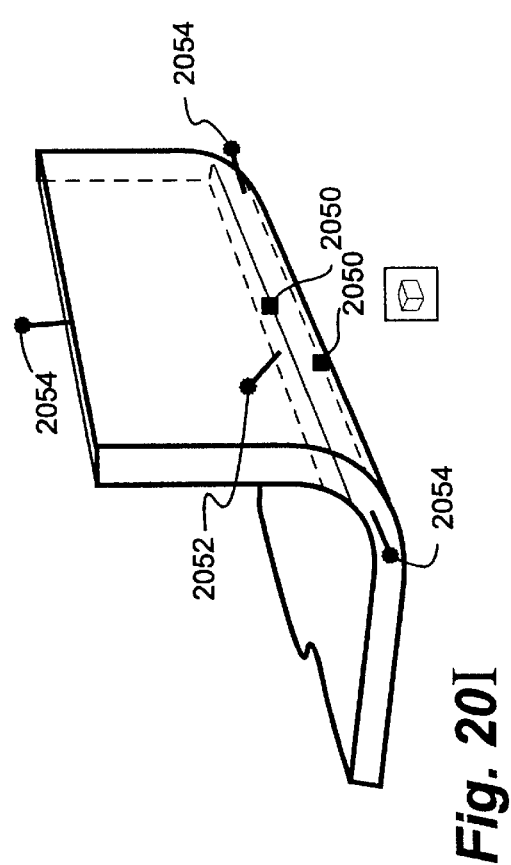
FIG. 20I is a diagrammatic view showing bend shape editing handles.

The bend shape editing handles provided by program 400, illustrated in FIG. 20I, allow editing of the angle of the bend, its radius, and its distance from stock to which it is added. The bend shape handles of a bend solid shape are displayed by default at the shape editing level. If the shape view is not currently active on the bend solid shape, it can be selected either by clicking on a handle toggle icon or by right-clicking on the solid shape, selecting the Show Edit Handle option, and then selecting the Shape option. The program 400 then displays the following handles, all illustrated in FIG. 20I: angle editing handles 2050; radius editing handle 2052; and distance editing handles 2054. The angle editing handles 2050, at the shape editing level, function identically to the angle editing handles 2003 at the part editing level as previously described in connection with FIG. 20A. The distance editing handles 2054 are displayed at both ends and the top of the bend solid shape, and can be used to edit visually the height or length of the bend solid shape. The user moves the cursor over the desired one of the distance editing handle 2054 until the cursor changes to a hand and double-pointed line, and then drags the distance editing handle 2054 to increase/decrease the height or length of the bend shape. Right-clicking on one of the distance editing handles 2054 results in the same type pop-up menu options available in connection with the distance editing handle 2002 as previously discussed (see FIG. 20A). The radius editing handle 2052 is used to edit visually the radius of the bend of the bend solid shape. The user moves the cursor over the radius editing handle 2052 at the center of the bend until the cursor changes to a hand and double arc with arrow. The user can then drag the radius editing handle 2052 toward or away from the bend's surface to decrease/increase the radius of the bend. Alternatively or additionally, the user can right click on the radius editing handle 2052 to obtain a pop-up menu with an option to edit the radius. Upon selecting the edit radius option from the pop-up menu, program 400 generates a dialog box in which the user can enter a precise value for the radius of the bend.

In addition to the shape tools illustrated in FIG. 20I, program 400 also includes relief tools for modifying relief of a bend solid shape as illustrated in FIG. 20J. These bend relief tools allowing the user to choose whether or not to display the bend relief and to increase/decrease the corner relief of the bend. The bend relief editing tools of FIG. 20J, if not currently active at the shape editing level, can be displayed either by clicking on the Handle Toggle to switch to the relief view or by right-clicking the bend solid shape, selecting Show Edit Handles, and then selecting Relief. The program 400 then displays the relief display buttons 2060 and corner relief editing handles 2062 of FIG. 20J. The relief display buttons 2060 allow a user to work with or without bend reliefs being displayed on sheet metal solid shape. The relief display buttons 2060, which are square in shape, are displayed at ends of the bend at the point where the bend joins the stock. The relief display buttons 2060 are inactive by default. To display a specific bend relief, the user moves the cursor over the corresponding relief display button 2060 until it changes to a pointing finger, after which the user selects the relief display button 2060. The relief display button 2060 then lightens in color, and the specified bend relief is displayed. Right clicking on the relief display button 2060 accesses certain bend properties. The corner relief editing handles 2062, diamond in shape, are displayed at ends of a bend shape. The corner relief editing handles 2062 permit a user to increase or decrease a corner relief of a bend solid shape. The user moves the cursor over a selected corner relief editing handle 2062 until it changes to a hand with a double pointed line, and then clicks and drags on the corner relief editing handle 2062, to edit the corner relief. To precisely edit the corner relief of the bend, the user can right click on the selected corner relief editing handle 2062 to obtain a pop-up menu with the same options available for the stock distance editing handles.

Figure 20K:
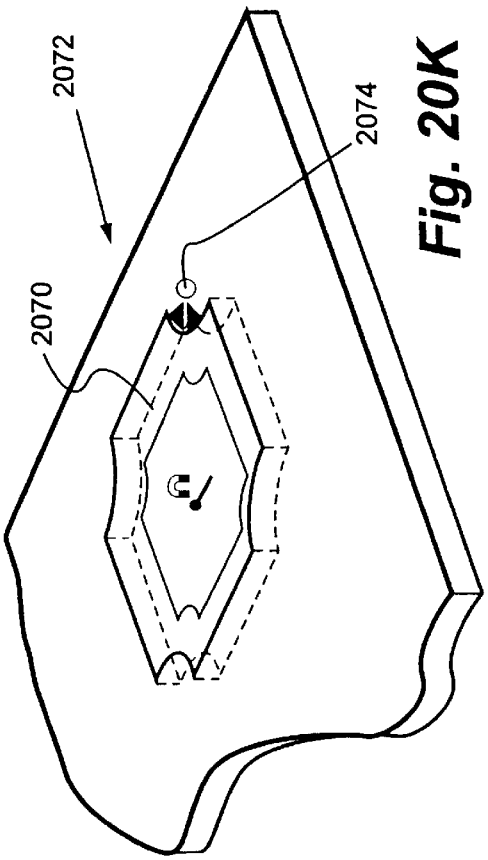
FIG. 20K is a diagrammatic view showing sizing buttons for editing stamp and punch shapes.

The program 400 has sizing buttons for editing stamp and punch shapes. These sizing buttons are in the form of up/down arrows for modifying stamp and punch sheet metal solid shapes. For example, FIG. 20K shows a punch solid shape 2070 and a punch sizing button set 2072 including an up (red) arrow and a down (gray) arrow. The up and down arrow buttons allow a user to toggle through the entries in the tool table for the selected shape 2070. To toggle the up arrow, the user moves the cursor over the up arrow until the cursor changes to a pointing finger and the up arrow changes from a red to a yellow color (indicating that it has been selected). As the user clicks on the up (now yellow) arrow, several things happen. First, the punch solid shape 2070 changes to reflect the new size selection (thereby allowing a preview). Second, an apply button 2074 (green) is displayed to the right of the up and down arrows. Third, the grayed-out down arrow button changes to red, indicating that it too is now active and can be used to scroll through the selections. When the desired shape size is found, the desired shape is then applied to the scene by clicking on the green apply button 2074. Thus, the arrow buttons can be used to search through default sizes for an appropriate shape, and the apply button 2074 used to select and add the shape to the scene. If none of the default shapes satisfies a user's requirement, the user can create a custom shape.

COLLECTIVE MOVEMENT OF NEIGHBORHOODS

Figure 21A:
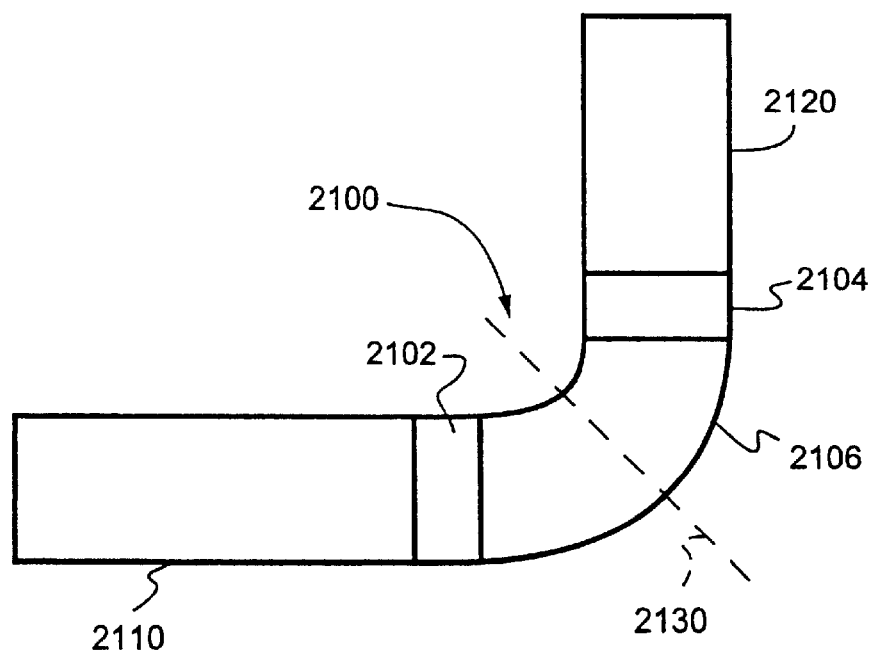
FIG. 21A and FIG. 21B are side views showing before and after movement of a neighborhood of sheet metal solid shapes in accordance with an aspect of the invention.

The program 400 and method of the present invention also allows collective movement of entire scene half spaces or scene neighborhoods which involve sheet metal solid shapes. For example, FIG. 21A shows a compound solid shape which comprises bend solid shape 2100 interposed between two flat stock solid shapes 2110 and 2120. As understood from the previous discussion, bend solid shape 2100 has a bend segment or child bend solid shape 2106 as well as two stock or flange child solid shapes 2102 and 2104. The bend solid shape is shown in FIG. 21A as having a ninety degree bend about axis 2130. As an example of the collective movement of a neighborhood, FIG. 21B shows that the present invention allows the compound solid shape to be rolled out about angle 2130 so that the entire compound solid shape is essentially flat.

Figure 21B:
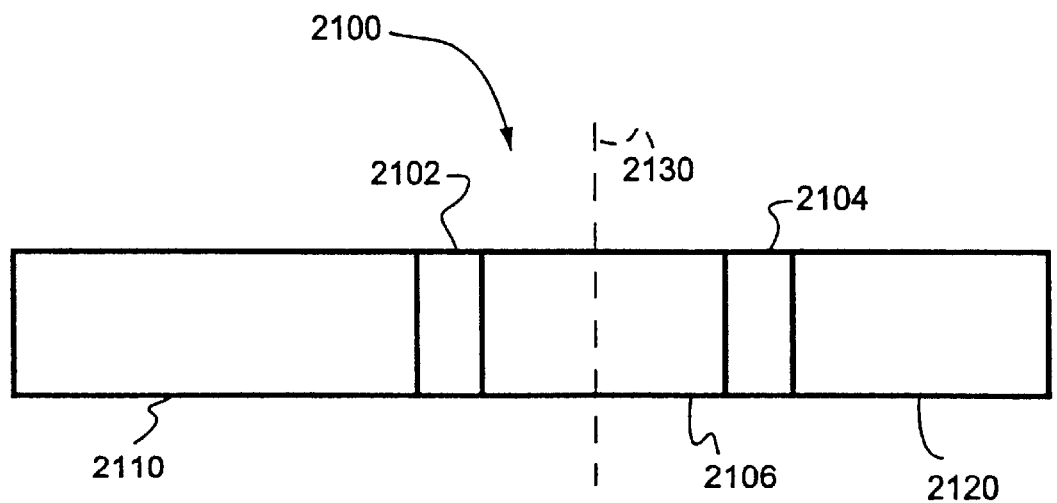

The example scenario of FIG. 21A and FIG. 21B thus shows an unfolding of bend solid shape 2100 and other solid shapes that are in a half space as delineated by the selected axis. Such unfolding is particularly advantageous when a flat drawing view of a part is desired. But it should be understood that the collective neighborhood movement of the present invention is applicable for movements other than unfolding to a flat position, as any angle of movement can be selected resulting in collective movement of both portions of solid bend shape 2100 and flat stock solid shape 2120.

Figure 22:
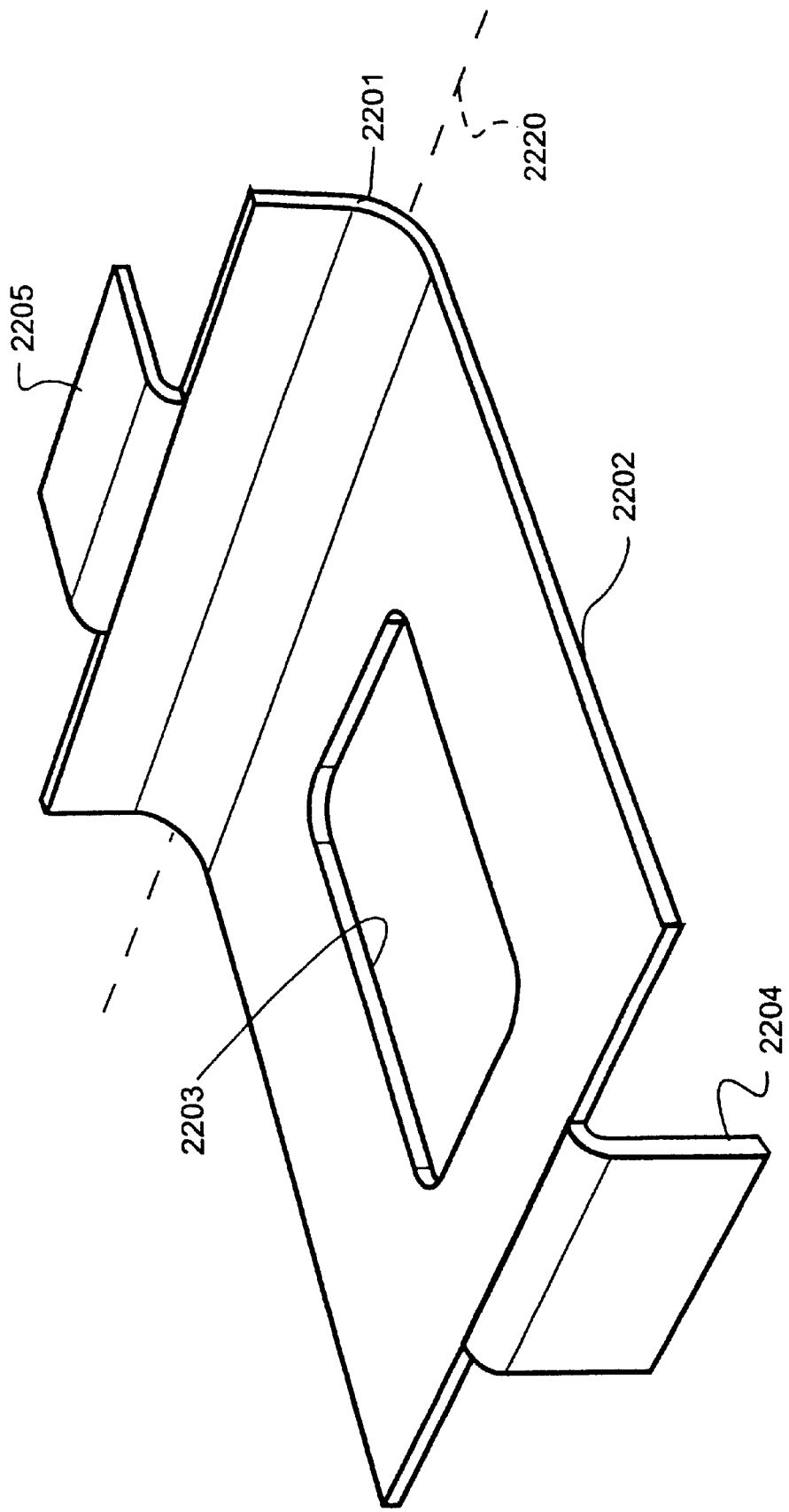
FIG. 22 is an isometric view of a part utilized to illustrate for a collective movement of neighborhood feature of the present invention.

FIG. 22 shows another solid part 2200 for which serves as further example for the collective movement of neighborhoods in accordance with the present invention. FIG. 22 shows that part 2200 comprises the solid shapes 2201, 2202, 2203, 2204, and 2205. The solid shapes 2201, 2202, 2203, 2204, and 2205 are seen more distinctly in FIG. 22A, wherein it clearly appears that solid shape 2201 is a bend solid shape; solid shape 2202 is a flat stock solid shape; solid shape 2203 is a hole or punch solid shape; solid shape 2204 and solid shape 2205 are both bend solid shapes. As understood from the preceding discussions and shown in FIG. 22A, bend solid shape 2201 has a bend segment or child bend solid shape 2210 but only one stock or flange child solid shape 2212. The bend solid shape 2210 has a bend about axis 2220. The bend solid shape 2204 has a bend segment or child bend solid shape 2240 and only one stock or flange child solid shape 2242. Likewise, the bend solid shape 2205 has a bend segment or child bend solid shape 2250 and only one stock or flange child solid shape 2252.

Figure 23:
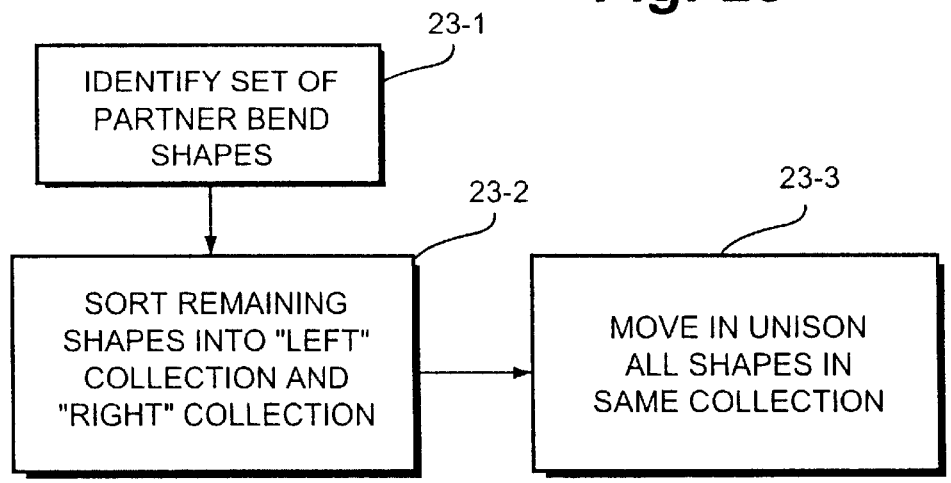
FIG. 23 is a flowchart showing basic steps involved in a procedure for the collective movement of entire scene half spaces about a user-specified bend of a bend solid shape.

FIG. 23 depicts basic steps involved in the collective movement of entire scene half spaces about a user-specified bend of a bend solid shape. As a first step 23-1, the program 400 identifies a collection or set of "partner" bend solid shapes which divide a part into two distinct "neighborhoods". The "partner" bend solid shapes are bend shapes that are coaxial with the user-specified bend and possess the same radius.

Figure 22A:
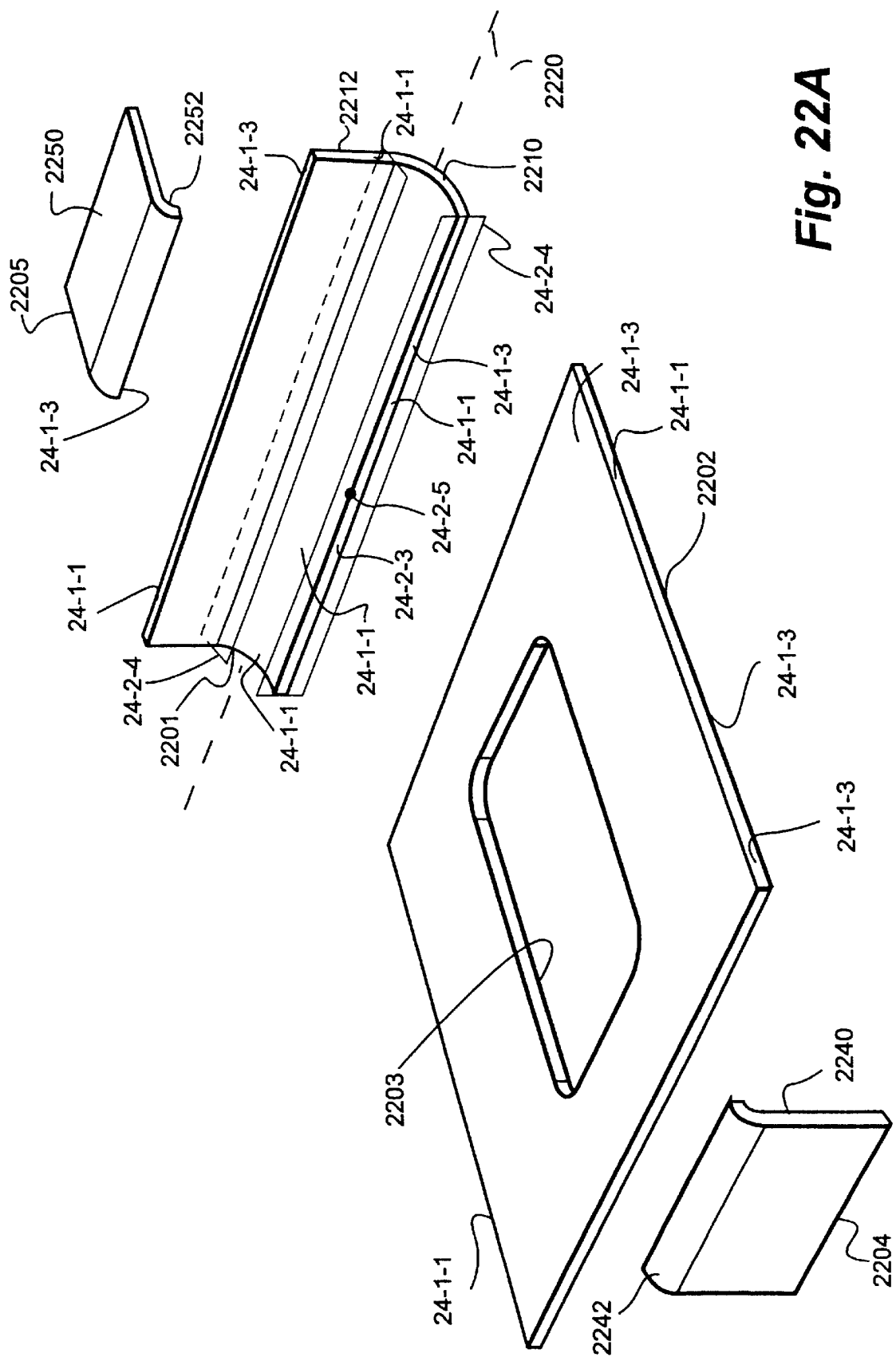
FIG. 22A is an exploded view of the part of FIG. 22.
Figure 25:
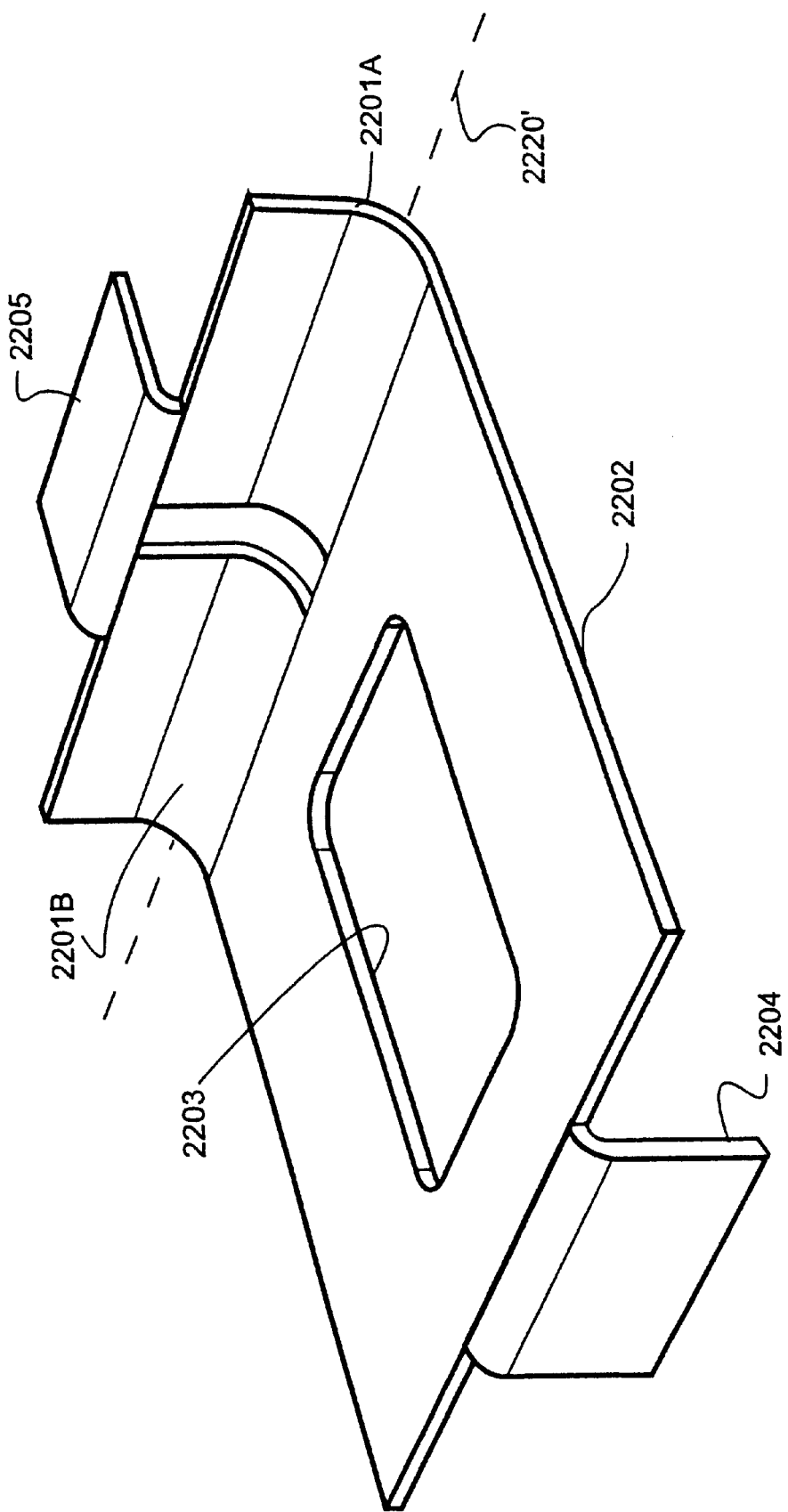
FIG. 25 is an isometric view of another part utilized to illustrate a collective movement of neighborhood feature of the present invention.

In the particular example shown in FIG. 22 and FIG. 22A, wherein the user-specified bend shape is shape 2201 and in which collective movement of neighborhoods is to occur about axis 2220, there is but one bend solid shape along axis 2220. Therefore, only one bend is identified at step 23-1. FIG. 25, by contrast, shows a part having a set of partner bend solid shapes along axis 2220', particularly bend solid shapes 2201A and 2201B. Thus, for the part of FIG. 25, there is one set of "partner" bend solid shapes (shapes 2201A and 2201B) which divide a part into two distinct "neighborhoods".

As a second step 23-2, the program sorts the remaining shapes of the part into one of two collections: a left collection for the shapes located on the left side of the bend and a right collection for the shapes located on the right side of the bend. The left collection and the right collection are the two half spaces defined by the set of partner bends. In accordance with the steps of FIG. 23, the program 400 can identify portions of the sheet metal part that should be moved as a unit, e.g., when modifying a bend solid shape (for example, when changing the angle of the bend). The sorting of shapes at step 23-2 employs an adjacency procedure, the steps of which are summarized in FIG. 24. Lastly, as step 23-3, all shapes in the same collection are moved in unison when one of the shape of the collection is moved, e.g., when the bend angle is changed.

Figure 24:
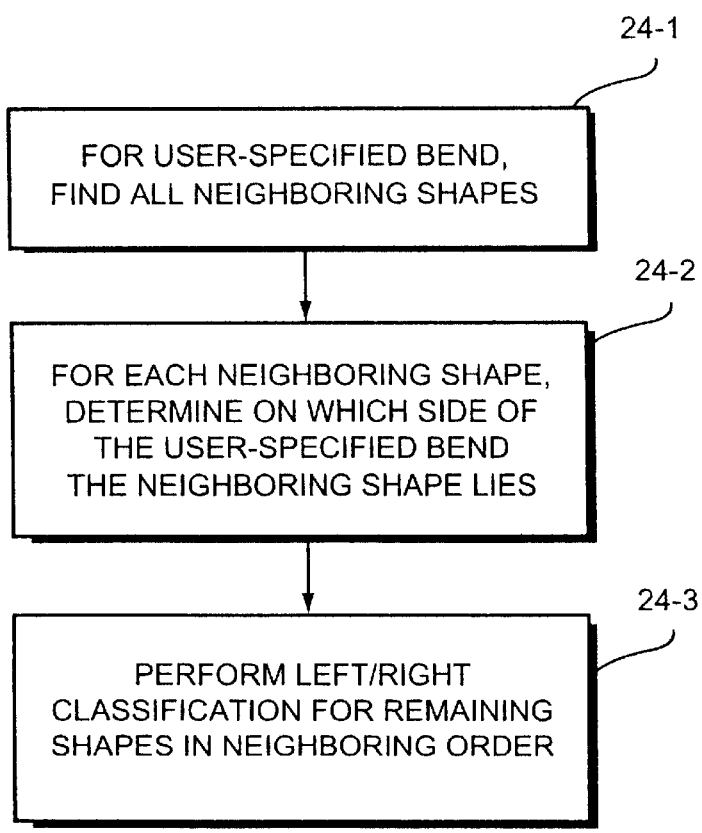
FIG. 24 is a flowchart showing sub-steps of the procedure of FIG. 23.
Figure 24:
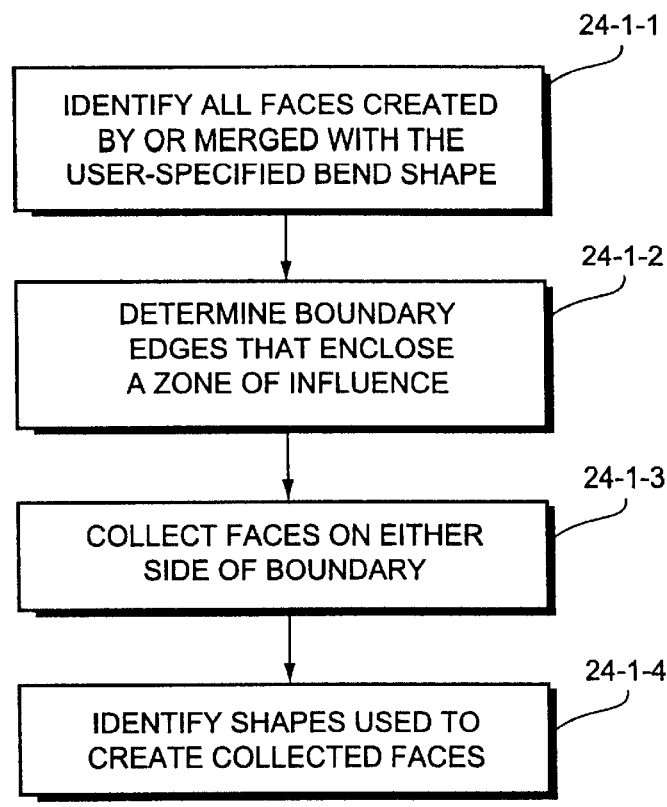
Figure 24:
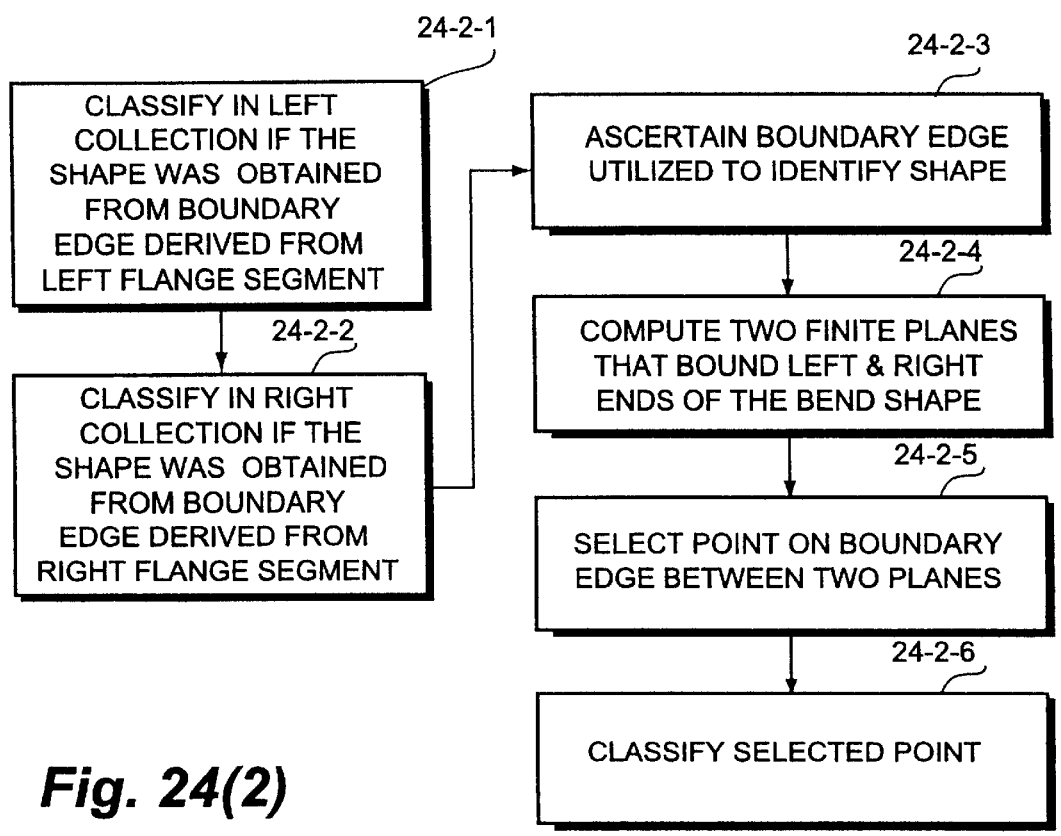

The adjacency procedure of FIG. 24 begins by finding all the neighboring shapes for the user-specified bend, as depicted by step 24-1. Substeps involved in finding all the neighboring shapes are illustrated in FIG. 24(1). Then, at step 24-2, for each neighboring shape the adjacency procedure determines on which side of the user-specified bend the shape lies. Substeps involved in determining on which side of the user-specified bend the shape lies are illustrated in FIG. 24(2). Lastly, at step 24-3, the adjacency procedure performs the left/right side classification for remaining shapes in the part in neighboring order.

In finding all the neighboring shapes for the user-specified bend, as shown in FIG. 24(1) the adjacency procedure first identifies, for the part, all faces that were created from the bend (substep 24-1-1). Some of these faces will have been merged with the faces of other shapes. In the example of FIG. 22 and FIG. 22A, all such faces identified at substep 24-1-1 are labeled as 24-1-1 in FIG. 22A. It is particularly to be noted that two faces of solid shape 2202 are also identified at substep 24-1-1, as these faces are merged with coplanar faces of solid shape 2201.

Figure 22B:
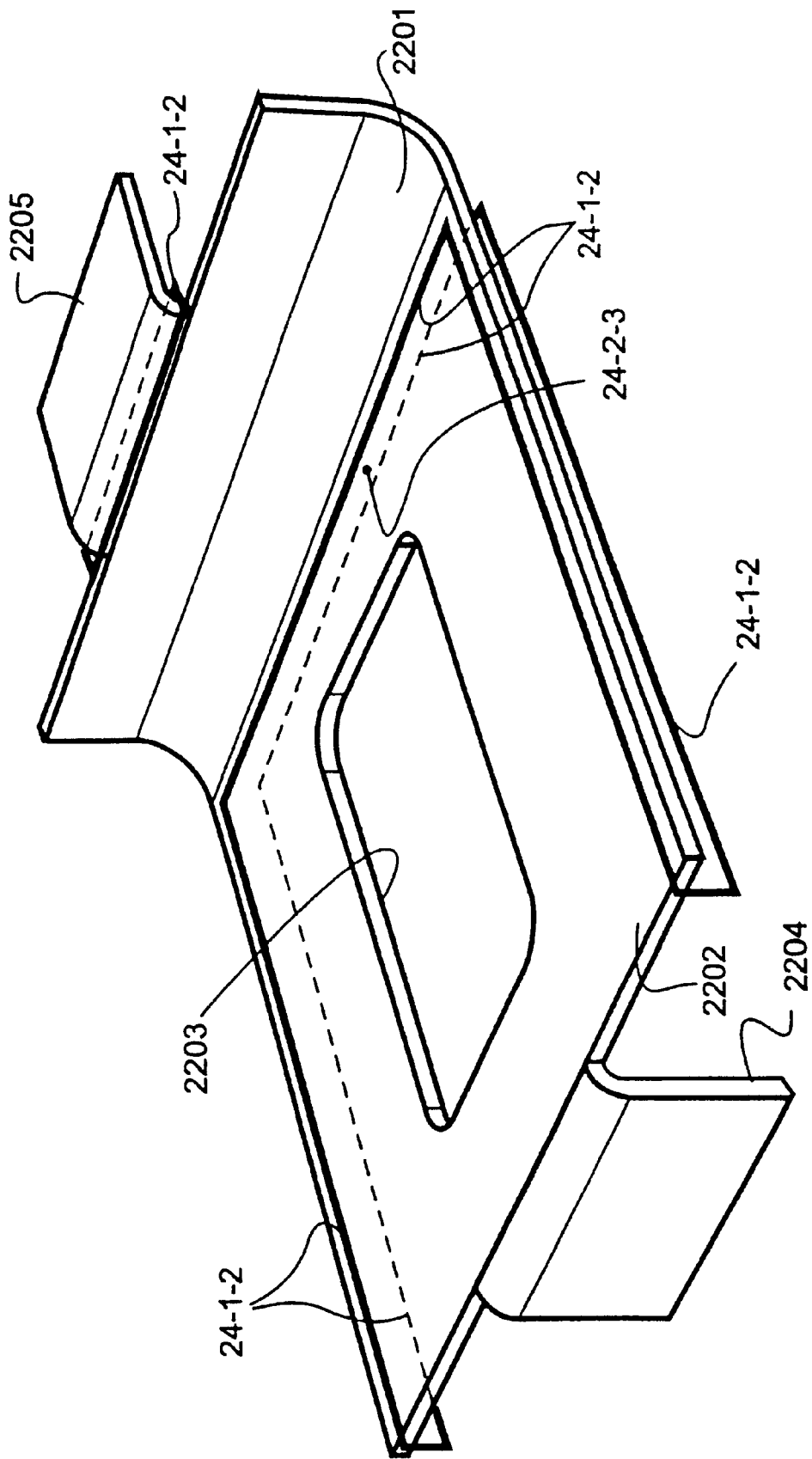
FIG. 22B is an exploded view of the part of FIG. 22, and further showing boundary edges that enclose a zone of influence.

From the set of faces identified at substep 24-1-1, at substep 24-1-2 the adjacency procedure determines the boundary edges that enclose a "zone of influence" of the bend. The boundary edges determined at substep 24-1-2 are the edges of the faces identified at substep 24-1-1. In the example of FIG. 22, the boundary edges are depicted by lines 24-1-2 shown in FIG. 22B.

Then, from each of the boundary edges determined at substep 24-1-2, at substep 24-1-3 the adjacency procedure collects the faces on either side of the boundary. For the example shown in FIG. 22 and FIG. 22A, the faces collected at substep 24-1-3 are those labeled as 24-1-3 in FIG. 22A.

For each of the faces collected at substep 24-1-3, at substep 24-1-4 the adjacency procedure identifies the shape used to create the face. Thus, the shapes identified at substep 24-1-4 are the neighboring shapes for step 24-1 (e.g., the neighboring shapes for the user-specified bend). For the example shown in FIG. 22 and FIG. 22A, the neighboring shapes are shapes 2202, 2203 and 2205. In this regard, it will be noted that shape 2203 is used to define the flat faces of shape 2202, and thus shape 2203 is a shape identified at substep 24-1-4.

With each neighboring shape having been identified at step 24-1, at step 24-2 the adjacency procedure determines on which side of the user-specified bend each neighboring shape lies. The determination of step 24-2, performed for each shape, involves three alternatives, including a first alternative at substep 24-2-1 of classifying the solid shape obtained in step 24-1 in the left collection if the shape was obtained via a boundary edge derived from the first (e.g., left) flange segment (e.g., flange child solid shape) of the user-specified bend shape. Alternatively, step 24-2 can involve classifying the solid shape obtained in step 24-1 in the right collection if the shape was obtained via a boundary edge derived from the second (e.g., right) flange segment (e.g., flange child solid shape) of the user-specified bend shape. As a third alternative, substeps 24-2-3 through 24-2-6 are performed. At substep 24-2-3, the boundary edge used to identify the shape is identified. At substep 24-2-4, the adjacency procedure computes two (finite) planes that bound the left and right sides bend shapes. At substep 24-2-5, a convenient point is selected on the boundary edge. At substep 24-2-6 a classification of the point selected at substep 24-2-5 is performed into either the left collection or the right collection into either the left collection or right collection based on whether the point lies in either the left plane or the right plane.

In the example of FIG. 22 and FIG. 22A, neighboring shape 2205 is clearly obtained from a boundary edge associated with flange 2212 of bend shape 2201. Therefore, neighboring shape 2205 is easily classifiable in the right collection at substep 24-2-2. But neighboring shapes 2202 and 2203 are not derived from a left flange section of bend shape 2201, since bend shape 2201 does not even have a left flange section. Therefore, in classifying neighboring shape 2202 and shape 2203, substeps 24-2-3 through 24-2-6 must be implemented.

In applying substeps 24-2-3 through 24-2-6 to the neighboring shapes 2202 and 2203 of FIG. 22 and FIG. 22A, it is understood that the boundary edge 24-2-3 (see FIG. 22A) was utilized to identify the neighboring shape 2202. Then, at substep 24-2-4, two finite planes 24-2-4 (see FIG. 22A) are computed to bound the left and right sides of the bend shape. At substep 24-2-5, a convenient point 24-2-5 is selected on the boundary edge. At substep 24-2-6 a classification of the point selected at substep 24-2-5 (e.g., point 24-2-5) is performed into either the left collection or the right collection. As evident from FIG. 22A, the point 24-2-5 should be classified in the left collection. Thus, shapes 2202 and 2203 are classified in the left collection.

Thus, in the example of FIG. 22 and FIG. 22A, shapes 2202, 2203, and 2205 have already been classified, with shapes 2202 and 2203 having been classified into the left collection while shape 2205 has been classified in the right collection. Thus, shape 2204 has yet to be classified. As substep 24-3 (see FIG. 24), the left/right classification is performed for remaining shapes, the classification being performed in neighboring order. In particular, substep 24-3 begins by repeating the logic of substep 24-1, e.g., by finding the neighboring shapes to the shapes already classified. In the example of FIG. 22 and FIG. 22A, shape 2204 is identified as a shape which neighbors shape 2202. In view of the fact that shape 2204 neighbors shape 2202, and the fact that shape 2202 is classified in the left collection, shape 2204 is also classified in the left collection.

Substep 24-3 is applied to each shape until all shapes in the part have been visited. As each shape is processed, if the shape is a previously identified partner bend, it is not added to either collection, but instead marked as visited and not subject to substep 24-3.

In the example shown in FIG. 22 and FIG. 22A, the bend angle about axis 2220 can be changed, with the two half spaces defined on either side of axis 2220 moving in unison. In other words, as the angle of the bend about axis 2220 is changed, shape 2205 moves with flange 2212 of shape 2201, and if there is any rotation of the left half space, shapes 2202, 2203, and 2204 are rotated in unison about axis 2220 as if they were one shape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer program product which provides a visual depiction of a three dimensional object upon a display device, the program comprising computer readable coded instructions stored in a memory, the computer readable coded instructions being executable on a processor to which information is input via a user input device;

wherein, program objects for solid shapes utilize drag and drop instructions for situating the solid shapes in a scene of the display device;

wherein program objects for a first set of solid shapes utilize generic drag and drop instructions but program objects for a second set of solid shapes utilize customized drag and drop instructions; and wherein the program objects for the second set of solid shapes are for application specific solid shapes.

2. The computer program product of claim 1, wherein the program objects for the second set of solid shapes are sheet metal solid shapes.

3. The computer program product of claim 1, wherein the program objects for the second set have an application-specific interface for acquiring environmental information for executing the customized drag and drop instructions.

4. The computer program product of claim 3, wherein the coded instructions makes a determination whether the application-specific drag and drop interface exists for a program object of a solid shape being processed, and on the basis of the determination utilizes one of the generic drag and drop instructions and the customized drag and drop instructions.

5. The computer program product of claim 1, wherein the second set of solid shapes include differing types of sheet metal solid shapes, and wherein for each of the differing types of sheet metal solid shapes a corresponding procedure of customized drag and drop instructions is performed.

6. The computer program product of claim 5, wherein the differing types of sheet metal solid shapes include a flat stock solid shape, a bend solid shape, a punch solid shape, and a form solid shape.

7. A computer program product which provides a visual depiction of a three dimensional object upon a display device, the program comprising computer readable coded instructions stored in a memory, the computer readable coded instructions being executable on a processor to which information is input via a user input device;

wherein, program objects for solid shapes utilize drag and drop instructions for situating the solid shapes in a scene of the display device;

wherein program objects for a first set of solid shapes utilize generic drag and drop instructions but program objects for a second set of solid shapes utilize customized drag and drop instructions; and wherein program objects for some of the second set of solid shapes include geometric profile information for use in an evaluation process, whereas program objects for others of the second set of solid shapes transmit reference information to a profile generator, and wherein the profile generator generates and returns to the others of the second set the geometric profile information for use in the feature-based evaluation process.

8. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

wherein, in response to communication via the user input device of a selected solid shape designated from a plurality of solid shapes, the program determines whether to utilize one of generic drag and drop instructions and customized drag and drop instructions for a program object of the selected solid shape for situating the selected solid shape in a scene on the display device;

wherein program objects of a first set of solid shapes utilize the generic drag and drop instructions but program objects for a second set of solid shapes utilize the customized drag and drop instructions, the selected solid shape being in the second set of solid shapes; and wherein the program objects for the second set of solid shapes are for application specific solid shapes.

9. The system of claim 8, wherein the program objects for the second set of solid shapes are sheet metal solid shapes.

10. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

wherein, in response to communication via the user input device of a selected solid shape designated from a plurality of solid shapes, the program determines whether to utilize one of generic drag and drop instructions and customized drag and drop instructions for a program object of the selected solid shape for situating the selected solid shape in a scene on the display device; and wherein the program objects for the second set have an application-specific interface for acquiring environmental information for executing the customized drag and drop instructions.

11. The system of claim 10, wherein program objects of a first set of solid shapes utilize the generic drag and drop instructions but program objects for a second set of solid shapes utilize the customized drag and drop instructions, the selected solid shape being in the second set of solid shapes.

12. The system of claim 10, wherein the coded instructions make a determination whether the application-specific drag and drop interface exists for a program object of a solid shape being processed, and on the basis of the determination utilizes one of the eneric dra and op instructions and the customized drag and drop instructions.

13. A three dimensional geometric modeling system comprising:
   a processor which executes a program comprising set of coded instructions stored in a memory;
   a display device upon which, when executed, the program provides a visual depiction of a three dimensional object comprising at least one solid shape,
   a user input device for inputting information to the processor;
   wherein, in response to communication via the user input device of a selected solid shape designated from a plurality of solid shapes, the program determines whether to utilize one of generic drag and drop instructions and customized drag and drop instructions for a program object of the selected solid shape for situating the selected solid shape in a scene on the display device; and
   wherein the second set of solid shapes include differing types of sheet metal solid shapes, and wherein for each of the differing types of sheet metal solid shapes a corresponding procedure of customized drag and drop instructions is performed.

14. The system of claim 13, wherein the differing types of sheet metal solid shapes include a flat stock solid shape, a bend solid shape, a punch solid shape, and a form solid shape.

15. A three dimensional geometric modeling system comprising:
   a processor which executes a program comprising set of coded instructions stored in a memory;
   a display device upon which, when executed, the program provides a visual depiction of a three dimensional object comprising at least one solid shape,
   a user input device for inputting information to the processor;
   wherein, in response to communication via the user input device of a selected solid shape designated from a plurality of solid shapes, the program determines whether to utilize one of generic drag and drop instructions and customized drag and drop instructions for a program object of the selected solid shape for situating the selected solid shape in a scene on the display device; and
   wherein program objects for some of the second set of solid shapes include geometric profile information for use in an evaluation process, whereas program objects for others of the second set of solid shapes transmit reference information to a profile generator, and wherein the profile generator generates and returns to the others of the second set the geometric profile information for use in the feature-based evaluation process.

16. A method of operating a three dimensional geometric modeling system having a processor which executes a program comprising set of coded instructions stored in a memory; a display device upon which, when executed, the program provides a visual depiction of a three dimensional object comprising at least one solid shape; and, a user input device for inputting information to the processor; the method comprising:
   receiving via the user input device indication of a selected solid shape designated from a plurality of solid shapes, and in response thereto determining whether to utilize one of generic drag and drop instructions and customized drag and drop instructions for a program object of the selected solid shape for situating the selected solid shape in a scene on the display device;
   wherein program objects of a first set of solid shapes utilize the generic drag and drop instructions but program objects for a second set of solid shapes utilize the customized drag and drop instructions, the selected solid shape being in the second set of solid shapes; and
   wherein the program objects for the second set of solid shapes are for application specific solid shapes.

17. The method of claim 16, wherein the program objects for the second set of solid shapes are sheet metal solid shapes.

18. The method of claim 16, further comprising providing, for the program objects for the second set, an application-specific interface for acquiring environmental information for executing the customized drag and drop instructions.

19. The method of claim 16, wherein the second set of solid shapes include differing types of sheet metal solid shapes, and further comprising performing a corresponding procedure of customized drag and drop instructions for each of the differing types of sheet metal solid shapes.

20. The method of claim 19, wherein the differing types of sheet metal solid shapes include a flat stock solid shape, a bend solid shape, a punch solid shape, and a form solid shape.

21. The method of claim 16, further comprising:
   making the determination whether an application-specific drag and drop interface exists for a program object of a solid shape being processed; and, on the basis of the determination,
   utilizing one of the generic drag and drop instructions and the customized drag and drop instructions.

22. A method of operating a three dimensional geometric modeling system having a processor which executes a program comprising set of coded instructions stored in a memory; a display device upon which, when executed, the program provides a visual depiction of a three dimensional object comprising at least one solid shape; and, a user input device for inputting information to the processor; the method comprising:
   receiving via the user input device indication of a selected solid shape designated from a plurality of solid shapes, and in response thereto
   determining whether to utilize one of generic drag and drop instructions and customized drag and drop instructions for a program object of the selected solid shape for situating the selected solid shape in a scene on the display device;
   wherein program objects of a first set of solid shapes utilize the generic drag and drop instructions but program objects for a second set of solid shapes utilize the customized drag and drop instructions, the selected solid shape being in the second set of solid shapes; and
   wherein program objects for some of the second set of solid shapes include geometric profile information for use in an evaluation process, whereas program objects for others of the second set of solid shapes transmit reference information to a profile generator, and wherein the method further comprises using a profile generator to generate and return to the others of the second set the geometric profile information for use in the feature-based evaluation process.

23. A computer program product which provides a visual depiction of a three dimensional object upon a display device, the program comprising computer readable coded instructions stored in a memory, the computer readable coded instructions being executable on a processor to which information is input via a user input device;

wherein a program object is created for a sheet metal solid shape to be displayed upon the display device; and wherein one of plural drag and drop procedures are utilized by the program object in accordance with a type of the sheet metal solid shape to be displayed, the type being one of a flat stock solid shape, a bend solid shape, a punch solid shape, and a form solid shape;

further comprising a profile generator, and wherein the program object transmits reference information to the profile generator, and wherein the profile generator generates and returns to the program object geometric profile information for use in an evaluation process.

24. A computer program product which provides a visual depiction of a three dimensional object upon a display device, the program comprising computer readable coded instructions stored in a memory, the computer readable coded instructions being executable on a processor to which information is input via a user input device;

wherein a program object is created for a sheet metal solid shape to be displayed upon the display device; and wherein one of plural drag and drop procedures are utilized by the program object in accordance with a type of the sheet metal solid shape to be displayed;

wherein the sheet metal solid shape is a flat stock solid shape, and wherein the drag and drop procedure for the flat stock solid shape performs the steps of.
(1) accessing stock information of a target solid shape;
(2) positioning the flat stock solid shape relative to the target solid shape;
(3) performing a history reordering of a part which includes the flat stock solid shape.

25. A computer program product which provides a visual depiction of a three dimensional object upon a display device, the program comprising computer readable coded instructions stored in a memory, the computer readable coded instructions being executable on a processor to which information is input via a user input device;

wherein a program object is created for a sheet metal solid shape to be displayed upon the display device; and wherein one of plural drag and drop procedures are utilized by the program object in accordance with a type of the sheet metal solid shape to be displayed;

wherein the sheet metal solid shape is a bend solid shape, and wherein the drag and drop procedure performs at least one of the steps of:
(1) determining a bend direction for the bend solid shape;
(2) determining whether a flange segment of the bend solid shape is to be adjustable independently of the bend solid shape;
(3) determining whether a relief is to be include in the bend solid shape.

26. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

a profile generator;

wherein a program object is created for a sheet metal solid shape to be displayed upon the display device;

wherein one of plural drag and drop procedures are utilized by the program object in accordance with a type of the sheet metal solid shape to be displayed, the type being one of a flat stock solid shape, a bend solid shape, a punch solid shape, and a form solid shape;

wherein the program object transmits reference information to the profile generator, and wherein the profile generator generates and returns to the program object geometric profile information for use in an evaluation process.

27. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

wherein a program object is created for a sheet metal solid shape to be displayed upon the display device;

wherein one of plural drag and drop procedures are utilized by the program object in accordance with a type of the sheet metal solid shape to be displayed;

wherein the sheet metal solid shape is a flat stock solid shape, and wherein the drag and drop procedure for the flat stock solid shape performs the steps of:
(1) accessing stock information of a target solid shape;
(2) positioning the flat stock solid shape relative to the target solid shape;
(3) performing a history reordering of a part which includes the flat stock solid shape.

28. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

wherein a program object is created for a sheet metal solid shape to be displayed upon the display device;

wherein one of plural drag and drop procedures are utilized by the program object in accordance with a type of the sheet metal solid shape to be displayed;

wherein the sheet metal solid shape is a bend solid shape, and wherein the drag and drop procedure performs at least one of the steps of:
(1) determining a bend direction for the bend solid shape;
(2) determining whether a flange segment of the bend solid shape is to be adjustable independently of the bend solid shape;
(3) determining whether a relief is to be include in the bend solid shape.

29. A method of operating a three dimensional geometric modeling system having a processor which executes a program comprising set of coded instructions stored in a memory; a display device upon which, when executed, the program provides a visual depiction of a three dimensional object comprising at least one solid shape; a profile generator; and, a user input device for inputting information to the processor; the method comprising:

receiving via the user input device indication of a selected solid shape designated from a plurality of solid shapes, and in response thereto utilizing one of plural drag and drop procedures by a program object in accordance with a type of the sheet metal solid shape to be displayed, the type being one of a flat stock solid shape, a bend solid shape, a punch solid shape, and a form solid shape;

transmitting reference information to the profile generator; and the profile generator generating and providing to the program object geometric profile information for use in an evaluation process.

30. A method of operating a three dimensional geometric modeling system having a processor which executes a program comprising set of coded instructions stored in a memory; a display device upon which, when executed, the program provides a visual depiction of a three dimensional object comprising at least one solid shape; and, a user input device for inputting information to the processor; the method comprising:

receiving via the user input device indication of a selected solid shape designated from a plurality of solid shapes, and in response thereto utilizing one of plural drag and drop procedures by a program object in accordance with a type of the sheet metal solid shape to be displayed;

wherein the sheet metal solid shape is a flat stock solid shape, and wherein the drag and drop procedure for the flat stock solid shape performs the steps of:

(1) accessing stock information of a target solid shape;
(2) positioning the flat stock solid shape relative to the target solid shape;
(3) performing a history reordering of a part which includes the flat stock solid shape.

31. A method of operating a three dimensional geometric modeling system having a processor which executes a program comprising set of coded instructions stored in a memory; a display device upon which, when executed, the program provides a visual depiction of a three dimensional object comprising at least one solid shape; and, a user input device for inputting information to the processor; the method comprising:

receiving via the user input device indication of a selected solid shape designated from a plurality of solid shapes, and in response thereto utilizing one of plural drag and drop procedures by a program object in accordance with a type of the sheet metal solid shape to be displayed;

wherein the sheet metal solid shape is a bend solid shape, and wherein the drag and drop procedure performs at least one of the steps of:

(1) determining a bend direction for the bend solid shape;
(2) determining whether a flange segment of the bend solid shape is to be adjustable independently of the bend solid shape;
(3) determining whether a relief is to be include in the bend solid shape.

* * * * *